United States Patent [19]

Berger et al.

[11] Patent Number: 5,510,981
[45] Date of Patent: Apr. 23, 1996

[54] LANGUAGE TRANSLATION APPARATUS AND METHOD USING CONTEXT-BASED TRANSLATION MODELS

[75] Inventors: Adam L. Berger; Peter F. Brown, both of New York; Stephen A. Della Pietra, Pearl River; Vincent J. Della Pietra, Blauvelt, all of N.Y.; Andrew S. Kehler, Somerville, Mass.; Robert L. Mercer, Yorktown Heights, N.Y.

[73] Assignee: International Business Machines Corporation, Armonk, N.Y.

[21] Appl. No.: 144,913

[22] Filed: Oct. 28, 1993

[51] Int. Cl.$^6$ .................................. G06F 17/28
[52] U.S. Cl. .................. 364/419.02; 364/419.08; 364/419.16; 381/43
[58] Field of Search .............. 364/419.02, 419.08, 364/419.16, 200 MS File; 381/43, 51

[56] References Cited

U.S. PATENT DOCUMENTS

| | | | |
|---|---|---|---|
| 4,754,489 | 6/1988 | Bokder | 382/40 |
| 4,829,580 | 5/1989 | Church | 381/52 |
| 4,882,759 | 11/1989 | Bahl et al. | 381/51 |
| 5,033,087 | 7/1991 | Bahl et al. | 381/43 |
| 5,068,789 | 11/1991 | Van Vliembergen | 364/419 |
| 5,109,509 | 4/1992 | Katayama et al. | 395/600 |
| 5,146,405 | 9/1992 | Church | 364/419 |
| 5,200,893 | 4/1993 | Dzawa et al. | 364/419 |

OTHER PUBLICATIONS

Brown, P. F., et al. "Analysis, Statistical Transfer, and Synthesis in Machine Translation." *Proceedings of the Fourth International Conference on Theoretical and Methodological Issues in Machine Translation*, Nov. 1992, pp. 83–100.

Brown, Peter F., et al. "Class–Based N–Gram Models of Natural Language." *Computational Linguistics*, vol. 18, No. 4, Dec. 1992, pp. 467–480.

Brown, Peter F., et al. "The Mathematics of Statistical Machine Translation: Parameter Estimation." *Computational Linguistics*, vol. 19, No. 2, Jun. 1993, pp. 263–311.

Brown, Peter F., et al. "Method and Apparatus For Natural Language Translation." U.S. patent application Ser. No. 07/736,278, filed Jul. 25, 1991.

Brown, P. F. et al. "Word Sense Disambiguation Using Statistical Methods." *Proceedings 29th Annual Meeting of the Association for Computational Linguistics*, Berkeley, California, Jun. 1991, pp. 265–270.

Darroch, J. N. et al. "Generalized Iterative Scaling for Log–Linear Models." *The Annals of Mathematical Statistics*, vol. 43, No. 5, 1972, pp. 1470–1480.

*Primary Examiner*—David M. Huntley
*Assistant Examiner*—Frantzy Poinvil
*Attorney, Agent, or Firm*—Marc D. Schechter; Robert P. Tassinari

[57] ABSTRACT

An apparatus for translating a series of source words in a first language to a series of target words in a second language. For an input series of source words, at least two target hypotheses, each including a series of target words, are generated. Each target word has a context comprising at least one other word in the target hypothesis. For each target hypothesis, a language model match score including an estimate of the probability of occurrence of the series of words in the target hypothesis. At least one alignment connecting each source word with at least one target word in the target hypothesis is identified. For each source word and each target hypothesis, a word match score including an estimate of the conditional probability of occurrence of the source word, given the target word in the target hypothesis which is connected to the source word and given the context in the target hypothesis of the target word which is connected to the source word. For each target hypothesis, a translation match score including a combination of the word match scores for the target hypothesis and the source words in the input series of source words. A target hypothesis match score including a combination of the language model match score for the target hypothesis and the translation match score for the target hypothesis. The target hypothesis having the best target hypothesis match score is output.

21 Claims, 39 Drawing Sheets

FIG. 2

```
F :   LA      CLEF    EST    DANS    LA      PORTE
      |       |       |      |       |       |
E₁:   THE     KEY     IS     IN      THE     DOOR
```

FIG. 3

```
F :   LA      CLEF    EST    DANS    LA      PORTE
      |       |       |      |       |       |
E₁:   THE     KEY     IS     IN      THE     DOOR
```

FIG. 4

```
F :   LA      CLEF    EST    DANS    LA      PORTE
      |       |       |      |       |       |
E₁:   THE     KEY     IS     IN      THE     DOOR
```

```
begin patterns and actions;
WH_NP?.[1].DO_SET.'not'?.[2].SUBJECT_NP.[3].ADVERB*.[4].
   ,BARE_INF_TAG.(#)*.'?'
   -> english_question_inversion;
(#)+
   -> default_action;
end patterns and actions;

begin auxiliary patterns;
ADVERB    = ,ADV_TAG | 'most','RR!' | 'more','RR!';
BARE_NP   = ((ADVERB)*.,ADJ_TAG)*.,COMMON_NOUN_TAG;
SUBJECT_NP = (,SUBJECT_TAG) | (,DETERMINER_TAG)?.BARE_NP;
WH_NP     = WH_WORD | (( 'which' | 'what' | 'how'.'many').BARE_NP);
end auxiliary patterns;

begin sets of words;
DO_SET   = {do does did};
WH_WORD  = {what who where why whom how when which};
end sets of words;

begin sets of tags;
PROPER_NOUN_TAG = {NP NP1 NP2};
PRONOUN_TAG     = {PN PN1 PNQS};
SUBJECT_TAG     = {PROPER_NOUN_TAG PRONOUN_TAG};
BARE_INF_TAG    = {VV0 VH0 VB0 VD0};
COMMON_NOUN_TAG = {ND1 NN NN1 NN2 NNJ NNJ1 NNJ2 NNL NNL1 NNL2
                   NO NNO2 NNS1 NNS2 NNSA1 NNSB NNSB1
                   NNSB2 NNT1 NNT2 NNU NNU1 NNU2 NPD1 NPD2 NPM1};
ADV_TAG         = {RA REX RG RGA RGR RGT RP RPK RR RRR RRT RT};
ADJ_TAG         = {JA JB JBR JBT JJ JJR JJT JK};
DETERMINER_TAG  = {AT AT1 DA DA1 DA2 DA2R DA2T DAR DAT DB DB2 DD
                   DD1 DD2 DDQ DDQ$ DDQV};
end sets of tags;
```

FIGURE 11

```
1   english_question_inversion: procedure;
2     /* This procedure is invoked when the pattern:
3        WH_NP?.[1].DO_SET.'not'?.[2].SUBJECT_NP.[3].ADVERB*.[4]
4        .#,BARE_INF_TAG.(#)*.'?' is matched */
5
6     set the output sequence to null;
7
8     append tuples the beginning of the input sequence
9        to position @reg(1)-1 to output;
10
11    append tuples from input positions
12       @reg(2) to @reg(3)-1 to output;
13
14    if @reg(2) = @reg(1) + 2 then do;
15       append tuples from input positions @reg(1) to
16          @reg(1)+1 to output;
17       append tuples from input in positions
18          @reg(3) to @reg(4) to output;
19       end;
20
21    else do;
22       append tuples from input in positions
23          @reg(3) to @reg(4)-1 to output;
24
25       if the word at postion @reg(1) is 'does' then do;
26          append the input word at position @reg(4) and the
27             tag for 'does' to output;
28          end;
29
30       else if the word at postion @reg(1) is 'do' then do;
31          append tuple at input position @reg(4)
32          end;
33
34       else if the word at postion @reg(1) is 'did' then do;
35          append the input word at position @reg(4)
36             and the tag for 'did' to output;
37          end;
38
39       else there is an error;
40
41       end;
42
43    append the tuples from input positions @reg(4)+1 to
44       one less than the last position to output;
45
46    append the word 'QINV' and the tag 'QINV' to output;
47
48    end english_question_inversion;
```

FIGURE 12

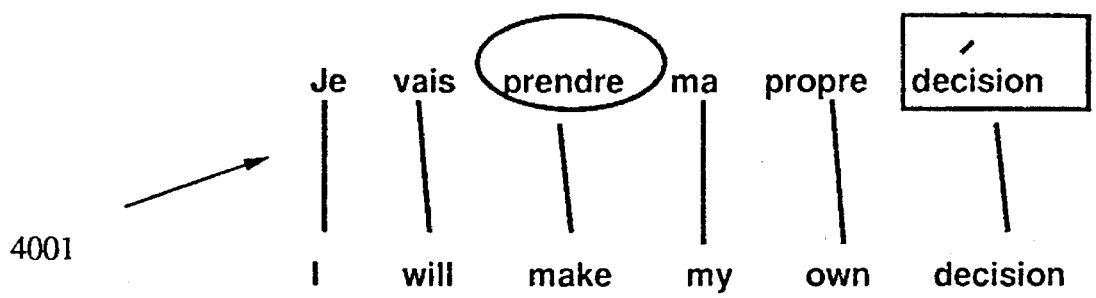
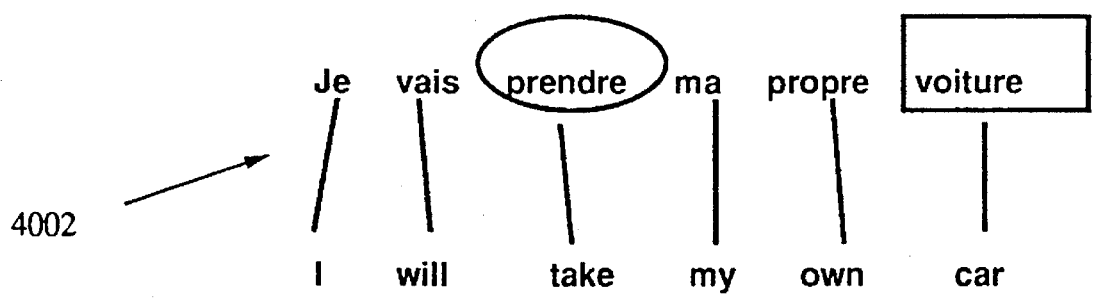
vocabulary word: prendre
informant site: first noun to the right
informant word:
    first sequence: décision
    second sequence: voiture
FIGURE 14

```
1  procedure: extend_partial_hypotheses_on_list;
2    do for i = 1 to the number of partial hypotheses on list;
3      let h be the i-th partial hypothesis to be extended;
4      do for p = 1 to the number of positions in the source structure.
5        if p is not already aligned in h then
6          extend_h_by_accounting_for_source_morpheme_in_position p;
7      end of do for p;
8    end of do for i;
9  end of procedure extend_partial_hypotheses_on_list;

10 procedure: extend_h_by_accounting_for_source_morpheme_in_position_p;
11   if h is an open partial hypothesis then do;
12     let q be the position of the open target morpheme in h;
13     extend_open_h_by_connecting_p_to_q_and_keep_h_open;
14     extend_open_h_by_connecting_p_to_q_and_close_h;
15   end of if h;
16   if h is not an open partial hypothesis then do;
17     let s be the source morpheme in position p;
18     do j = 1 to the number of target morpheme translations of s;
19       let t be the j-th target morpheme translation of s;
20       create_open_extension_of_h_by_connecting_p_to_t;
21       create_closed_extension_of_h_by_connecting_p_to_t;
22       create_extension_of_h_by_connecting_p_to_null_target_morpheme;
23       create_list_of_target_morphemes_to_be_inserted_before_t;
24       do k = 1 to number of target morphemes on listed to be inserted;
25         let t1 be the k-th target morpheme to be inserted;
26         create_open_extenstion_of_by_connecting_p_to_t1_t;
27         create_closed_extenstion_of_by_connecting_p_to_t1_t;
28       end of do k;
29     end of do j;
30   end of if h;
31 end of procedure extend_h_by_accounting_for_source_morpheme_in_position_p;
```

FIGURE 35

```
/*START_COMMENT* Beginning file =  048
101 H002-108 script A *END_COMMENT*/
.TB 029 060 090 099
.PL 060
.LL 120
.NF
The House met at 2 p.m.
.SP
*boMr. Donald MacInnis (Cape Breton
-East Richmond):*ro Mr. Speaker,
I rise on a question of privilege af-
fecting the rights and prerogatives
of parliamentary committees and one
which reflects on the word of two
ministers.
.SP
*boMr. Speaker: *roThe hon. member's
 motion is proposed to the
House under the terms of Standing
Order 43. Is there unanimous consent?
.SP
*boSome hon. Members: *roAgreed.
s*itText*ro)
Question No. 17--*boMr. Mazankowski:
*ro
1. For the period April 1, 1973 to
January 31, 1974, what amount of
money was expended on the operation
and maintenance of the Prime
Minister's residence at Harrington
Lake, Quebec?
.SP
(1415)
s*itLater:*ro)
.SP
*boMr. Cossitt:*ro Mr. Speaker, I rise
on a point of order to ask for
clarification by the parliamentary
secretary.
```

1. \SCM{} Document = 048 101 H002-108 script A \ECM{}
2. The House met at 2 p.m.
3. \SCM{} Paragraph \ECM{}
4. \SCM{} Author = Mr. Donald MacInnis (Cape Breton-East Richmond) \ECM{}
5. Mr. Speaker, I rise on a question of privilege affecting the rights and prerogatives of parliamentary committees and one which reflects on the word of two ministers.
21. \SCM{} Paragraph \ECM{}
22. \SCM{} Author = Mr. Speaker \ECM{}
23. The hon. member's motion is proposed to the House under the terms of Standing Order 43.
44. Is there unanimous consent?
45. \SCM{} Paragraph \ECM{}
46. \SCM{} Author = Some hon. Members \ECM{}
47. Agreed.
61. \SCM{} Source = Text \ECM{}
62. \SCM{} Question = 17 \ECM{}
63. \SCM{} Author = Mr. Mazankowski \ECM{}
64. 1.
65. For the period April 1, 1973 to January 31, 1974, what amount of money was expended on the operation and maintenance of the Prime Minister's residence at Harrington Lake, Quebec?
66. \SCM{} Paragraph \ECM{}
81. \SCM{} Time = (1415) \ECM{}
82. \SCM{} Time = Later \ECM{}
83. \SCM{} Paragraph \ECM{}
84. \SCM{} Author = Mr. Cossitt \ECM{}
85. Mr. Speaker, I rise on a point of order to ask for clarification by the parliamentary secretary.

FIGURE 42

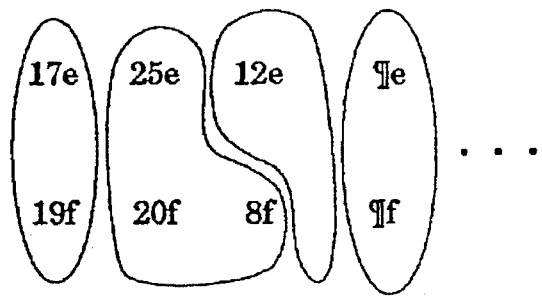
FIGURE 43
FIGURE 44
| Bead | Text |
|---|---|
| $e$ | one English sentence |
| $f$ | one French sentence |
| $ef$ | one English and one French sentence |
| $eef$ | two English and one French sentence |
| $eff$ | one English and two French sentences |
| $¶_e$ | one English paragraph |
| $¶_f$ | one French paragraph |
| $¶_e ¶_f$ | one English and one French paragraph |
FIGURE 45

LANGUAGE TRANSLATION APPARATUS AND METHOD USING CONTEXT-BASED TRANSLATION MODELS

This invention was made with Government support under Contract No. N00014-91-C-0135 awarded by the Office of Naval Research. The Government has certain rights in this invention.

BACKGROUND OF THE INVENTION

The invention relates to computerized language translation, such as computerized translation of a French sentence into an English sentence.

In U.S. patent application Ser. No. 07/736,278, filed Jul. 25, 1991, now pending, entitled "Method and System for Natural Language Translation" by Peter F. Brown et al (the entire content of which is incorporate herein by reference), there is described a computerized language translation system for translating a text F in a source language to a text E in a target language. The system described therein evaluates, for each of a number of hypothesized target language texts E, the conditional probability $P(E|F)$ of the target language test E given the source language text F. The hypothesized target language text $\hat{E}$ having the highest conditional probability $P(E|F)$ is selected as the translation of the source language text F.

Using Bayes' theorem, the conditional probability $P(E|F)$ of the target language text E given the source language text F can be written as $$P(E|F) = \frac{P(F|E)P(E)}{P(F)} \quad (1)$$

Since the probability $P(F)$ of the source language text F in the denominator of Equation 1 is independent of the target language text E, the target language text $\hat{E}$ having the highest conditional probability $P(E|F)$ will also have the highest product $P(F|E) P(E)$. We therefore arrive at $$\hat{E} = \underset{E}{argmax} \, P(F|E)P(E) \quad (2)$$

In Equation 2, the probability $P(E)$ of the target language text E is a language model match score and may be estimated from a target language model. While any known language model may be used to estimate the probability $P(E)$ of the target language text E, Brown et al describe an n-gram language model comprising a 1-gram model, a 2-gram model, and a 3-gram model combined by parameters whose values are obtained by interpolated estimation.

The conditional probability $P(F|E)$ in Equation 2 is a translation match score. As described by Brown et al, the translation match score $P(F|E)$ for a source text F comprising a series of source words, given a target hypothesis E comprising a series of target words, may be estimated by finding all possible alignments connecting the source words in the source text F with the target words in the target text E, including alignments in which one or more source words are not connected to any target words, but not including alignments where a source word is connected to more than one target word. For each alignment and each target word e in the target text E connected to $\phi$ source words in the source text F, there is estimated the fertility probability $n(\phi|e)$ that the target word e is connected to the $\phi$ source words in the alignment. There is also estimated for each source word f in the source text F and each target word e in the target text E connected to the source word f by the alignment, the lexical probability $t(f|e)$ that the source word f would occur given the occurrence of the connected target word e.

For each alignment and each source word f, Brown et al further estimate the distortion probability $a(j|a_j,m)$ that the source word f is located in position j of the source text F, given that the target word e connected to the source word f is located in position $a_j$ in the target text E, and given that there are m words in the source text F.

By combining the fertility probabilities for an alignment and for all target words e in the target text E, and multiplying the result by the probability $$n_0\left(\phi_0 | \sum_{i=1}^{l} \phi_i\right)$$

of the number $\phi_0$ of target words not connected with any source words in the alignment, given the sum of the fertilities $\phi$ of all of the target words in the target text E in the alignment, a fertility score for the target text E and the alignment is obtained.

By combining the lexical probabilities for an alignment and for all source words in the source text F, a lexical score for the alignment is obtained.

By combining the distortion probabilities for an alignment and for all source words in the source text F which are connected to a target word in the alignment, and by multiplying the result by $$\frac{1}{\phi_0!}$$

(where $\phi_0$ is the number of target words in the target text E that are not connected with any source words), a distortion score for the alignment is obtained.

Finally, by combining the fertility, lexical, and distortion scores for the alignment, and multiplying the result by the combinatorial factor $$\prod_{i=0}^{l} (\phi_i!),$$

a translation match score for the alignment is obtained. (See, Brown et al, Section 8.2.)

The translation match score $P(F|E)$ for the source text F and the target hypothesis E may be the sum of the translation match scores for all permitted alignments between the source text F and the target hypothesis E. Preferably, the translation match score $P(F|E)$ for the source text F and the target hypothesis E is the translation match score for the alignment estimated to be most probable.

Equation 2 may be used to directly estimate the target hypothesis match score $P(F|E)P(E)$ for a hypothesized target language text E and a source language text F. However, in order to simply the language model $P(E)$ and the translation model $P(F|E)$, and in order to estimate the parameters of these models from a manageable amount of training data, Brown et al estimate the target hypothesis match score $P(F|E)P(E)$ for simplified intermediate forms E' and F' of the target language text E and the source language text F, respectively. Each intermediate target language word e' represents a class of related target language words. Each intermediate source language word f' represents a class of related source language words. A source language transducer converts the source language text F to the intermediate form F'. The hypothesized intermediate form target language text $\hat{E}'$ having the highest hypothesis match score $P(F'|E')P(E')$ is estimated from Equation 2. A target language transducer converts the best matched intermediate target language text $\hat{E}'$ to the target language text $\hat{E}$.

In their language translation system, Brown et al estimate the lexical probability of each source word f as the conditional probability t(f|e) of each source word f given solely the target word e connected to the source word in an alignment. Consequently, the lexical probability provides only a coarse estimate of the probability of the source word f.

SUMMARY OF THE INVENTION

It is an object of the invention to provide an apparatus and method for translating a series of source words in a first language to a series of target words in a second language different from the first language, in which the apparatus and method provide improved estimates of the lexical probabilities of the source words.

It is another object of the invention to provide an apparatus and method for translating a series of source words in a first language to a series of target words in a second language different from the first language, in which the lexical probability of a source word is estimated as a conditional probability given the target word connected to the source word in an alignment, and given the context of the target word connected to the source word.

According to the invention, an apparatus for translating a series of source words in a first language to a series of target words in a second language different from the first language comprises means for inputting a series of source words. Means are also provided for generating at least two target hypotheses. Each target hypothesis comprises a series of target words selected from a vocabulary of words in the second language. Each target word has a context comprising at least one other word in the target hypothesis.

A language model match score generator generates, for each target hypothesis, a language model match score comprising an estimate of the probability of occurrence of the series of words in the target hypothesis. An alignment identifier identifies at least one alignment between the input series of source words and each target hypothesis. The alignment connects each source word with at least one target word in the target hypothesis.

A word match score generator is provided for generating, for each source word and each target hypothesis, a word match score comprising an estimate of the conditional probability of occurrence of the source word, given the target word in the target hypothesis which is connected to the source word and given the context of the target word in the target hypothesis which is connected to the source word. A translation match score generator generates, for each target hypothesis, a translation match score comprising a combination of the word match scores for the target hypothesis and the source words in the input series of source words.

A hypothesis match score generator is provided for generating a target hypothesis match score for each target hypothesis. Each target hypothesis match score comprises a combination of the language model match score for the target hypothesis and the translation match score for the target hypothesis. The target hypothesis having the best target hypothesis match score is provided at an output.

Preferably, each target hypothesis comprises a series of target words selected from a vocabulary comprising words in the second language and a null word representing the absence of a word.

The alignment identifier may comprise means for identifying two or more alignments between the input series of source words and each target hypothesis. Each alignment connects each source word with at least one target word in the target hypothesis. The word match score generator generates, for each source word and each alignment and each target hypothesis, a word match score comprising an estimate of the conditional probability of occurrence of the source word, given the target word connected to the source word, and given the context of the target word. The translation match score generator generates, for each target hypothesis, a translation match score comprising a combination of the word match scores for the target hypothesis and the alignments and the source words in the input series of source words.

The source text input device may comprise means for transforming the input series of source words into a series of transformed source words. The alignment means identifies at least one alignment between the series of transformed source words and each target hypothesis. Each alignment connects each transformed source word with at least one target word in the target hypothesis. The word match score generator generates, for each transformed source word and each target hypothesis, a word match score comprising an estimate of the conditional probability of occurrence of the transformed source word, given the target word in the target hypothesis which is connected to the transformed word and given the context of the target word in the target hypothesis which is connected to the transformed source word.

The translation match score generator generates, for each target hypothesis, a translation match score comprising a combination of the word match scores for the target hypothesis and the transformed source word. Output means are provided for synthesizing a series of output words from the target hypothesis having the best target hypothesis match score, and for outputting the output words.

The translation match score for a target hypothesis may comprise the product of the word match scores for the target hypothesis and the source words in the input series of source words. The target hypothesis match score for a target hypothesis may comprise the product of the language model match score for the target hypothesis multiplied by the translation match score for the target hypothesis.

The context of the target word in the target hypothesis which is connected to a source word may be contained in at least one of two or more context classes. The estimated conditional probability of occurrence of the source word, given the target word connected to the source word and given the context of the target word, comprises at least one function having a value dependent on the class containing the context of the target word.

Alternatively, the estimated conditional probability of occurrence of the source word may comprise a function having a value dependent on the part of speech in the target hypothesis of at least one word in the context of the target word which is connected to the source word, or dependent on the identity of at least one word in the context of the target word which is connected to the source word.

The means for outputting the target hypothesis having the best match score may comprise a display. The input means may comprise a keyboard, a computer disk drive, or a computer tape drive.

By estimating the lexical probability of a source word as the conditional probability of the source word given the target word connected to the source word in an alignment, and given the context of the target word connected to the source word, the present invention obtains translation match scores with improved accuracy.

BRIEF DESCRIPTION OF THE DRAWINGS

FIG. 2 schematically shows an example of an alignment between a hypothetical series of source words and a hypothetical series of target words.

FIG. 3 schematically shows an example of a second alignment between the hypothetical series of source words and the hypothetical series of target words of FIG. 2.

FIG. 4 schematically shows an example of a third alignment between the hypothetical series of source words and the hypothetical series of target words of FIG. 2.

FIG. 11 is Table of Patterns for a finite-state pattern matcher employed in some source and target transducers.

FIG. 12 is a Table of Actions for an action processing module employed in some source and target transducers.

FIG. 14 is an example of informants and informant sites.

FIG. 24 is an example of a partial hypothesis which results from an extension by the target morpheme the.

FIG. 35 contains pseudocode describing the method for extending hypotheses.

FIG. 42 depicts a sample of text before and after textural cleanup and sentence detection.

FIG. 43 shows an example of a division of aligned corpora into beads.

FIG. 44 shows a finite state model for generating beads.

FIG. 45 shows the beads that are allowed by the model.

DESCRIPTION OF THE PREFERRED EMBODIMENTS

Figure 1:
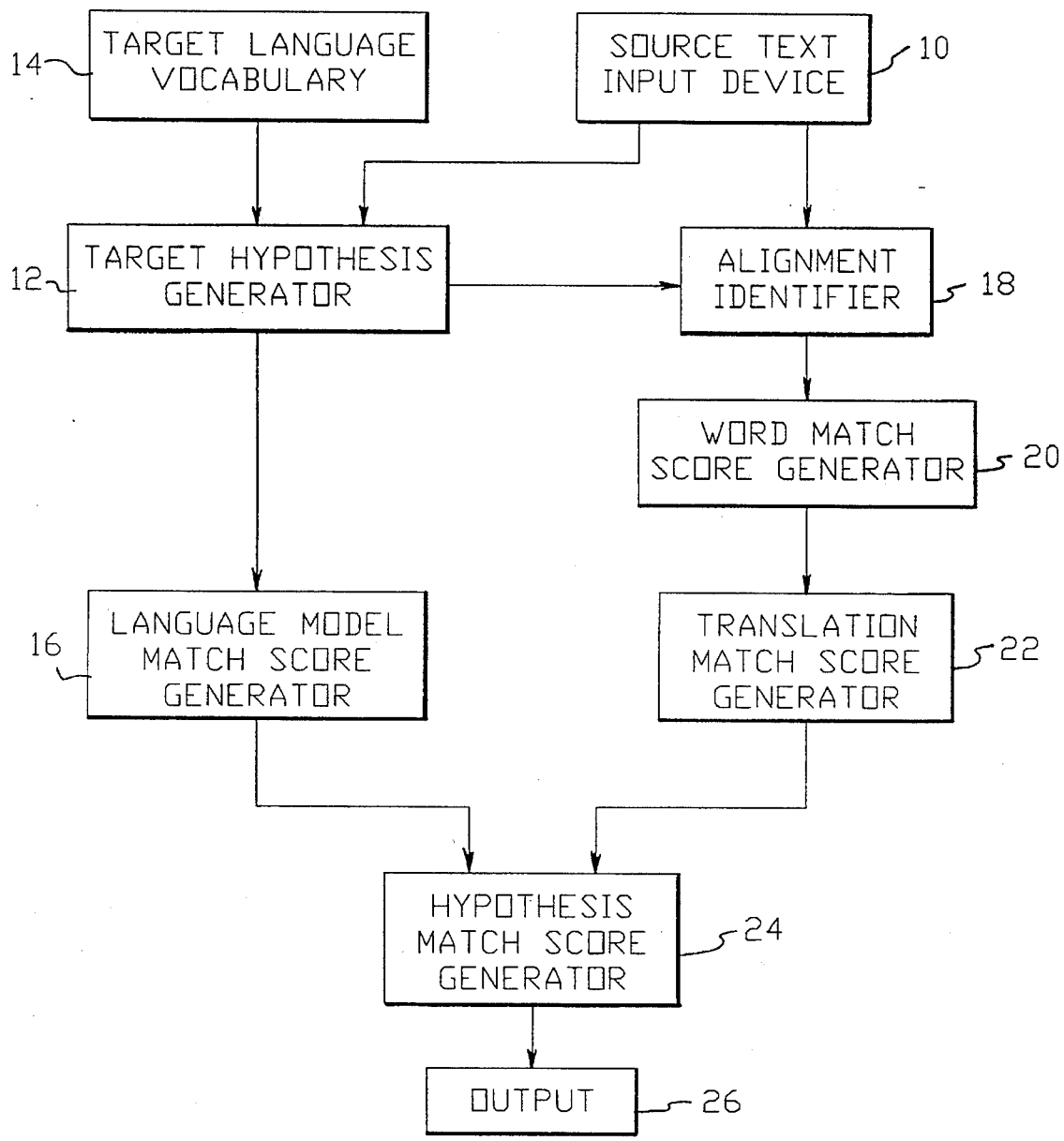
FIG. 1 is a block diagram of an example of an apparatus for translating words from a first language to a second language according to the present invention.

FIG. 1 is a block diagram of an example of an apparatus for translating words from a first language to a second language according to the present invention. The apparatus comprises a source text input device 10 for inputting a series of source words. The source text input device 10 may comprise, for example, a keyboard, a computer disk drive, or a computer tape drive.

The source text input device 10 may further comprise means for transforming the input series of source words into a series of transformed source words. Each transformed source word may represent a set of related input source words. For example, each of the input source words in the set {etre, etant, ete, suis, es, est, sommes, etes, sont, fus, fumes, serai, serons, sois, soit, soyons, soyez, soient} are forms of the verb infinitive "etre", and may be transformed to "etre" with a tag representing the tense of the original input source word.

The means for transforming the input series of source words into a series of transformed source words may comprise the source transducers described in Sections 3, 4 and 11 of Brown et al, above, which are incorporated herein by reference and set forth in full herein. In essence, these transducers check and correct the spelling of the input source words, check and correct the case of the input source words, detect titles of documents in the input series of source words, and detect names in the input series of source words. The transducers also tag each input source word with the most likely part of speech of the source word, and flag unknown source words (which are not contained in a stored vocabulary of source words). The means for transforming the input series of source words also collapses multi-word units of input source words into single transformed source words, and splits compound input source words into two or more transformed source words. The means for transforming the input series of source words into a series of transformed source words further performs linguistic or morphological transformations of different forms of a word into a single basic form. Finally, the means for transforming the input series of source words may also estimate the sense of each input source word, and assign that sense to the transformed source word.

Transducers described in Brown et al are now described in detail.

SOURCE TRANSDUCERS (Brown et al. Section 3)

In this section, some embodiments of the the source-transducer 701 will be explained. The role of this transducer is to produce one or more intermediate source-structure representations from a portion of text in the source language.

Overview (Brown et al. Section 3.1)

Figure 5:
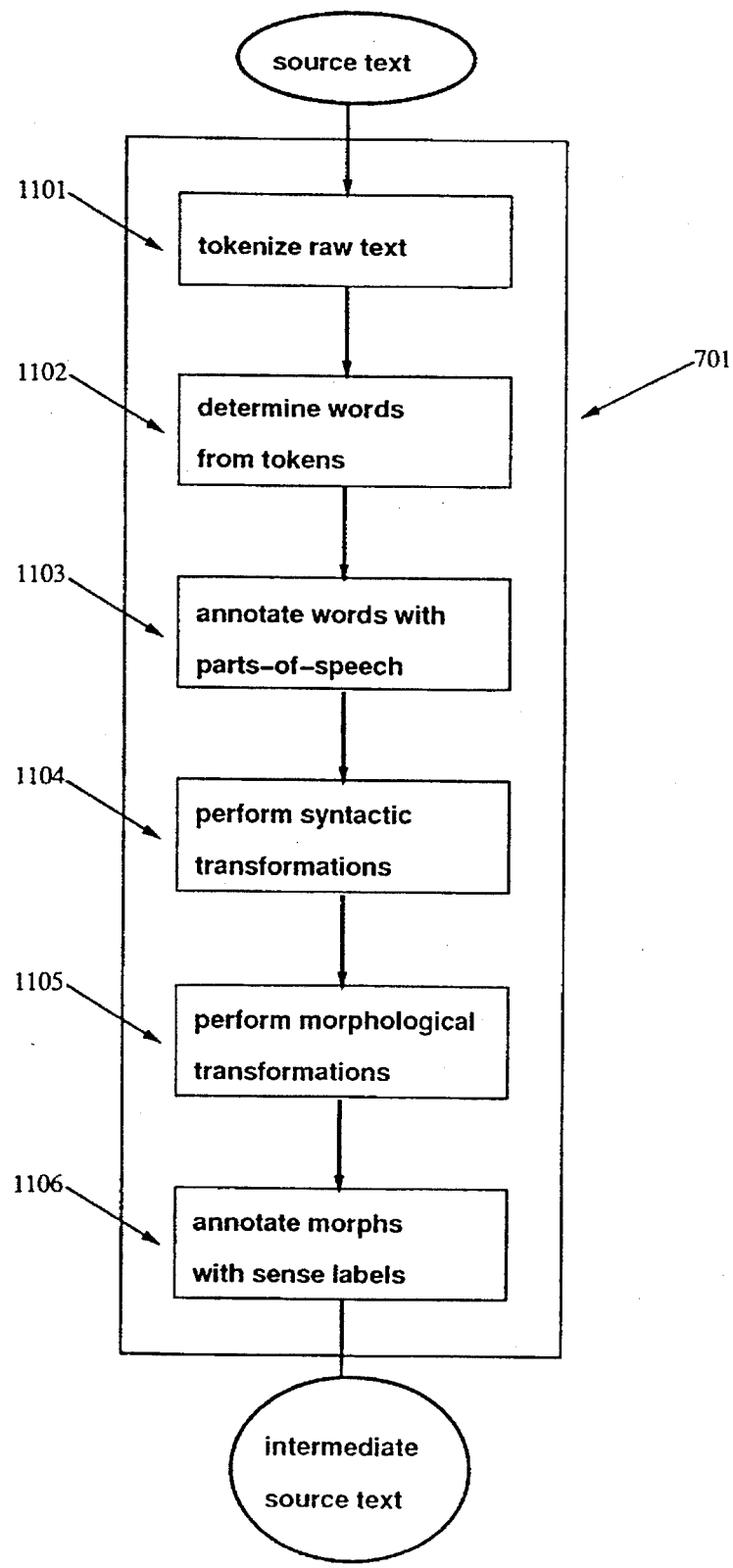
FIG. 5 is a schematic flow diagram of a source transducer.

An embodiment of the source-transducer 701 is shown in FIG. 5. In this embodiment, the transducer takes as input a sentence in the source language and produces a single intermediate source-structure consisting of a sequence of linguistic morphs. This embodiment of the source-transducer 701 comprises transducers that:

tokenize raw text 1101;

determine words from tokens 1102;

annotate words with parts of speech 1103;

perform syntactic transformations 1104;

perform morphological transformations 1105;

annotate morphs with sense labels 1106.

It should be understood that FIG. 5 represents only one embodiment of the source-transducer 701. Many variations are possible. For example, the transducers 1101, 1102, 1103, 1104, 1105, 1106 may be augmented and/or replaced by other transducers. Other embodiments of the source-transducer 701 may include a transducer that groups words into compound words or identifies idioms. In other embodiments, rather than a single-intermediate source-structure being produced for each source sentence, a set of several intermediate source-structures together with probabilities or scores may be produced. In such embodiments the transducers depicted in FIG. 5 can be replaced by transducers which produce at each stage intermediate structures with probabilities or scores. In addition, the intermediate source-structures produced may be different. For example, the intermediate structures may be entire parse trees, or case frames for the sentence, rather than a sequence of morphological units. In these cases, there may be more than one intermediate source-structure for each sentence with scores, or there may be only a single intermediate source-structure.

Components (Brown et al. Section 3.2)

Referring still to FIG. 5, the transducers comprising the source-transducer 701 will be explained. For concreteness, these transducers will be discussed in cases in which the source language is either English or French.

Tokenizing Transducers (Brown et al. Section 3.2.1)

The purpose of the first transducer 1101, which tokenizes raw text, is well illustrated by the following Socratic dialogue.

How do you find words in text?

Words occur between spaces.

What about "however,"? Is that one word or two?

Oh well, you have to separate out the commas.

Periods too?

Of course.

What about "Mr."?

Certain abbreviations have to be handled separately.

How about "shouldn't"? One word or two?

One.

So "shouldn't" is different from "should not"?

Yes.

And "Gauss-Bonnet", as in the "Gauss-Bonnet Theorem"?

Two names, two words.

So if you split words at hyphens, what do you do with "vis-à-vis"? One word, and don't ask me why.

How about "stingray"?

One word, of course.

And "manta ray"?

One word: it's just like stingray.

But there's a space.

Too bad.

How about "inasmuch as"?

Two.

Are you sure?

No.

This dialogue illustrates that there is no canonical way of breaking a sequence of characters into tokens. The purpose of the transducer 1101, that tokenizes raw text, is to make some choice.

In an embodiment in which the source-language is English, this tokenizing transducer 1101 uses a table of a few thousand special character sequences which are parsed as single tokens and otherwise treat spaces and hyphens as word separators. Punctuation marks and digits are separated off and treated as individual words. For example, 87, is tokenized as the three words 8 7 and ,.

In another embodiment in which the source-language is French, the tokenizing transducer 1101 operates in a similar way. In addition to space and hyphen, the symbol -t- is treated as a separator when tokenizing French text.

Token-Word Transducers (Brown et al. Section 3.2.2)

Figure 6:
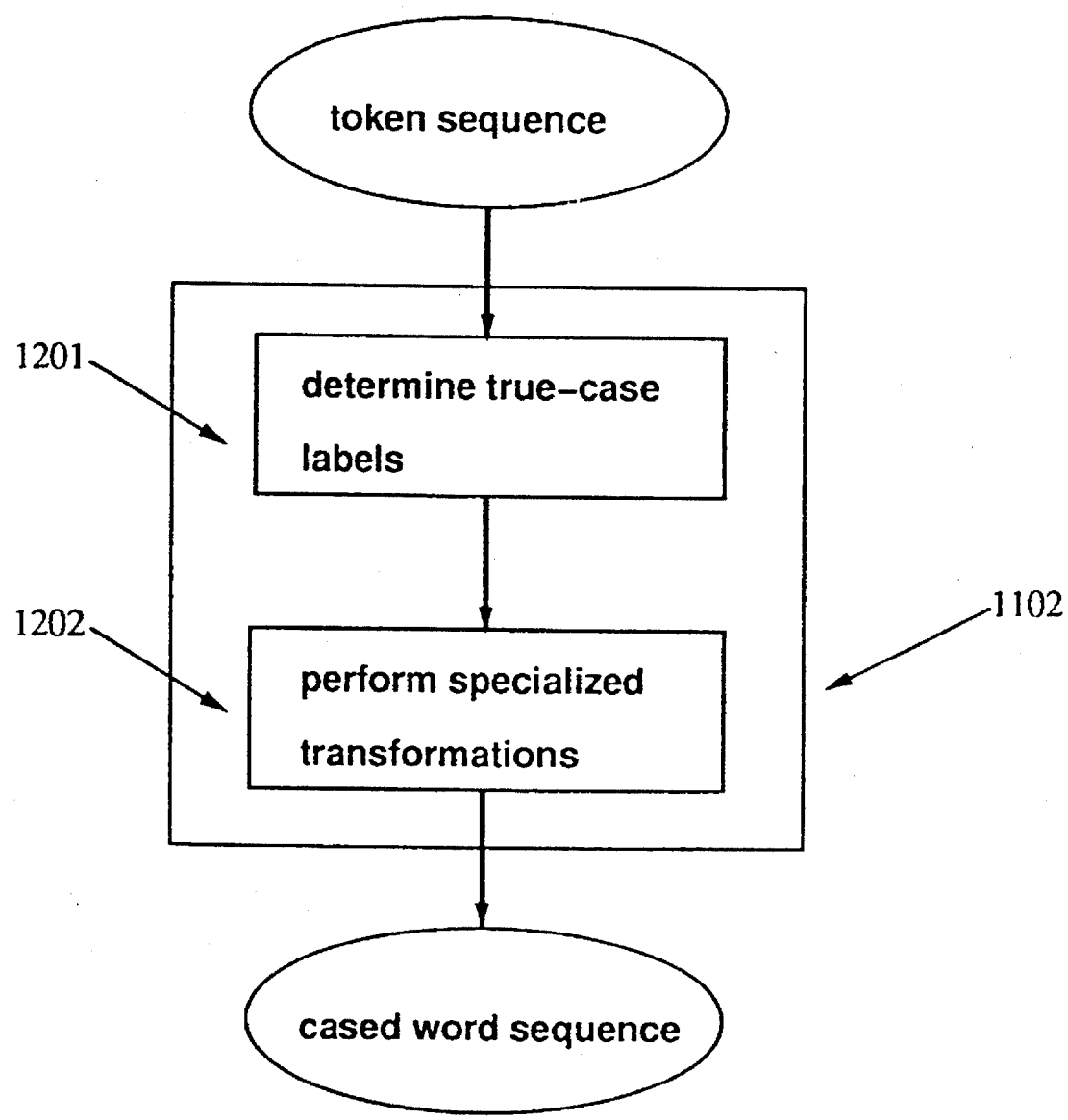
FIG. 6 is a schematic flow diagram of a token-to-word transducer.

The next transducer 1102 determines a sequence of words from a sequence of token spellings. In some embodiments, this transducer comprises two transducers as depicted in FIG. 6. The first of these transducers 1201 determines an underlying case pattern for each token in the sequence. The second of these transducers 1202 performs a number of specialized transformations. These embodiments can easily be modified or enhanced by a person skilled in the art.

True-Case Transducers (Brown et al. Section 3.2.3)

The purpose of a true-case transducer 1201 is made apparent by another Socratic dialogue:

When do two sequences of characters represent the same word?

When they are the same sequences.

So, "the" and "The" are different words?

Don't be ridiculous. You have to ignore differences in case.

So "Bill" and "bill" are the same word?

No, "Bill" is a name and "bill" is something you pay. With proper names the case matters.

What about the two "May"'s in "May I pay in May?"

The first one is not a proper name. It is capitalized because it is the first word in the sentence.

Then, how do you know when to ignore case and when not to?

If you are human, you just know.

Computers don't know when case matters and when it doesn't. Instead, this determination can be performed by a true-case transducer 1201. The input to this transducer is a sequence of tokens labeled by a case pattern that specifies the case of each letter of the token as it appears in printed text. These case patterns are corrupted versions of true-case patterns that specify what the casing would be in the absence of typographical errors and arbitrary conventions (e.g., capitalization at the beginning of sentences). The task of the true-case transducer is to uncover the true-case patterns.

In some embodiments of the true-case transducer the case and true-case patterns are restricted to eight possibilities.

$$L^+ \ U^+ \ UL^+ \ ULUL^+ \ ULLUL^+ \ UUL^+ \ UUUL^+ \ LUL^+$$

Here U denotes an upper case letter, L a lower case letter, $U^+$ a sequence of one or more upper case letters, and $L^+$ a sequence of one or more lower case letters. In these embodiments, the true-case transducers can determine a true-case of an occurrence of a token in text using a simple method comprising the following steps:

1. Decide whether the token is part of a name. If so, set the true-case equal to the most probable true-case beginning with a U for that token.
2. If the token is not part of a name, then check if the token is a member of a set of tokens which have only one true-case. If so, set the true-case appropriately.
3. If the true-case has not been determined by steps 1 or 2, and the token is the first token in a sentence then set the true-case equal to the most probable true-case for that token.
4. Otherwise, set the true-case equal to the case for that token.

In an embodiment of the true-case transducer used for both English and French, names are recognized with a simple finite-state machine. This machine employs a list of 12,937 distinct common last names and 3,717 distinct common first names constructed from a list of 125 million full names obtained from the IBM online phone directory and a list of names purchased from a marketing corporation. It also uses lists of common precursors to names (such as Mr., Mrs., Dr., Mlle., etc.) and common followers to names (such as Jr., Sr., III, etc).

The set of tokens with only one true-case consists of all tokens with a case-pattern entropy of less than 1.25 bits, together with 9,506 Number of records in (o+p)8260.lcwtab English and 3,794 records in r8260.coerce(a+b+c) French tokens selected by hand from the tokens of a large bilingual corpus. The most probable case pattern for each English token was determined by counting token-case cooccurences in a 67 million word English corpus, and for each French token by counting cooccurences in a 72 million word French corpus. (In this counting occurrences at the beginnings of sentences are ignored).

Specialized Transformation Transducers (Brown et al. Section 3.2.4)

Referring still to FIG. 6, the transducer 1202 performs a few specialized transformations designed to systematize the tokenizing process. These transformations can include, but are not limited to, the correction of typographical errors, the expansion of contractions, the systematic treatment of possessive, etc. In one embodiment of this transducer for English, contractions such as don't are expanded to do not, and possessives such as John's and nurses' are expanded to John 's and nurses '. In one embodiment of this transducer for French, sequences such as s'il, qu'avez, and j'adore are converted to pairs of tokens such as si il, que avez, and je adore. In addition, a few thousand sequences such as afin de are contracted to strings such as afin_de. These sequences are obtained from a list compiled by a native French speaker who felt that such sequences should be treated as individual words. Also the four strings au, aux, du, and des are expanded to à le, à les, de le, and de les respectively.

Part-of-Speech Labeling Transducers (Brown et al. Section 3.2.5)

Referring again to FIG. 5, the transducer 1103 annotates words with part-of-speech labels. These labels are used by the subsequent transducers depicted the figure. In some embodiments of transducer 1103, part-of-speech labels are assigned to a word sequence using a technique based on hidden Markov models. A word sequence is assigned the most probable part-of-speech sequence according to a statistical model, the parameters of which are estimated from large annotated texts and other even larger un-annotated texts. The technique is fully explained in article by Bernard Merialdo entitled 'Tagging text with a Probabilistic Model' in the *Proceedings of the International Conference on Acoustics, Speech, and Signal Processing*, May 14–17, 1991. This article is incorporated by reference herein.

In an embodiment of the transducer 1103 for tagging of English, a tag set consisting of 163 parts of speech is used. A rough categorization of these parts of speech is given in Table 11.

In an embodiment of this transducer 1103 for the tagging of French, a tag set consisting of 157 parts of speech is used. A rough categorization of these parts of speech is given in Table 12.

TABLE 11

Parts of Speech for English

| | |
|---|---|
| 29 | Nouns |
| 27 | Verbs |
| 20 | Pronouns |
| 17 | Determiners |
| 16 | Adverbs |
| 12 | Punctuation |
| 10 | Conjunctions |
| 8 | Adjectives |
| 4 | Prepositions |
| 20 | Other |

TABLE 12

Parts-of-Speech for French

| | |
|---|---|
| 105 | Pronouns |
| 26 | Verbs |
| 18 | Auxiliaries |
| 12 | Determiners |
| 7 | Nouns |
| 4 | Adjectives |
| 4 | Adverbs |
| 4 | Conjunctions |
| 2 | Prepositions |
| 2 | Punctuation |
| 12 | Other |

Syntactic Transformation Transducers (Brown et al. Section 3.2.6)

Referring still to FIG. 5, the transducer 1104, which performs syntactic transformations, will be described.

One function of this transducer is to simplify the subsequent morphological transformations 1105. For example, in morphological transformations, verbs may be analyzed into a morphological unit designating accidence followed by another unit designating the root of the verb. Thus in French, the verb ira might be replaced by 3s_future_indicative aller, indicating that ira is the third person singular of the future tense of aller. The same kind of transformation can be performed in English by replacing the sequence will go by future_indicative to_go. Unfortunately, often the two words in such a sequence are separated by intervening words as in the sentences:

will he go play in the traffic?
he will not go to church.

Similarly, in French the third person of the English verb went is expressed by the two words est allé, and these two words can be separated by intervening words as in the sentences:

est-t-il allé?
Il n'est pas allé.

It is possible to analyze such verbs morphologically with simple string replacement rules if various syntactic transformations that move away intervening words are performed first.

A second function of the syntactic transducer 1104 is to make the task presented to the statistical models which generate intermediate target-structures for an intermediate source-structure as easy as possible. This is done by performing transformations that make the forms of these structures more similar. For example, suppose the source language is English and the target language is French. English adjectives typically precede the nouns they modify whereas French adjectives typically follow them. To remove this difference, the syntactic transducer 1104 includes a transducer which moves French words labeled as adjectives to positions proceeding the nouns which they modify.

These transducers only deal with the most rudimentary linguistic phenomena. Inadequacies and systematic problems with the transformations are overcome by the statistical models used later in the target hypothesis-generating module 702 of the invention. It should be understood that in other embodiments of the invention more sophisticated schemes for syntactic transformations with different functions can be used.

The syntactic transformations performed by the transducer 1104 are performed in a series of steps. A sequence of words which has been annotated with parts of speech is fed into the first transducer. This transducer outputs a sequence of words and a sequence of parts of speech which together serve as input to the second transducer in the series, and so forth. The word and part-of-speech sequences produced by the final transducer are the input to the morphological analysis transducer.

Syntactic Transducers for English (Brown et al. Section 3.2.7)

Figure 7:
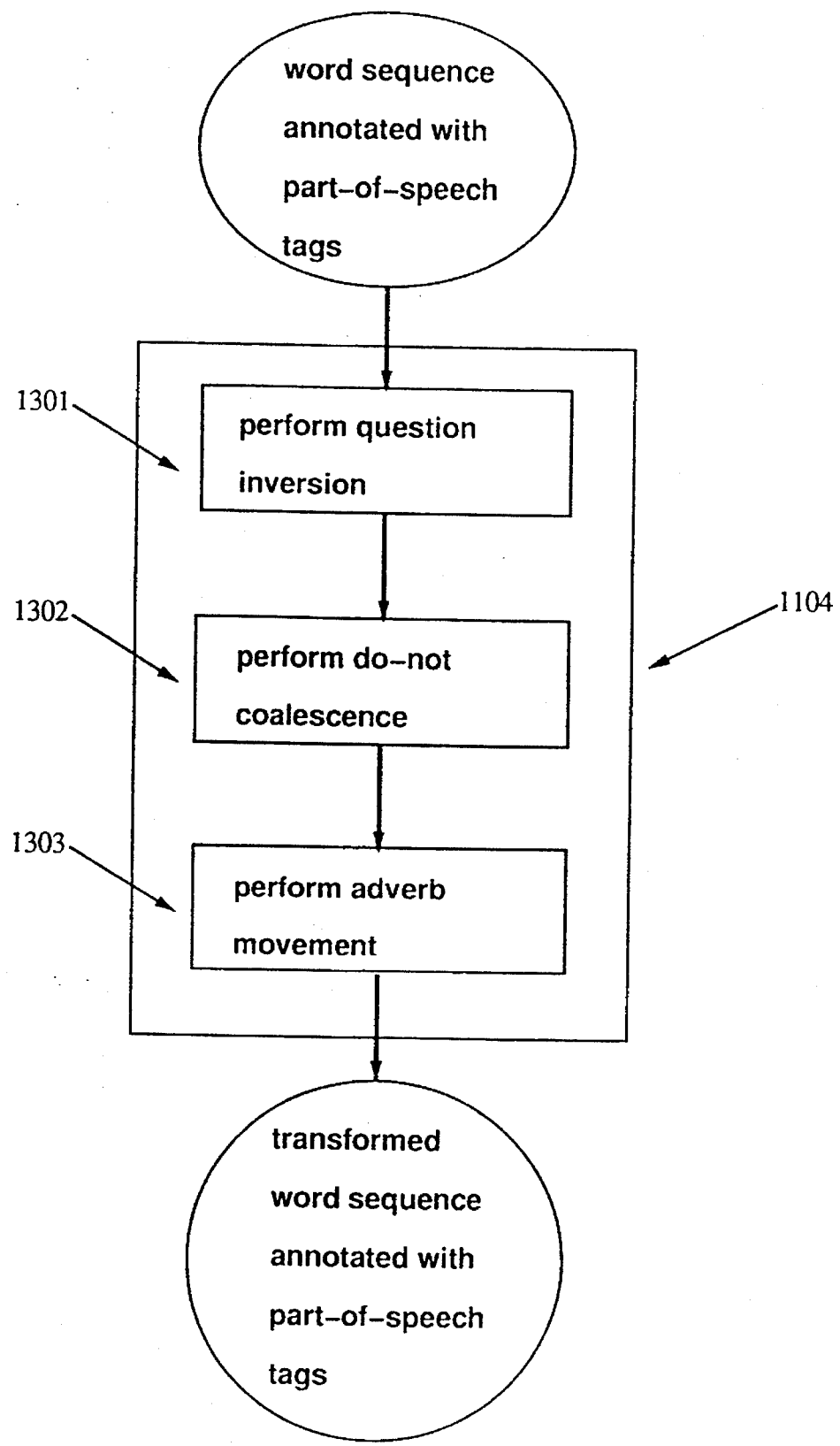
FIG. 7 is a schematic flow diagram of a syntactic transducer for English.

FIG. 7, depicts an embodiment of a syntactic transducer 1104 for English. Although in much of this document, examples are described in which the source language is French and the target language is English, here for reasons of exposition, an example of a source transducer for a source language of English is provided. In the next subsection, another example in which the source language is French is provided. Those with a basic knowledge of linguistics for other languages will be able to construct similar syntactic transducer for those languages.

The syntactic transducer in FIG. 7 is comprised of three transducer that perform question inversion 1301;
perform do-not coalescence 1302;
perform adverb movement 1303.

To understand the function of the transducer 1301 that performs question inversion, note that in English questions the first auxiliary verb is often separated by a noun phrase from the root of the verb as in the sentences:

does that elephant eat?
which car is he driving?

The transducer 1301 inverts the auxiliary verb with the subject of the sentence, and then converts the question mark to a special QINV marker to signal that this inversion has occurred. For example, the two sentences above are converted by this transducer to:

that elephant eats QINV
which car he is driving QINV

This transducer also removes supporting do's as illustrated in the first sentence.

To understand the function of the transducer 1302 that performs do-not coalescence, note that in English, negation requires the presence of an auxiliary verb. When one doesn't exist, an inflection of to do is used. The transducer 1302 coalesces the form of to do with not into the string do_not. For example,

*John does not like turnips.*
⇒ *John do_not like turnips.*

The part of speech assigned to the main verb, like above, is modified by this transducer to record the tense and person of to do in the input. When adverbs intervene in emphatic sentences the do_not is positioned after the intervening adverbs:

> John does really not like turnips.
> ⇒ John really do_not like turnips.

To understand the function of the final transducer 1303 that performs adverb movement, note that in English, adverbs often intervene between a verb and its auxiliaries. The transducer 1303 moves adverbs which intervene between a verb and its auxiliaries to positions following the verb. The transducer appends a number onto the adverbs it moves to record the positions from which they are moved. For example, > Iraq will probably not be completely balkanized.
> ⇒ Iraq will_be_en to_balkanized probably_M2 not_M2 completely_M3.

An M2 is appended to both probably and to not to indicate that they originally preceded the second word in the verbal sequence will be balkanized. Similarly, an M3 is appended to completely to indicate that it preceded the third word in the verbal sequence.

The transducer 1303 also moves adverbs that precede verbal sequences to positions following those sequences:

> John really eats like a hog.
> ⇒ John eats really_M1 like a hog.

This is done in order to place verbs close to their subjects.

Syntactic Transducers for French (Brown et al. Section 3.2.8)

Figure 8:
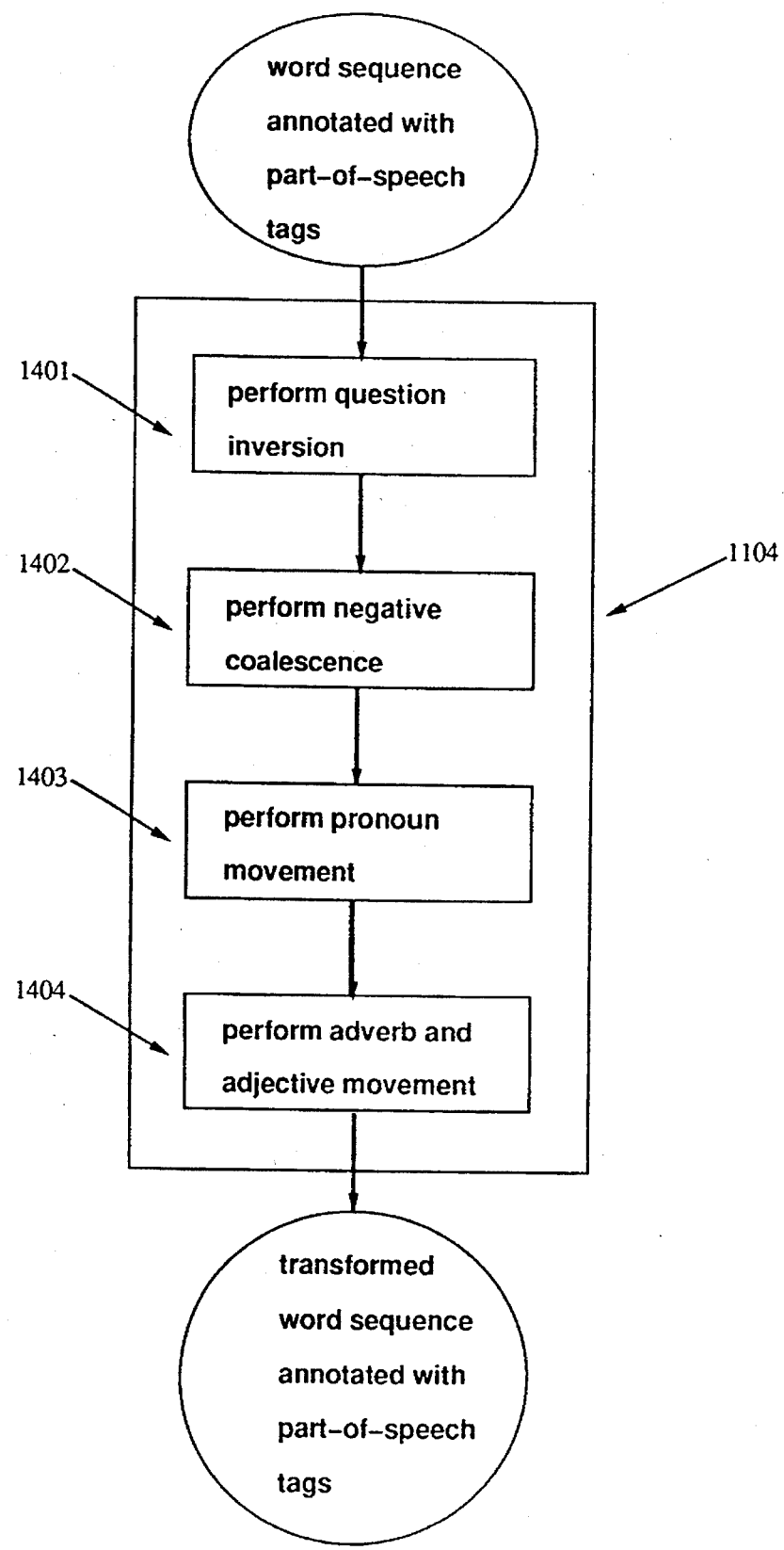
FIG. 8 is a schematic flow diagram of a syntactic transducer for French.

Referring now to FIG. 8, an embodiment of the syntactic transducer 1104 for French is described. This embodiment comprises four transducers that perform question inversion 1401;
perform discontinuous negative coalescence 1402;
perform pronoun movement 1403;
perform adverb and adjective movement 1404.

The question inversion transducer 1401 undoes French question inversion much the same way that the transducer 1301 undoes English question inversion:

> mangez-vous des légumes?
> ⇒ vous mangez des légumes QINV
>
> où habite-t-il?
> ⇒ où il habite QINV
>
> le lui avez-vous donné?
> ⇒ vous le lui avez donné QINV This transducer 1401 also modifies French est-ce que questions:

> est-ce qu'il mange comme un cochon?
> ⇒ il mange comme un cochon EST-CE_QUE

To understand the function of the transducer 1402, which performs negative coalescence, note that propositions in French are typically negated or restricted by a pair of words, ne and some other word, that surround the first word in a verbal sequence. The transducer 1402 moves the ne next to its mate, and then coalesces the two into a new word:

> je ne sais pas.
> ⇒ je sais ne_pas.
>
> Jean n'a jamais mangé comme un cochon.
> ⇒ Jean a ne_jamais mangé comme un cochon.
>
> il n'y en a plus.
> ⇒ il y en a ne_plus.

To understand the function of the transducer 1403, which performs pronoun movement, note that in French, direct-object, indirect-object and reflexive pronouns usually precede verbal sequences. The transducer 1403 moves these pronouns to positions following these sequences. It also maps these pronouns to new words that reflect their roles as direct-object or indirect-object, or reflexive pronouns. So, for example, in the following sentence le is converted to le_DPRO because it functions as a direct object and vous to vous_IPRO because it functions as an indirect object:

> je vous le donnerai.
> ⇒ je donnerai le_DPRO vous_IPRO.

In the next sentence, vous is tagged as a reflexive pronoun and therefore converted to vous_RPRO.

> vous vous lavez les mains.
> ⇒ vous lavez vous_RPRO les mains.

The allative pronominal clitic y and the ablative pronominal clitic en are mapped to the two-word tuples à y_PRO and de en_PRO:

> je y penserai.
> ⇒ je penserai à y_PRO.
>
> j'en ai plus.
> ⇒ je ai plus de en_PRO.

The final transducer 1404 moves adverbs to positions following the verbal sequences in which they occur. It also moves adjectives to positions preceding the nouns they modify. This is a useful step in embodiments of the present invention that translate from French to English, since adjectives typically precede the noun in English.

Morphological Transducers (Brown et al. Section 3.2.9)

Referring again to FIG. 5, a transducer 1105, which performs morphological transformations, will be described. One purpose of this transducer is to make manifest in the intermediate source-structure representation the fraternity of different forms of a word. This is useful because it allows for more accurate statistical models of the translation process. For example, a system that translates from French to English but does not use a morphological transducer can not benefit from the fact that sentences in which parle is translated as speaks provide evidence that parlé should be translated as spoken. As a result, parameter estimates for rare words are inaccurate even when estimated from a very large training sample. For example, even in a sample from the Canadian Parlement of nearly 30 million words of French text, only 24 of the 35 different spellings of single-word inflections of the verb parler actually occurred.

A morphological transducer 1104 is designed to ameliorate such problems. The output of this transducer is a sequence of lexical morphemes. These lexical morphemes will sometimes be referred to in this application as morphological units or simply morphs. In an embodiment of transducer 1104 used for English, inflection morphological transformations are performed that make evident common origins of different conjugations of the same verb; the singular and plural forms of the same noun; and the comparative and superlative forms of adjectives and adverbs. In an embodiment of transducer 1104 used for French, morphological inflectional transformations are performed that make manifest the relationship between conjugations of the same verb; and forms of the same noun or adjective differing in gender and number are performed. These morphological transformations are reflected in the sequence of lexical morphemes produced. The examples below illustrate the level of detail in these embodiments of a morphological transducer 1104:

> he was eating the peas more quickly than I.
> ⇒ he V_past_progressive to_eat the pea N_PLURAL
> quick er_ADV than I.
>
> nous en mangeons rarement.
> ⇒ nous V_present_indicative_1p manger rare ment_ADV
> de en_PRO
>
> ils se sont lavés les mains sales.
> ⇒ ils V_past_3p laver se_RPRO les sale main N_PLURAL.

Sense-Labelling Transducers (Brown et al. Section 3.2.10)

Referring again to FIG. 5, the transducer 1106, which annotates a lexical morph sequence produced by the transducer 1105 with part-of-speech labels, will be explained. Much of the allure of the statistical approach to transfer in machine translation is the ability of that approach to formally cope with the problem of lexical ambiguity. Unfortunately, statistical methods are only able to mount a successful attack on this problem when the key to disambiguating the translation of a word falls within the local purview of the models used in transfer.

Consider, for example, the French word prendre. Although prendre is most commonly translated as to take, it has a number of other less common translations. A trigram model of English can be used to translate Je vais prendre la décision as I will make the decision because the trigram make the decision is much more common than the trigram take the decision. However, a trigram model will not be of much use in translating Je vais prendre ma propre décision as I will make may own decision because in this case take and decision no longer fall within a single trigram.

In the paper, "Word Sense Disambiguation using Statistical Methods" in the proceedings of the 29th Annual Meeting of the Association for Computational Linguistics, published in June of 1991 by the Association of Computational Linguistics and incorporated by reference herein, a description is provided of a method of asking a question about the context in which a word appears to assign that word a sense. The question is constructed to have high mutual information with the translation of that word in its context. By modifying the lexical entries that appear in a sequence of morphemes to reflect the senses assigned to these entries, informative global information can be encoded locally and thereby made available to the statistical models used in transfer.

Although the method described in the aforementioned paper assigns senses to words, the same method applies equally well to the problem of assigning senses to morphemes, and is used here in that fashion. This transducer 1106, for example maps prendre to prendre_1 in the sentence Je vais prendre ma propre voiture.
but to prendre_2 in the sentence Je vais prendre ma propre décision.

It should be understood that other embodiments of the sense-labelling transducer are possible. For example, the sense-labelling can be performed by asking not just a single question about the context but a sequence of questions arranged in a decision tree.

Source-Transducers with Constraints (Brown et al. Section 3.3)

Figure 22:
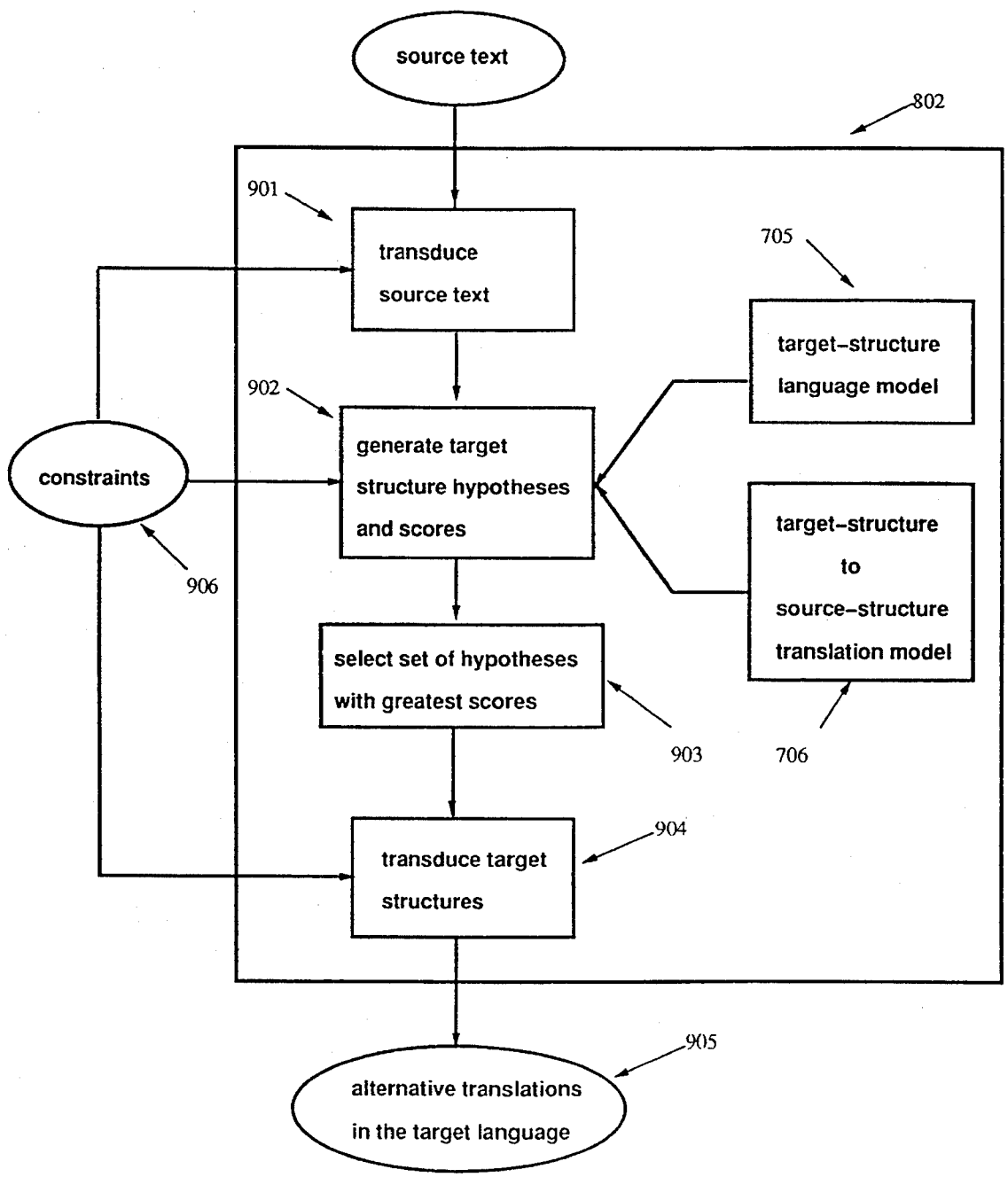
FIG. 22 is a schematic flow diagram of a translation component of a human-aided system.

In some embodiments, such as that depicted in FIG. 22, a source-structure transducer, such as that labelled 901, accepts a set of constraints that restricts its transformations source text to an intermediate target structure in source text.

Such constraints include, but are not limited to,

- requiring that a particular phrase be translated as a certain linguistic component of a sentence, such a noun-phrase;
- requiring that a source word be labelled as a certain part-of-speech such as a verb or determiner;
- requiring that a source word be morphologically analyzed a certain way;
- requiring that a source word be annotated with a particular sense label;
- in embodiments in which the intermediate structure encodes parse-tree or case-frame information, requiring a certain parse or case-frame structure for a sentence; morphologically analyzed in a particular way, or be annotated with a particular sense-label.

A source-transducer accepting such constraints in similar to source transducers as described in this section. Based on the description already given, such transducers can be constructed by a person with a computer science background and skilled in the art.

FINITE-STATE TRANSDUCERS (Brown et al. Section 4)

This section provides a description of an embodiment of a mechanism by which the syntactic transductions in step 1104 and the morphological transductions in step 1105 are performed. The mechanism is described in the context of a particular example depicted in FIG. 9. One with a background in computer science and skilled in the art of producing finite-state transducers can understand from this example how to construct syntactic and morphological transducers of the type described above.

The example transducer inverts questions involving do, does, and did. After steps 1101, 1102, and 1103, the source text Why don't you ever succeed? is transduced into parallel word and part-of-speech sequences 1501:

| why | do | not | you | ever | succeed | ? |
|-----|-----|-----|-----|------|---------|---|
| RRQ | VDO | XX | PPY | RR | VVO | ? |

Here, RRQ and RR are adverb tags, VD0 and VV0 are verb tags, XX is a special tag for the word not, PPY is a pronoun tag, and ? is a special tag for a question mark.

The example transducer converts these two parallel sequences to the parallel word and part-of-speech sequences 1502:

| why | you | succeed | do_not_MO | ever_Mi | QINV |
|-----|-----|---------|-----------|---------|------|
| RRQ | PPY | VV0 | XX | RR | QINV |

Here, QINV is a marker which records the fact that the original input sentence was question inverted.

Figure 10:
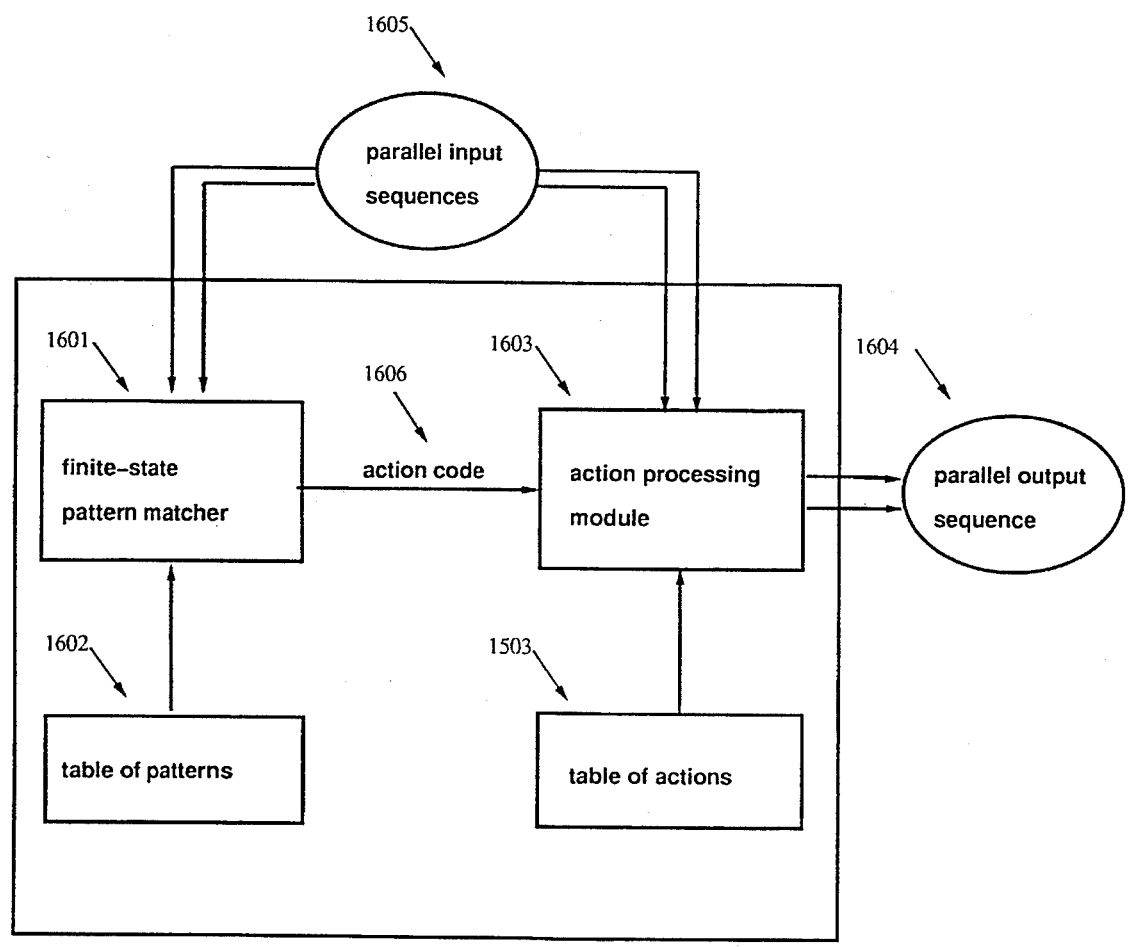
FIG. 10 is a schematic flow diagram illustrating the operation of a finite-state transducer.
Figure 13:
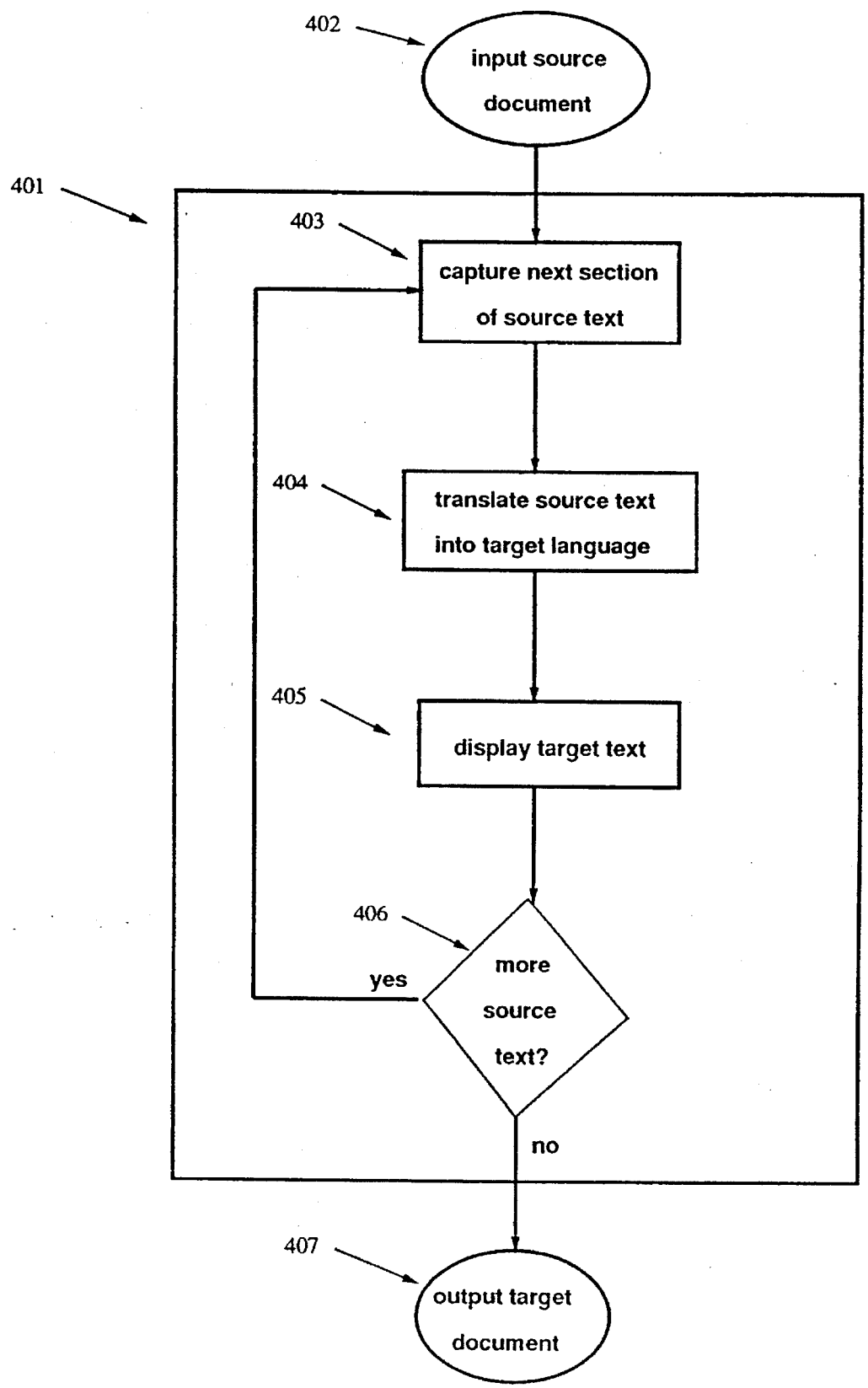
FIG. 13 is a schematic block diagram illustrating a manner in which statistical transfer can be incorporated into a translation system based on an interlingua.

A mechanism by which a transducer achieves this transformation is depicted in FIG. 10, and is comprised of four components:

a finite-state pattern matcher 1601;
an action processing module 1603;
a table of patterns 1602;
a table of action specifications 1503.

The transducer operates in the following way:

1. One or more parallel input sequences 1605 are captured by the finite-state pattern-matcher 1601;
2. The finite-state pattern-matcher compare the input sequences against a table of patterns 1602 of input sequences stored in memory;
3. A particular pattern is identified, and an associated action-code 1606 is transmitted to the action-processing module 1603;
4. The action-processing module obtains a specification of the transformation associated to this action code from a table of actions 1503 stored in memory;
5. The action-processing module applies the transformation to the parallel input streams to produce one or more parallel output sequences 1604.

The parallel input streams captured by the finite-state pattern matcher 1601 are arranged in a sequence of attribute tuples. An example of such a sequence is the input sequence 1501 depicted in FIG. 9. This sequence consists of a sequence of positions together with a set of one or more attributes which take values at the positions. A few examples of such attributes are the token attribute, the word attribute, the case-label attribute, the part-of-speech attribute, the sense-label attribute. The array of attributes for a given position will be called an attribute tuple.

Figure 9:
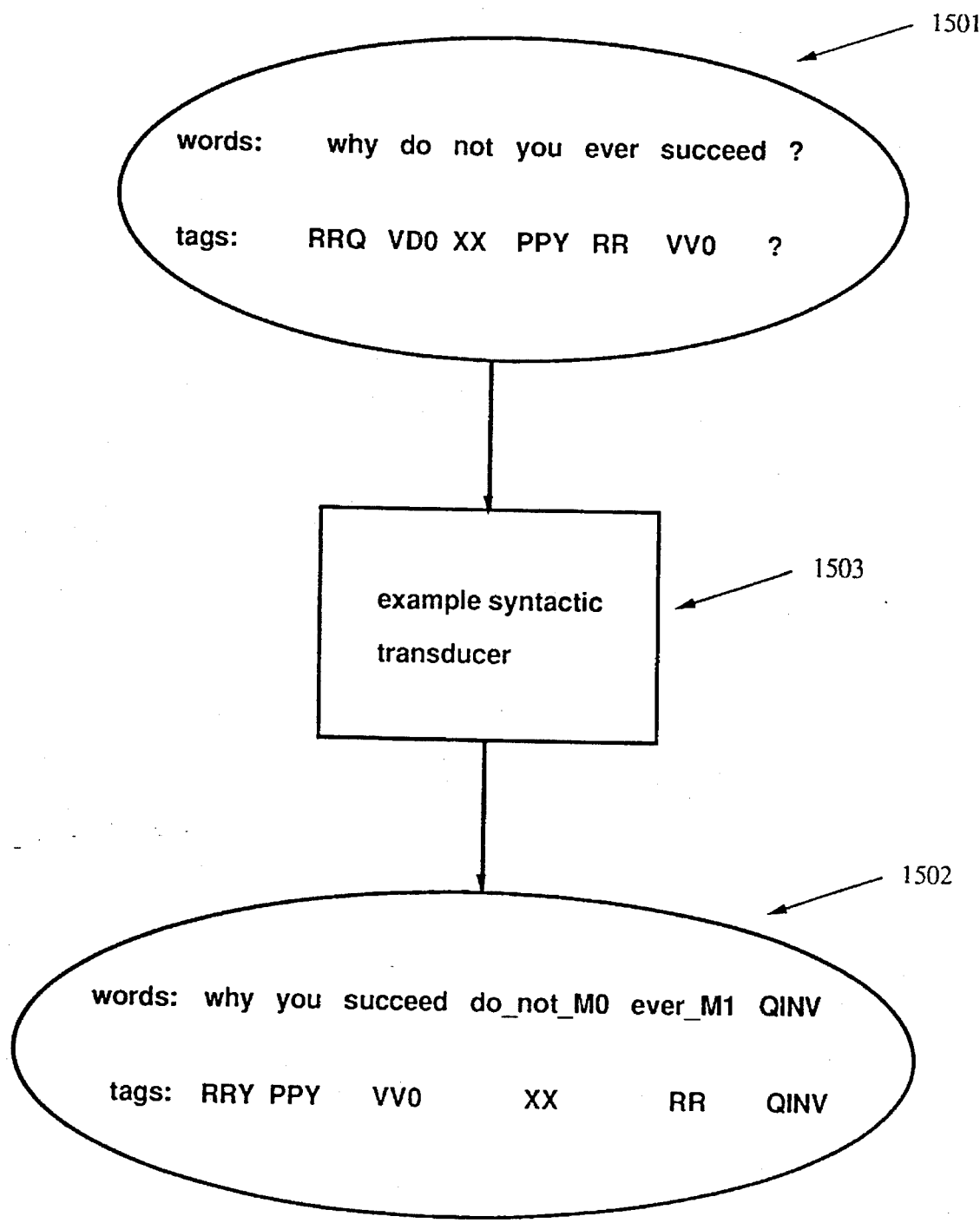
FIG. 9 is an example of a syntactic transduction.

For example, the input attribute tuple sequence 1501 in FIG. 9 is seven positions long and is made up of two dimensional attribute tuples. The first component of an attribute tuple at a given position refers to the word attribute. This attribute specifies the spellings of the words at given positions. For example, the first word in the sequence 1501 is why. The second component of an attribute tuple at a given position for this input sequence refers to a part-of-speech tag for that position. For example, the part of speech at the first position is RRQ. The attribute tuple at position 1 is thus the ordered pair why, RRQ.

The parallel output streams produced by the action processing module 1603 are also arranged as a sequence of attribute tuples. The number of positions in an output sequence may be different from the number of positions in an input sequence.

For example, the output sequence 1502 in FIG. 9, consists of six positions. Associated with each position is a two-dimensional attribute tuple, the first coordinate of which is a word attribute and the second coordinate of which is a part-of-speech attribute.

An example of a table of patterns 1602 is shown in FIG. 11. This table is logically divided into a number of parts or blocks.

Pattern-Action Blocks. The basic definitions of the matches to be made and the actions to be taken are contained in pattern-action blocks. A pattern-action block comprises of a list of patterns together with the name of actions to be invoked when patterns in an input attribute-tuple sequence 1605 are matched.

Auxiliary Pattern Blocks. Patterns that can be used as sub-patterns in the patterns of pattern-action blocks are defined in Auxiliary Pattern blocks. Such blocks contain lists of labelled patterns of of attributes tuples. These labelled patterns do not have associated actions, but can be referenced by their name in the definitions of other patterns.

In FIG. 11 there is one Auxiliary Pattern block. This block defines four auxiliary patterns. The first of these has a name ADVERB and matches single tuple adverb-type constructions. The second has a name of BARE_NP and matches certain noun-phrase-type constructions. Notice that this auxiliary pattern makes use of the ADVERB pattern in its definition. The third and fourth auxiliary patterns match other types of noun phrases.

Set Blocks. Primary and auxiliary patterns allow for sets of attributes. In FIG. 11, for example, there is a set called DO_SET, of various forms of to_do, and another set PROPER_NOUN_TAG of proper-noun tags.

Patterns are defined in terms of regular expressions of attribute tuples. Any pattern of attribute tuples that can be recognized by a deterministic finite-state automata can be specified by a regular expression. The language of regular expressions and methods for constructing finite-state automata are well known to those skilled in computer science. A method for constructing a finite-state pattern matcher from a set of regular expressions is described in the article "LEX—A Lexical Analyzer Generator," written by Michael E. Lesk, and appearing in the Bell Systems Technical Journal, Computer Science Technical Report Number 39, published in October of 1975.

Regular expressions accepted by the pattern matcher 1601 are described below.

Regular Expressions of Attribute Tuples: A regular expression of attribute tuples is a sequence whose elements are either 1. an attribute tuple;
2. the name of an auxiliary regular expression; or
3. a register name.

These elements can be combined using one of the logical operations:

| Operator | Meaning | Usage | Matches |
|----------|---------|-------|---------|
| . | concatenation | A.B | A followed by B |
| \| | union (i.e. or) | A\|B | A or B |
| * | 0 or more | A* | 0 or more A's |
| ? | 0 or 1 | A? | 0 or 1 A's |
| + | 1 or more | A+ | 1 or more A's |

Here A and B denote other regular expressions.

Examples of these logical operations are:

| Expression | Matches |
|---|---|
| A?.B.C | 0 or 1 A's followed by B then by C |
| (A*)\|(B+) | 0 or more A's or 1 or more B's |
| (A\|B).C | A or B, followed by C |

Attribute Tuples: The most common type of element in a regular expression is an attribute tuple. An attribute tuple is a vector whose components are either 1. an attribute (as identified by its spelling);
2. a name of a set of attributes;
3. the wild card attribute.

These elements are combined using the following operators:

| Operator | Meaning | Usage |
|---|---|---|
| , | Delimiter between coordinates of an attribute tuple | a,b |
| ^ | Negation | ^a |
| # | Wild Card | # |

(Here a and b denote attribute spellings or attribute set names).

The meanings of these operators are best illustrated by example. Let a, b, and c denote either attribute spellings or set names. Assume the dimension of the attribute tuples is 3. Then:

| Attribute Tuple | Matches |
|---|---|
| a,b,c | First attribute matches a, second match b, third matches c |
| ,b,c | First attribute elided (matches anything), Second attribute matches b, third matches c |
| ,b, | First and third attribute elided (match anything) Second attribute matches b |
| a | Second and third attributes elided (Match anything) First matches a |
| #,b, | First attribute wild-card (i.e matches anything) Second attribute matches b. Third attribute elided |
| a, ^b, ^c | Second attribute matches anything EXCEPT b. Third matches anything EXCEPT c. |

Auxiliary Regular Expressions: A second type of element in a regular expression is an auxiliary regular expression. An auxiliary regular expression is a labelled regular expression which is used as a component of a larger regular expression.

Logically, a regular expression involving auxiliary regular expressions is equivalent to the regular expression obtained by resolving the reference to the auxiliary pattern. For example, suppose an auxiliary regular expression named D has been defined by:

$$D = A.B+.A*$$

where A,B denote attribute tuples (or other auxiliary patterns). Then:

| Expression | is equivalent to |
|---|---|
| C.D | C.A.B+.A* |
| D+.C.D | (A.B+.A*)+.A.B+.A*.C.A*.B+.A* |

Registers: Just knowing that a regular expression matches an input attribute tuple sequence usually does not provide enough information for the construction of an appropriate output attribute tuple sequence. Data is usually also required about the attribute tuples matched by different elements of the regular expression. In ordinary LEX, to extract this type of information often requires the matched input sequence to be parsed again. To avoid this cumbersome approach, the pattern-matcher 1601 makes details about the positions in the input stream of the matched elements of the regular expression more directly available. From these positions, the identities of the attribute tuples can then be determined.

Positional information is made available through the use of registers. A register in a regular expression does not match any input. Rather, 1. After a match, a register is set equal to the position in the input sequence of the next tuple in the input sequence that is matched by an element of the regular expression to the right of the register.
2. If no further part of the regular expression to the right of the register matches, then the register is set equal to zero.

The operation of registers is best illustrated by some examples. These examples use registers [1] and [2]:

| Expression | Contents of Registers after match | | |
|---|---|---|---|
| A.[1].B.C | Reg 1: | First position of B match | |
| A.[2].(C\|D) | Reg 2: | First position of either C or D match | |
| A.[1].B*.[2].C | Reg 1: | If B matches: | First position of B match |
| | | Otherwise: | First position of C match |
| | Reg 2: | First position of C match | |
| A.[1].B*.C* | Reg 1: | If B matches: | First position of B match |
| | | If C matches: | First position of C match |
| | | Otherwise: | 0 |
| | Reg 2: | If C matches: | First position of C match |
| | | Otherwise: | 0 |

A pattern-action block defines a pattern matcher. When an input attribute-tuple sequence is presented to the finite-state pattern matcher a current input position counter is initialized to 1 denoting that the current input position is the first position of the sequence. A match at the current input position is attempted for each pattern. If no pattern matches, an error occurs. If more than one pattern matches, the match of the longest length is selected. If several patterns match of the same longest length, the one appearing first in the definition of the pattern-action block is selected. The action code associated with that pattern is then transmitted to the action processing module 1603.

Transformations by the action processing module are defined in a table of actions 1503 which is stored in memory. The actions can be specified in specified in any one of a number of programming languages such as C, PASCAL, FORTRAN, or the like.

Figure 18:
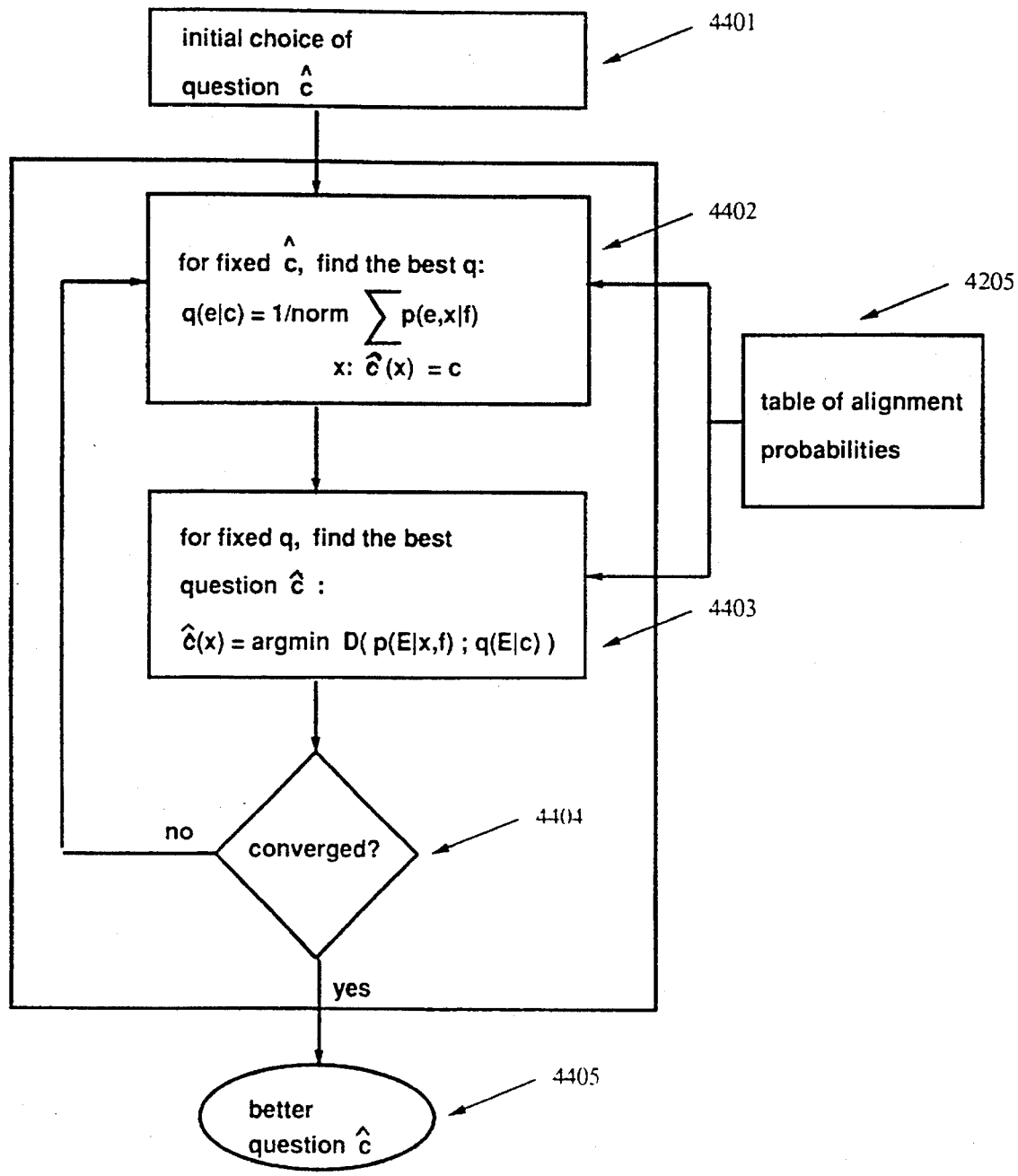
FIG. 18 is a schematic flow diagram of a method for determining a good question about an informant.

In the question-inversion example, the action specified in the pseudo-code in FIG. 18 is invoked when the pattern defined by the regular expression in lines 3–4 is matched. This action inverts the order of the words in certain questions involving forms of do. An instance of this action is shown in FIG. 9. In the pseudo-code of FIG. 12 for this action, the symbol @reg(i) denotes the contents of register i. In line 6 of this pseudo-code, the output attribute tuple sequence is set to null.

A question matched by the regular expression in lines 3–4 may or may not begin with a (so-called) wh- word in the set WH_NP. If it does match, the appropriate action is to append the input tuple in the first position to the output sequence. This is done in lines 8–9.

After the wh-word, the next words of the output sequence should be the subject noun phrase of the input sequence. This is made so in line 11–12 that appends all tuples matching the regular expression SUBJECT_NP to the output sequence.

For negative questions involving forms of do, the part-of-speech tag of the output verb and of the output adverbs are the same as those of the input verb and adverbs. Thus the entire input tuple sequences corresponding to these words can be appended to the output. This is done in lines 15–18.

For positive questions the tag attribute of the output verb may be different than that of the input verb. This is handled in lines 25–37. The input word attribute for the verb is appended to the output word attribute in lines 26 and 31 and 35. The output tag attribute is selected based on the form of do in the input sequence. Explicit tag values are appended to the output sequence in lines 32 and 37.

The remaining input words and tags other than the question mark are written to the output sequence in lines 43–44. The input sequence is completed in line 46 by the marker QINV signalling question inversion, together with the appropriate tag.

SENSE DISAMBIGUATION (Brown et al. Section 11)

Introduction (Brown et al. Section 11.1)

Figure 50:
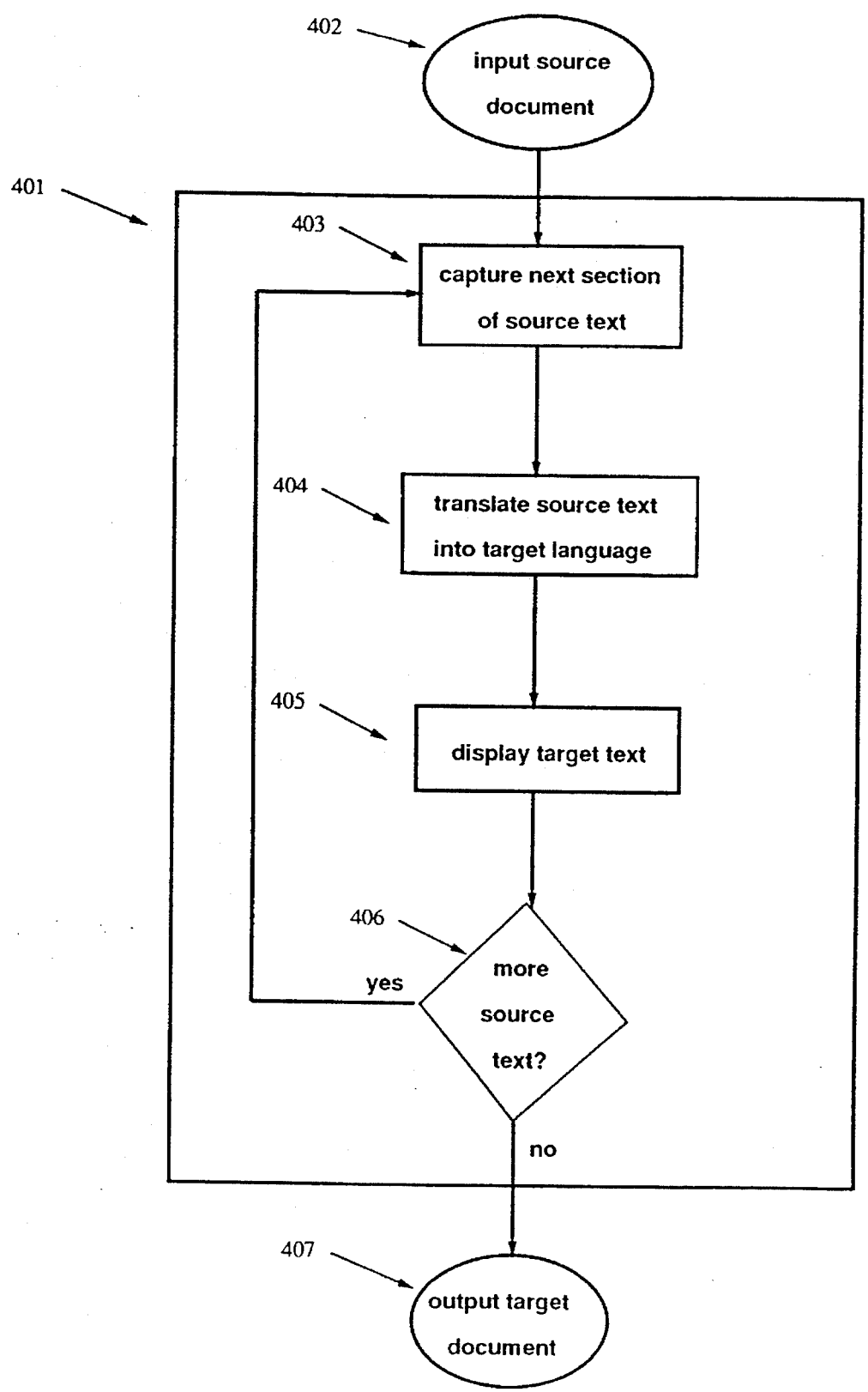
FIG. 50 is a schematic flow diagram of a basic system operating in batch mode.

An alluring aspect of the statistical approach to machine translation is the systematic framework it provides for attacking the problem of lexical disambiguation. For example, an embodiment of the machine translation system depicted in FIG. 50 translates the French sentence Je vais prendre la décision as I will make the decision, correctly interpreting prendre as make. Its statistical translation model, which supplies English translations of French words, prefers the more common translation take, but its trigram language model recognizes that the three-word sequence make the decision is much more probable than take the decision.

This system is not always so successful. It incorrectly renders Je vais prendre ma propre décision as I will take may own decision. Its language model does not realize that take my own decision is improbable because take and decision no longer fall within a single trigram.

Errors such as this are common because the statistical models of this system only capture local phenomena; if the context necessary to determine a translation falls outside the scope of these models, a word is likely to be translated incorrectly. However, if the relevant context is encoded locally, a word can be translated correctly.

As has been noted in Section 3, such encoding can be performed in the source-transduction phase 701 by a sense-labeling transducer.

In this section, the operation and construction of such a sense-labeling transducer is described. The goal of this transducer is to perform cross-lingual word-sense labeling. That is, this transducer labels words of a sentence in a source language so as to elucidate their translations into a target language. Such a transducer can also be used to label the words of an target sentence so as to elucidate their translations into a source language.

The design of this transducer is motivated by some examples. In some contexts the French verb prendre translates into English as to take, but in other contexts it translates as to make. A sense disambiguation transformation, by examining the contexts, might label occurrences of prendre that likely mean to take with one label, and other occurrences of prendre with another label. Then the uncertainty in the translation of prendre given the label would be less than the uncertainty in the translation of prendre without the label. Although the label does not provide any information that is not already present in the context, it encodes this information locally. Thus a local statistical model for the transfer of labeled sentences should be more accurate than one for the transfer of unlabeled ones.

While the translation of a word depends on many words in its context, it is often possible to obtain information by looking at only a single word. For example, in the sentence Je vais prendre ma propre décision (I will make may own decision), the verb prendre should be translated as make because its object is décision. If décision is replaced by voiture then prendre should be translated as take: Je vais prendre ma propre voiture (I will take my own car). Thus the uncertainty in the translation of prendre is reduced by asking a question about its object, which is often the first noun to its right. A sense can be assigned to prendre based upon the answer to this question.

As another example, in Il doute que les nôtres gagnent (He doubts that we will win), the word il should be translated as he. On the other hand, if doute is replaced by faut then il should be translated as it: Il faut que les nôtres gagnent (It is necessary that we win). Here, a sense label can be assigned to il by asking about the identity of the first verb to its right.

These examples motivate a sense-labeling scheme in which the label of a word is determined by a question about an informant word in its context. In the first example, the informant of prendre is the first noun to the right; in the second example, the informant of il is the first verb to the right. The first example is depicted in FIG. 14. The two sequence of this example are labeled 4001 and 4002 in the figure.

If more than two senses are desired for a word, then questions with more than two answers can be considered.

Design of a Sense-Labeling Transducer (Brown et al. Section 11)

Figure 15:
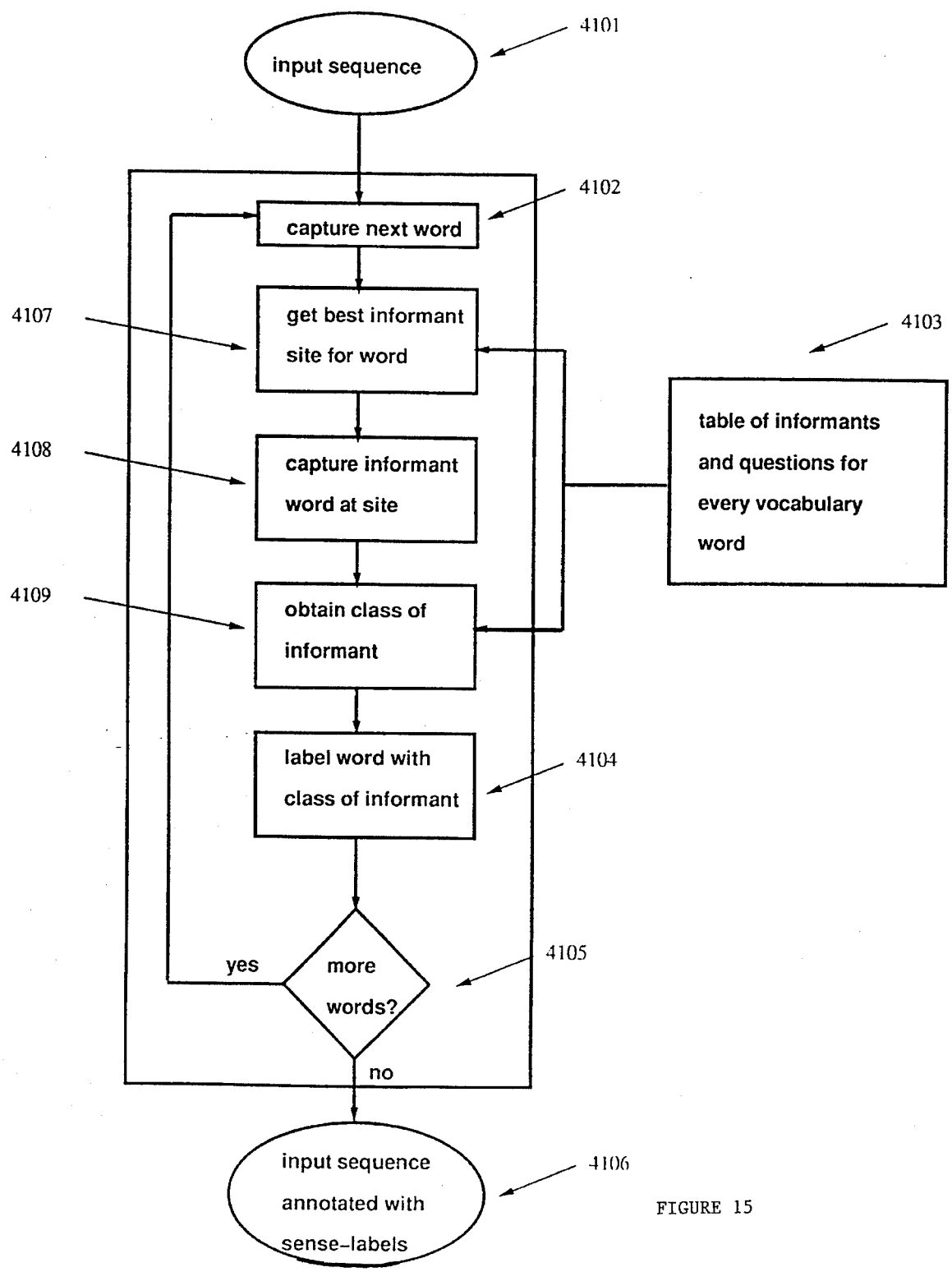
FIG. 15 is a schematic flow diagram illustrating the operation of a sense-labelling transducer.

FIG. 15 depicts an embodiment of a sense-labeling transducer based on this scheme. For expositional purposes, this embodiment will be discussed in the context of labeling words in a source language word sequence. It should be understood that in other embodiments, a sense-labeling transducer can accept as input more involved source-structure representations, including but not limited to, lexical morpheme sequences. In these embodiments, the constituents of a representation of a source word sequence are annotated by the sense-labeling transducer with labels that elucidate their translation into analogous constituents into a similar representation of a target word sequence. It should also be understood that in still other embodiments, a sense-labeling transducer annotates, target-structure representations, (not source-structure representations) with sense labels.

The operation of the embodiment of the sense-labeling transducer depicted in FIG. 15 comprises the steps of:

4101. Capturing an input sequence consisting of a sequence of words in a source language;

4102. For each word in the input sequence performing the Steps 4107, 4108, 4109, 4104 until no more words are available in Step 4105;

4107. For the input word being considered, finding a best informant site such as the noun to the right, the verb to the left, etc. A best informant for a word is obtained using a table 4103 stored in memory of informants and questions about the informants for every word in the source language vocabulary;

4108. Finding the word at the best informant site in the input word sequence;

4109. Obtaining the class of the informant word as given by the answer to a question about the informant word;

4104. Labeling the original input word of the input sequence with the class of the informant word.

For the example depicted in FIG. 14, the informant site determined by Step 4107 is the noun to the right. For the first word sequence 4001 of this example, the informant word determined by Step 4108 is décision; for the second word sequence 4109, the informant word is voiture. In this example, the class of décision determined in Step 4109 is different than the class of voiture. Thus the label attached to prendre by Step 4104 is different for these two contexts of prendre.

Constructing a Table of Informants and Questions (Brown et al. Section 11.3)

An important component of the sense-labeler depicted in FIG. 15 is a table 4103 of informants and questions for every word in a source language vocabulary.

Figure 16:
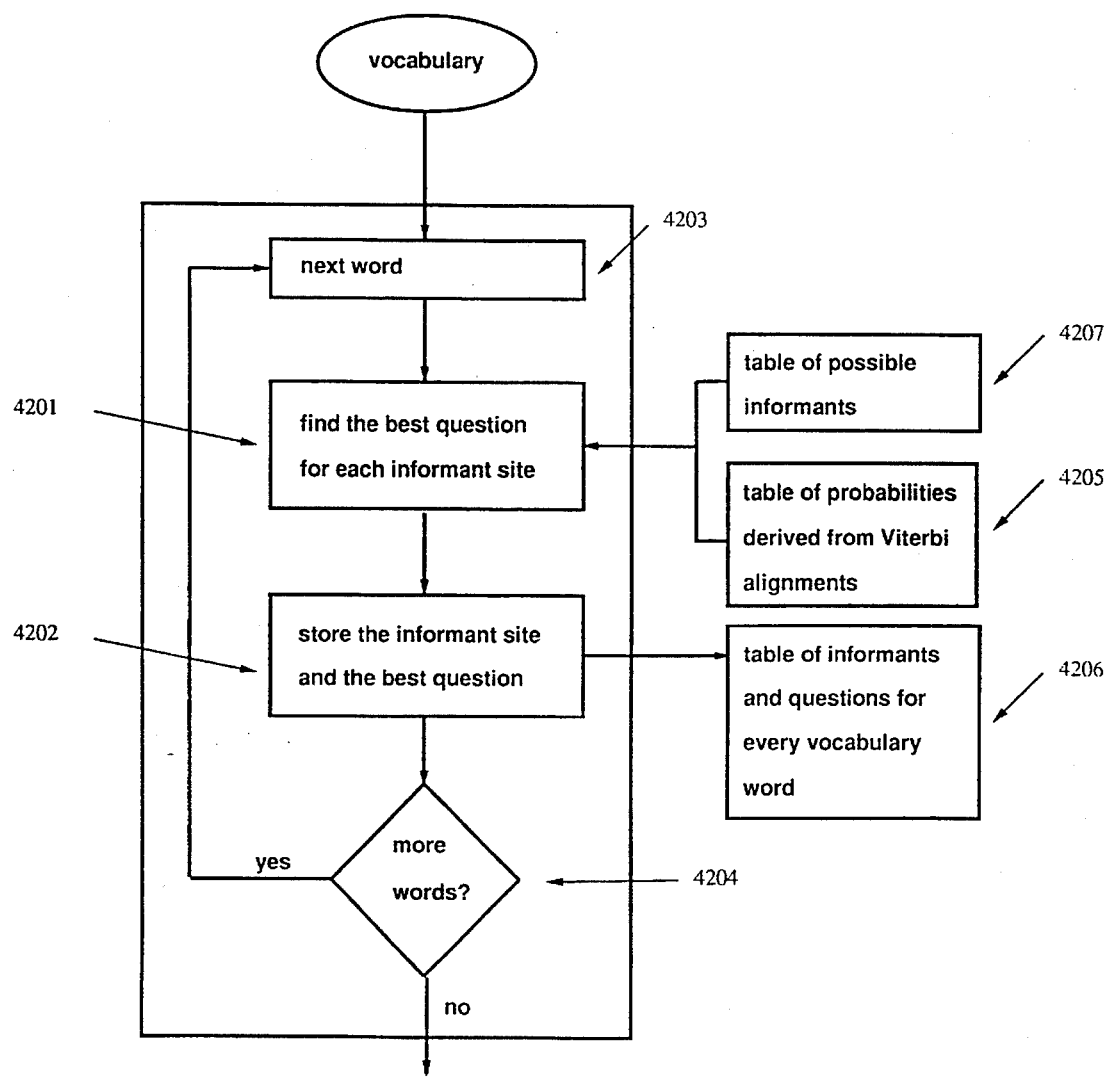
FIG. 16 is a schematic flow diagram of a module that determines good questions about informants for each vocabulary word.

FIG. 16 depicts a method of constructing such a table. This method comprises the steps of:

4203. Performing the Steps 4201 and 4202 for each word in a source language vocabulary.

4201. For the word being considered, finding a good question for each of a plurality of informant sites. These informant sites are obtained from a table 4207 stored in memory of possible informant sites. Possible sites include but are not limited to, the nouns to the right and left, the verbs to the right and left, the words to the right and left, the words two positions to the right or left, etc. A method of finding a good question is described below. This method makes use of a table 4205 stored in memory probabilities derived from Viterbi alignments. These probabilities are also discussed below.

4202. Storing in a table 4208 of informants and questions, the informant site and the good question.

Figure 17:
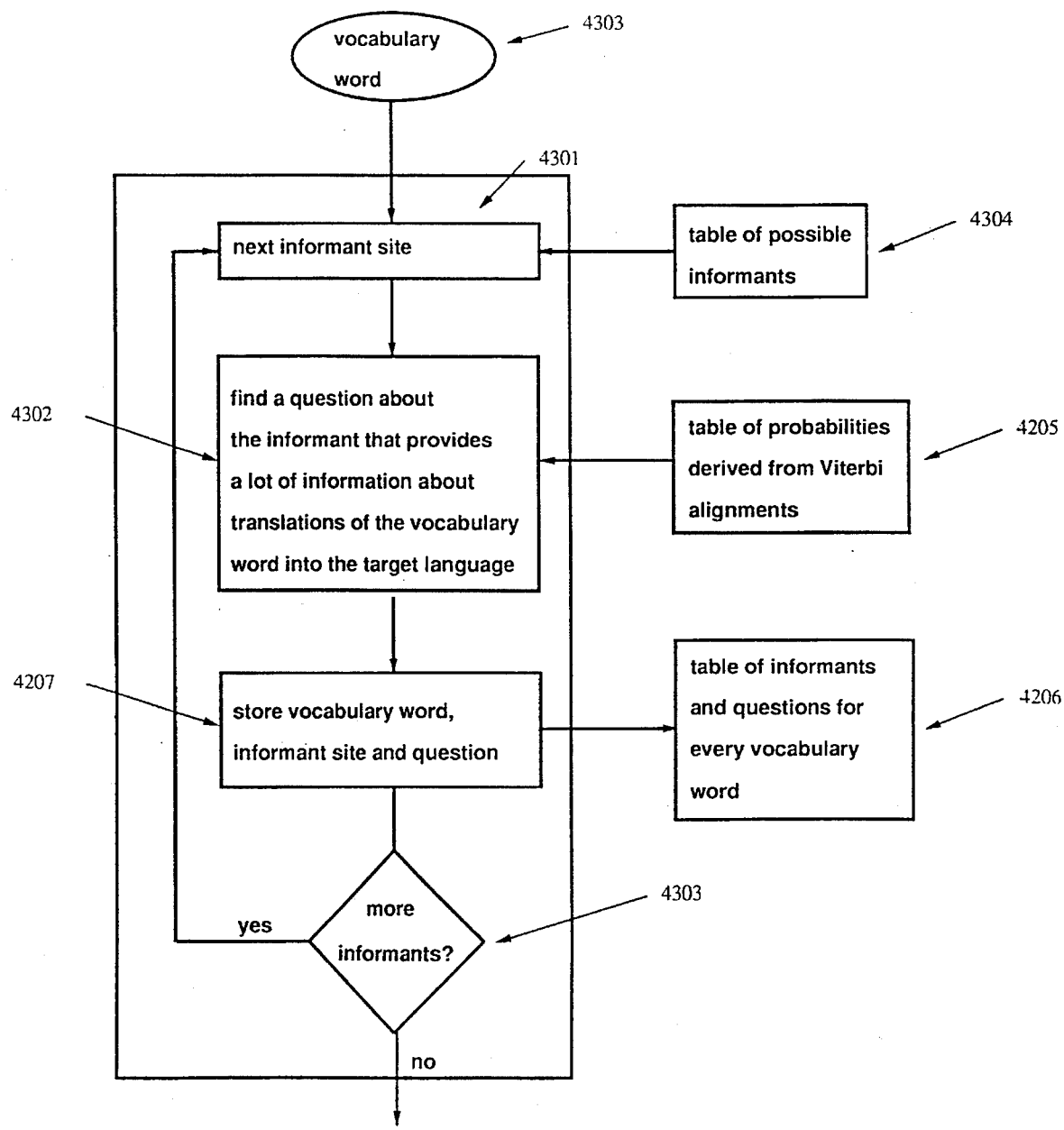
FIG. 17 is a schematic flow diagram of a module that determines a good question about each informant of a vocabulary word.

A method for carrying out the Step 4201 for finding a good question for each informant site of a vocabulary word is depicted in FIG. 17. This method comprises the steps of:

4301. Performing the Steps 4302 and 4207 for each possible informant site. Possible informant sites are obtained from a table 4304 of such sites.

4302. For the informant site being considered, finding a question about informant words at this site that provides a lot of information about translations of the vocabulary word into the target language.

4207. Storing the vocabulary word, the informant site, and the good question in a table 4103.

Mathematics of Constructing Questions (Brown et al. Section 11.4)

A method for carrying out the Step 4302 of finding a question about an informant is depicted in FIG. 18. In this subsection, the some preliminaries for describing this method are given. The notation used here is the same as that used in Sections 8–10.

Statistical Translation with Transductions (Brown et al. Section 11.4.1)

Figure 19:
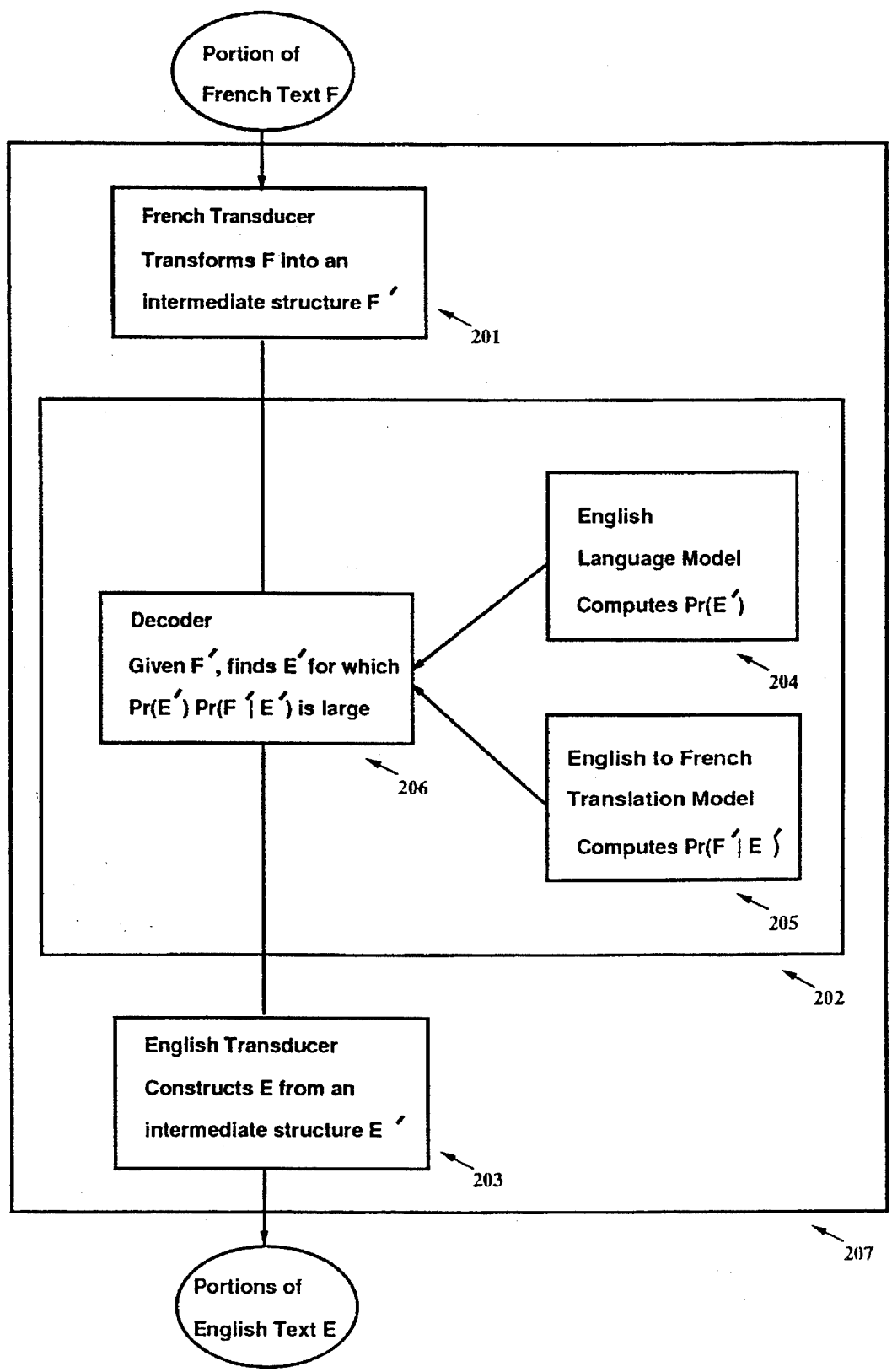
FIG. 19 is a schematic block diagram of a simplified French to English translation system which incorporates analysis and synthesis.

Recall the setup depicted in FIG. 19. A system shown there employs

1. A source transducer 201 which encodes a source sentence f into an intermediate structure f'.
2. A statistical translation component 202 which translates f' into a corresponding intermediate target structure e'. This component incorporates a language model, a translation model, and a decoder.
3. A target transducer 203 which reconstructs a target sentence e from e'.

For statistical modeling, the target-transduction transformation 203 e'→e is sometimes required to be invertible. Then e' can be constructed from e and no information is lost in the transformation.

The purpose of source and target transduction is to facilitate the task of the statistical translation. This will be accomplished if the probability distribution Pr(f',e') is easier to model then the original distribution Pr(f,e). In practice this means that e' and f' should encode global linguistic facts about e and f in a local form.

A useful gauge of the success that a statistical model enjoys in modeling translation from sequences of source words represented by a random variable F, to sequences of target words represented by a random variable E, is the cross entropy[3]

[3] In this equation and in the remainder of this section, the convention of using uppercase letters (e.g. E) for random variables and lower case letters (e.g. e) for the values of random variables continues to be used.

$$H(E|F) \equiv -\frac{1}{S} \Sigma_s \log P(e^{(s)}|f^{(s)}). \tag{165}$$

The cross entropy measures the average uncertainty that the model has about the target language translation e of a source language sequence f. Here P(e|f) is the probability according to the model that e is a translation of f and the sum runs over a collection of all S pairs of sentences in a large corpus comprised of pairs of sentences with each pair consisting of a source and target sentence which are translations of one another (See Sections 8–10).

A better model has less uncertainty and thus a lower cross entropy. The utility of source and target transductions can be measured in terms of this cross entropy. Thus transformations f→f' and e'→e are useful if models P'(f'|e') and P'(e') can be constructed such that H(E'|F')<H(E|F).

Sense-Labeling in Statistical Translation (Brown et al. Section 11.4.2)

The remainder of this section is devoted to describing methods for constructing a sense-labeling transducer. In this case the following setup prevails:

The Intermediate Structures. Intermediate structures e' and f' consist of sequences of words labeled by their senses. Thus f' is a sentence over the expanded vocabulary whose 'words' f' are pairs (f,s) where f is a word in the original source vocabulary and s is its sense label. Similarly, e' is a sentence over the expanded vocabulary whose words e' are pairs (e,s) where e is a target word and s is its sense label.

Source and target transductions. For each source word and each target word, an informant site, such as first noun to the left is chosen, and an n-ary question about the value of the informant at that site is also chosen. A source-transduction transformation f→f' and an inverse target-transduction transformation e→e' map a sentence to the intermediate structure in which each word is labeled by a sense, determined by the question about its informant. A target-transduction transformation e'→e maps a labeled sentence to a sentence in which the labels have been removed.

The probability models. A translation model such as one of the models in Sections 8–10 is used for both P'(F'|E') and for P(F|E). A trigram language model such as that discussed in Section 6 is used for both P(E) and P'(E').

The Viterbi Approximation (Brown et al. Section 11.4.3)

The probability P(f|e) computed by the translation model requires a sum over alignments as discussed in detail in Sections 8–10. This sum is often too expensive to compute directly since the number of alignments increases exponentially with sentence length. In the mathematical considerations of this Section, this sum will be approximated by the single term corresponding to the alignment v(f|e), with greatest probability. This is the Viterbi approximation already discussed in Sections 8–10 and v(f|e) is the Viterbi alignment.

Let c(f|e) be the expected number of times that e is aligned with f in the Viterbi alignment of a pair of sentences drawn at random from a large corpus of training data. Let c(φ|e) be the expected number of times that e is aligned with φ words. Then $$c(f|e) = \frac{1}{S} \sum_s c(f|e; v(f^{(s)}|e^{(s)}))  \quad (166)$$

$$c(\phi,e) = \frac{1}{S} \sum_s c(\phi|e; v(f^{(s)}|e^{(s)})).$$

where c(f|e;v) is the number of times that e is aligned with f in the alignment A, and c(φ|e;v) is the number of times that e generates φ target words in A. The counts above are also expressible as averages with respect to the model:

$$c(f|e) = \sum_{f,e} P(f,e)c(f|e; v(f|e)) \quad (167)$$

$$c(\phi|e) = \sum_{f,e} P(f,e)c(\phi|e; v(f|e)).$$

Probability distributions p(e,f) and p(φ,e) are obtained by normalizing the counts c(f|e) and c(φ|e):

$$p(f,e) = \frac{1}{norm} c(f|e) \qquad p(\phi,e) = \frac{1}{norm} c(\phi,e). \quad (168)$$

[4] In these equations and in the remainder of the paper, the generic symbol $$\frac{1}{norm}$$

is used to denote a normalizing factor that converts counts to probabilities. The actual value of $$\frac{1}{norm}$$

will be implicit from the context. Thus, for example, in the left hand equation of (168), the normalizing factor is norm = $\Sigma_{f,e}c(f|e)$ which equals the average length of source sentences. In the right hand equation of (168), the normalizing factor is the average length of target sentences.

(These are the probabilities that are stored in a table of probabilities 4205.) The conditional distributions p(f|e) and p(φ|e) are the Viterbi approximation estimates for the parameters of the model. The marginals satisfy $$\sum_\phi p(\phi,e) = u(e) \sum_e p(f,e) = u(f) \quad (169)$$

$$\sum_f p(f,e) = \frac{1}{norm} \bar{\phi}(e)u(e)$$

where u(e) and u(f) are the unigram distributions of e and f and $\bar{\phi}(e) = \Sigma_\phi p(\phi|e)\phi$ is the average number of source words aligned with e. These formulae reflect the fact that in any alignment each source word is aligned with exactly one target word.

Cross Entropy (Brown et al. Section 11.4.4)

In this subsection the cross entropies H(E|F) and H(E'|F') are expressed in terms of the information between source and target words.

In the Viterbi approximation, the cross entropy H(F|E) is given by $$H(F|E) = m\{H(E|F) + H(\Phi|E)\}, \quad (170)$$

where m is the average length of the source sentences in the training data, and H(F|E) and H(Φ|E) are the conditional entropies for the probability distributions p(f,e) and p(φ,e):

$$H(F|E) = -\sum_{f,e} p(f,e)\log p(f|e) \quad (171)$$

$$H(\Phi|E) = -\sum_{e,\phi} p(\phi,e)\log p(\phi|e).$$

A similar expression for the cross entropy H(E|F) will now be given. Since $$P(f,e) = P(f|e)P(e),$$

this cross entropy depends on both the translation model, P(f|e), and the language model, P(e). With a suitable additional approximation, $$H(E|F) = m\{H(\Phi|E) - I(E,F)\} + H(E) \quad (172)$$

where H(E) is the cross entropy of P(E) and I(F,E) is the mutual information between f and e for the probability distribution p(f,e).

The additional approximation required is, $$H(F) \approx mH(F) \equiv -m\sum_f p(f)\log p(f), \quad (173)$$

where p(f) is the marginal of p(f,e). This amount to approximating P(f) by the unigram distribution that is closest to it in cross entropy. Granting this, formula (172) is a consequence of (170) and of the identities $$H(E|F) = H(E,F) - H(F) + H(E),$$

$$H(F) = H(F|E) + I(F,E). \quad (174)$$

Next consider H(E'|F'). Let e→e' and f→f' be sense labeling transformations of the type discussed above. Assume that these transformations preserve Viterbi alignments; that is, if the words e and f are aligned in the Viterbi alignment for (f,e), then their sensed versions e' and f' are aligned in the Viterbi alignment for (f',e'). It follows that the word translation probabilities obtained from the Viterbi alignment satisfy $p(f,e) = \Sigma_{f' \in f} p(f',e) = \Sigma_{e' \in e} p(f,e')$, where the sums range over the sensed versions f' of f and the sensed versions e' of e.

By applying (172) to the cross entropies H(E|F), H(E|F'), and H(E'|F'), it is not hard to verify that $$H(E|F') = H(E|F) - m\sum_f p(f)I(E,F'|f), \quad (175)$$

-continued $$H(E|F) = H(E|F) - m \sum_e p(e)\{I(F,E'|e) + I(\Phi,E'|e)\}.$$

Here $I(E,F'|f)$ is the conditional mutual information given a source word f between its translations E and its sensed versions F'; $I(F,E'|e)$ is the conditional mutual information given a target word e between its translations F and its sensed versions E'; and $I(\Phi, E'|e)$ is the conditional mutual information given e between $\Phi$ and its sensed versions E'.

Selecting Questions (Brown et al. Section 11.5)

The method depicted in FIG. 18 for finding good informants and questions for sensing is now described.
Source Questions (Brown et al. Section 11.5.1)

For sensing source sentences, a question about an informant is a function $\hat{c}$ from the source vocabulary into the set of possible senses. If the informant of f is x, then f is assigned the sense $\hat{c}(x)$. The function $\hat{c}(x)$ is chosen to minimize the cross entropy $H(E|F')$. From formula (175), this is equivalent to maximizing the conditional mutual information $I(F',E|f)$ between E and F'

$$I(F',E|f) = \sum_{e,x} p(e,x|f) \log \frac{p(e,\hat{c}(x)|f)}{p(e|f)p(\hat{c}(x)|f)}, \quad (176)$$

where p(f,e,x) is the probability distribution obtained by counting the number of times in the Viterbi alignments that e is aligned with f and the value of the informant of f is x, $$p(f,e,x) = \frac{1}{norm} \sum_s c(f|e,x|v(f^U,e^{(f)})) \quad (177)$$

$$p(f,e,c) = \frac{1}{norm} \sum_{x:\hat{c}(x)=c} p(f,e,x).$$

An exhaustive search for the best $\hat{c}$ requires a computation that is exponential in the number of values of x and is not practical. In the aforementioned paper entitled "Word-Sense Disambiguation using Statistical Methods" by P. F. Brown, et al., a good $\hat{c}$ is found using the flip-flop method which is only applicable if the number of senses is restricted to two. Here a different method that can be used to find $\hat{c}$ for any number of senses is described. This method uses the technique of alternating minimization, and is similar to the k-means method for determining pattern clusters and to the generalized Lloyd method for designing vector quantizers.

The method is based on the fact that, up to a constant independent of $\hat{c}$, the mutual information $I(F',E|f)$ can be expressed as an infimum over conditional probability distributions $q(E|c)$, $$I(F',E|f) = \inf_q \sum_x p(x)D(p(E|x,f); q(E|\hat{c}(x)) + \text{constant} \quad (178)$$

where $$D(p(E); q(E)) = \sum_e p(e) \log \frac{p(e)}{q(e)}. \quad (179)$$

The best value of the information is thus an infimum over both the choice for $\hat{c}$ and the choice for the q. This suggests the iterative method, depicted in 4401 for obtaining a good $\hat{c}$. This method comprises the steps of:

4401. Beginning with an initial choice of $\hat{c}$;

4404. Performing Steps 4402 and 4403 until no further increase in $I(F',E|f)$ results;

4403. For given q, finding the best $\hat{c}$:

$$\hat{c}(x) = \text{argmin}_c D(p(E|x,f); q(E|c));$$

4402. For this $\hat{c}$, finding the best q:

$$q(e|c) = \frac{1}{norm} \sum_{x:\hat{c}(x)=c} p(e,x|f).$$

Target Questions (Brown et al. Section 11.5.2)

For sensing target sentences, a question about an informant is a function $\hat{c}$ from the target vocabulary into the set of possible senses. $\hat{c}$ is chosen to minimize the entropy $H(E'|F)$. From (175) this is equivalent to maximizing the sum $$I(F,E'|e)+I(\Phi,E'|e).$$

In analogy to (179), $$I(F,E'|e) + I(\Phi,E'|e) = \quad (180)$$

$$\inf_{q_1,q_2} \sum_x p(x)\{D(p(F|x,e); q_1(F|\hat{c}(x)) + D(p(\Phi|x,e); q_2(\Phi|\hat{c}(x))\}.$$

Again a good $\hat{c}$ is obtained alternating minimization.

Generalizations (Brown et al. Section 11.6)

The method of sense-labeling discussed above ask a single question about a single word of context. In other embodiments of the sense labeler, this question is the first question in a decision tree. In still other embodiments, rather than using a single informant site to determine the sense of a word, questions from several different informant sites are combined to determine the sense of a word. In one embodiment, this is done by assuming that the probability of an informant word $x_i$ at informant site i, given a target word e, is independent of an informant word $x_j$ at a different informant site j given the target word e. Also, in other embodiments, the intermediate source and target structure representations are more sophisticated than word sequences, including, but not limited to, sequences of lexical morphemes, case frame sequences, and parse tree structures.

Table 1 shows a hypothetical example of an input series of source words according to the invention. In this example, the source words are French words.

TABLE 1

| Input Series of Source Words, F | | | | | |
|---|---|---|---|---|---|
| $f_1$ | $f_2$ | $f_3$ | $f_4$ | $f_5$ | $f_6$ |
| La | clef | est | dans | la | porte . |

The translation apparatus according to the present invention further comprises a target hypothesis generator 12. The target hypothesis generator 12 generates at least two target hypotheses. Each target hypothesis comprises a series of target words selected from a vocabulary of words in the second language. The vocabulary of words in the second language may be stored in a target language vocabulary store 14. Each target word in a target hypothesis has a context comprising at least one other word in the target hypothesis.

An example of a target hypothesis generator is described in Section 14 of Brown et al, cited above, which is incorporated herein by reference, and set forth in full herein at this time.

HYPOTHESIS SEARCH—STEPS 702 AND 902
(Brown et al. Section 14)

Overview of Hypothesis Search (Brown et al. Section 14.1)

Figure 20:
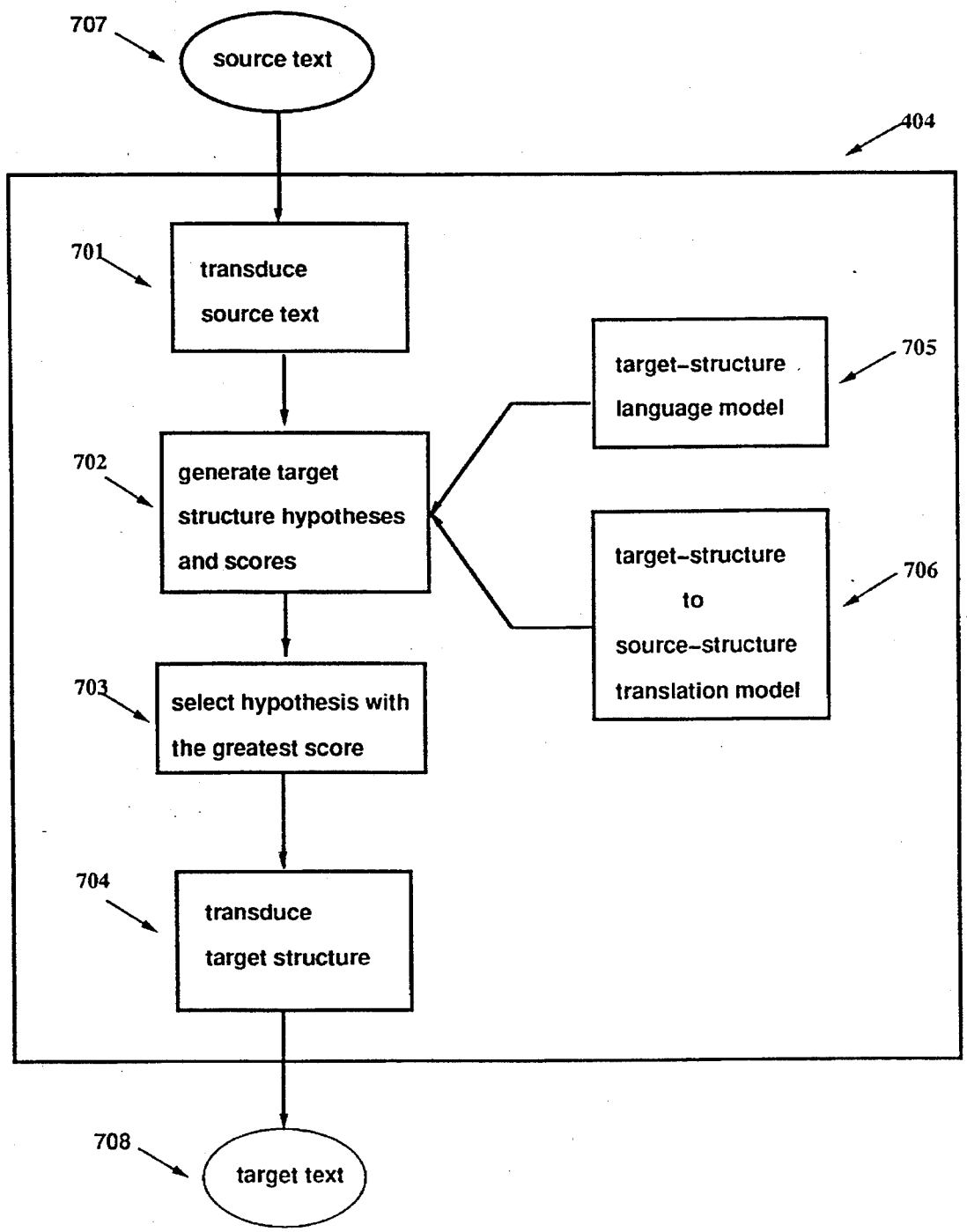
FIG. 20 is a schematic flow diagram of a translation component of a batch system.

Referring now to FIG. 20, the second step 702 produces a set of hypothesized target structures which correspond to putative translations of the input intermediate source structure produced by step 701. The process by which these target structures are produced is referred to as hypothesis search. In a preferred embodiment target structures correspond to sequences of morphemes. In other embodiments more sophisticated linguistic structures such as parse trees or case frames may be hypothesized.

An hypothesis in this step 702 is comprised of a target structure and an alignment of a target structure with the input source structure. Associated with each hypothesis is a score. In other embodiments a hypothesis may have multiple alignments. In embodiments in which step 701 produces multiple source structures an hypothesis may contain multiple alignments for each source structure. It will be assumed here that the target structure comprised by a hypothesis contains a single instance of the null target morpheme. The null morphemes will not be shown in the figures pertaining to hypothesis search, but should be understood to be part of the target structures nonetheless. Throughout this section on hypothesis search, partial hypothesis will be used interchangeably with hypothesis, partial alignment with alignment, and partial target structure with target structure.

Figure 21:
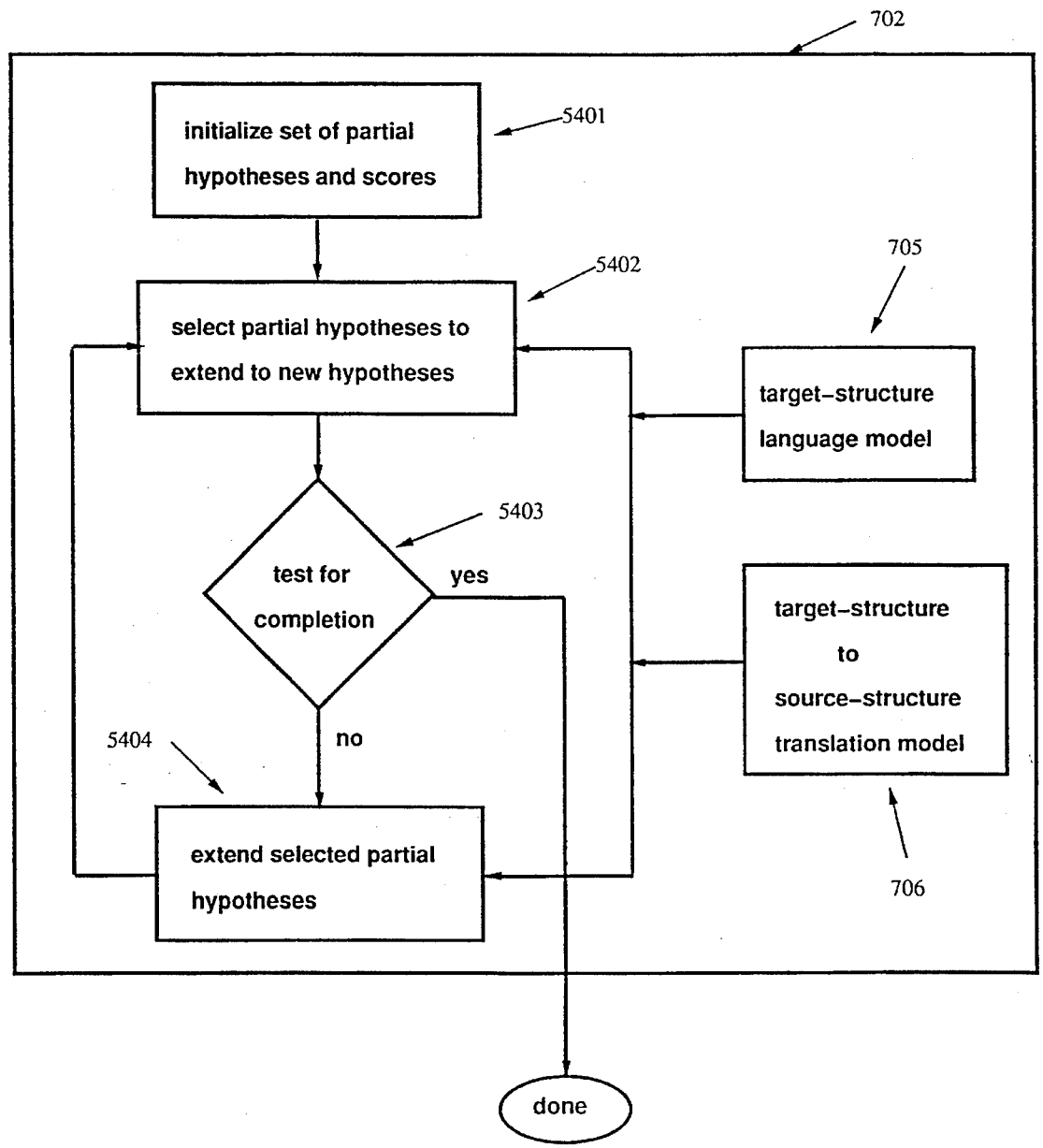
FIG. 21 is a schematic flow diagram of the hypothesis search component of the system.

The target structures generated in this step 702 are produced incrementally. The process by which this is done is depicted in FIG. 21. This process is comprised of five steps.

A set of partial hypotheses is initialized in step 5401. A partial hypothesis is comprised of a target structure and an alignment with some subset of the morphemes in the source structure to be translated. The initial set generated by step 5401 consists of a single partial hypothesis. The partial target structure for this partial hypothesis is just an empty sequence of morphemes. The alignment is the empty alignment in which no morphemes in the source structure to be translated are accounted for.

The system then enters a loop through steps 5402, 5403, and 5404, in which partial hypotheses are iteratively extended until a test for completion is satisfied in step 5403. At the beginning of this loop, in step 5402, the existing set of partial hypotheses is examined and a subset of these hypotheses is selected to be extended in the steps which comprise the remainder of the loop. In step 5402 the score for each partial hypothesis is compared to a threshold (the method used to compute these thresholds is described below). Those partial hypotheses with scores greater than threshold are then placed on a list of partial hypotheses to be extended in step 5404. Each partial hypothesis that is extended in step 5404 contains an alignment which accounts for a subset of the morphemes in the source sentence. The remainder of the morphemes must still be accounted for. Each extension of an hypothesis in step 5404 accounts for one additional morpheme. Typically, there are many tens or hundreds of extensions considered for each partial hypothesis to be extended. For each extension a new score is computed. This score contains a contribution from the language model as well as a contribution from the translation model. The language model score is a measure of the plausibility a priori of the target structure associated with the extension. The translation model score is a measure of the plausibility of the partial alignment associated with the extension. A partial hypothesis is considered to be a full hypothesis when it accounts for the entire source structure to be translated. A full hypothesis contains an alignment in which every morpheme in the source structure is aligned with a morpheme in the hypothesized target structure. The iterative process of extending partial hypotheses terminates when step 5402 produces an empty list of hypotheses to be extended. A test for this situation is made on step 5403.

This method for generating target structure hypotheses can be extended to an embodiment of step 902 of FIG. 22, by modifying the hypothesis extension step 5404 in FIG. 21, with a very similar step that only considers extensions which are consistent with the set of constraints 906. Such a modification is a simple matter for one skilled in the art.

Hypothesis Extension 5404 (Brown et al. Section 14.2)

This section provides a description of the method by which hypotheses are extended in step 5404 of FIG. 21. Examples will be taken from an embodiment in which the source language is French and the target language is English. It should be understood however that the method described applies to other language pairs.

Types of Hypothesis Extension (Brown et al. Section 14.2.1)

There are a number of different ways a partial hypothesis may be extended. Each type of extension is described by working through an appropriate example. For reasons of exposition, the method described in this section assigns scores to partial hypotheses based on Model 3 from the section entitled Translation Models and Parameter Estimation. One skilled in the art will be able to adopt the method described here to other models, such as Model 5, which is used in the best mode of operation.

A partial hypothesis is extended by accounting for one additional previously unaccounted for element of the source structure. When a partial hypothesis $H_1$ is extended to some other hypothesis $H_2$, the score assigned to $H_2$ is a product of the score associated with $H_1$ and a quantity denoted as the extension score. The value of the extension score is determined by the language model, the translation model, the hypothesis being extended and the particular extension that is made. A number of different types of extensions are possible and are scored differently. The possible extension types and the manner in which they are scored is illustrated in the examples below.

Figure 23:
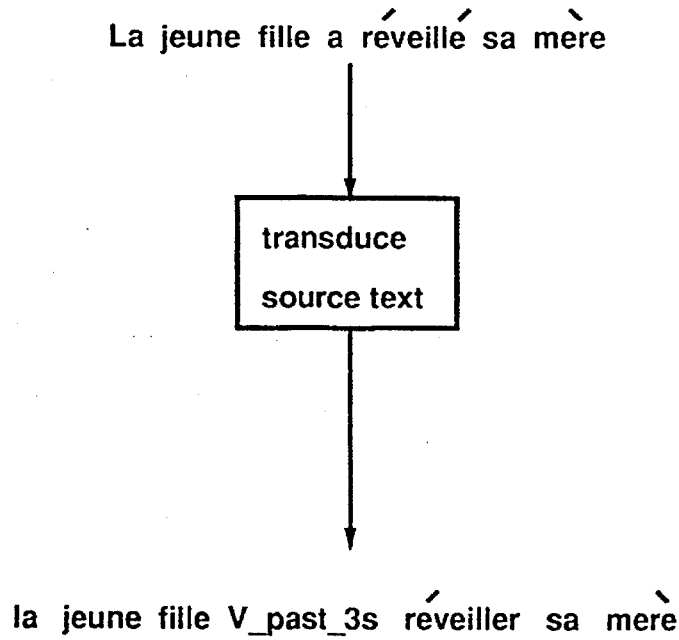
FIG. 23 is an example of a source sentence being transduced to a sequence of morphemes.

As depicted in FIG. 23, in a preferred embodiment, the French sentence La jeune fille a reveillé sa mère is transduced in either step 701 of FIG. 20 or step 901 of FIG. 22 into the morphological sequence la jeune fille V_past_3s sa mère.

Figure 24:
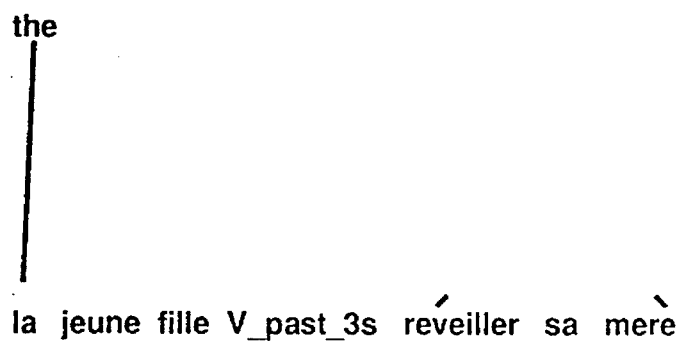
Figure 49:
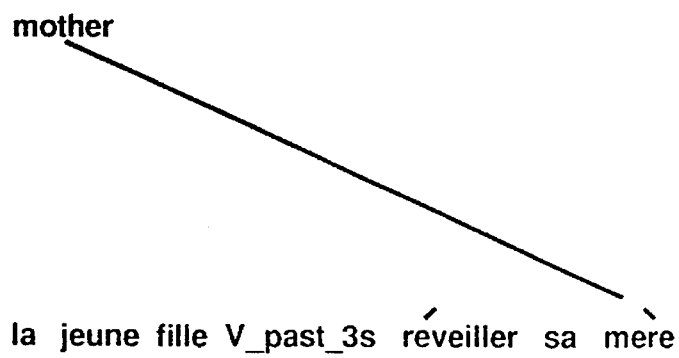
FIG. 49 is an example of a partial hypothesis which results from an extension by the target morpheme mother.

The initial hypothesis accounts for no French morphemes and the score of this hypothesis is set to 1. This hypothesis can be extended in a number of ways. Two sample extensions are shown in FIGS. 24 and 49. In the first example in FIG. 24, the English morpheme the is hypothesized as accounting for the French morpheme la. The compound of the score associated with this extension is the equal to $l(\text{the}|*,*)n(1|\text{the})t(\text{la}|\text{the})d(1|1).$ (182)

Here, * is a symbol which denotes a sequence boundary, and the factor l(the|*,*) is the trigram language model parameter that serves as an estimate of the probability that the English morpheme the occurs at the beginning of a sentence. The factor n(1|the) is the translation model parameter that is an estimate of the probability that the English morpheme the has fertility 1, in other words, that the English morpheme the is aligned with only a single French morpheme. The factor t(la|the) is the translation model parameter that serves as an estimate of the lexial probability that the English morpheme the translates to the French morpheme la. Finally, the factor d(1|1) is the translation model parameter that serves as an estimate of the distortion probability that a French morpheme will be placed in position 1 of the French structure given that it is aligned with an English morpheme that is in position 1 of the English structure. In the second example in FIG. 49, the English morpheme mother is hypothesized as accounting for the French morpheme mère. The score for this partial hypothesis is $l(\text{mother}|*,*)n(1|\text{mother})t(\text{mère}|\text{mother})d(7|1).$ (183)

Here, the final factor d(7|1) serves as an estimate of the distortion probability that a French morpheme, such as mère, will be place in the 7th position in a source sequence given that it is aligned with an English morpheme such as mother which is in the 1st position in an hypothesized target sequence.

Figure 25:
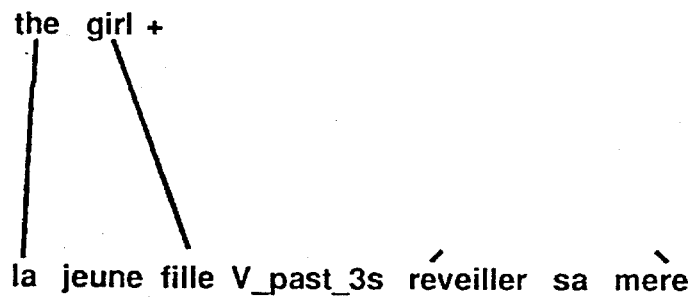
FIG. 25 is an example of a partial hypothesis which results from an extension with an open target morpheme.

Now, suppose the partial hypothesis in FIG. 24 is to be extended on some other invocation of step 5404. A common translation of the pair of French morphemes jeune fille is the English morpheme girl. However, since in a preferred embodiment a partial hypothesis is extended to account for only a single French morpheme at a time, it is not possible to account for both jeune and fille with a single extension. Rather the system first accounts for one of the morphemes, and then on another round of extensions, accounts for the other. This can be done in two ways, either by accounting first for jeune or by accounting first for fille. FIG. 25 depicts the extension that accounts first for fille. The + symbol in FIG. 25 after the the English morpheme girl denotes the fact that in these extensions girl is to be aligned with more French morphemes than it is currently aligned with, in this case, at least two. A morpheme so marked is referred to as open. A morpheme that is not open is said to be closed. A partial hypothesis which contains an open target morpheme is referred to as open, or as an open partial hypothesis. A partial hypothesis which is not open is referred to as closed, or as a closed partial hypothesis. An extension is referred to as either open or closed according to whether or not the resultant partial hypothesis is open or closed. In a preferred embodiment, only the last morpheme in a partial hypothesis can be designated open. The score for the extension in FIG. 25 is $$l(\text{girl}|*,\text{the})2 \left( \sum_{i=2}^{25} n(i|\text{girl}) \right) t(\text{fille}|\text{girl})d(3|2).$$ (184)

Here, the factor l(girl|*,the) is the language model parameter that serves as an estimate of the probability with which the English morpheme girl is the second morpheme in a source structure in which the first morpheme is the. The next factor of 2 is the combinatorial factor that is discussed in the section entitled Translation Models and Parameter Estimation. It is factored in, in this case, because the open English morpheme girl is to be aligned with at least two French morphemes. The factor n(i|girl) is the translation model parameter that serves as an estimate of the probability that the English morpheme girl will be aligned with exactly i French morphemes, and the sum of these parameters for i between 2 and 25 is an estimate of the probability that girl will be aligned with at least 2 morphemes. It is assumed that the probability that an English morpheme will be aligned with more than 25 French morphemes is 0. Note that in a preferred embodiment of the present invention, this sum can be precomputed and stored in memory as a separate parameter. The factor t(fille|girl) is the translation model parameter that serves as an estimate of the lexical probability that one of the French morphemes aligned with the English morpheme girl will be the French morpheme fille. Finally, the factor d(3|2) is the translation model parameter that serves as an estimate of the distortion probability that a French morpheme will be placed in position 3 of the French structure given that it is aligned with an English morpheme which is in position 2 of the English structure. This extension score in Equation 184 is multiplied by the score in Equation 182 for the partial hypothesis which is being extended to yield a new score for the partial hypothesis in FIG. 24 of $l(\text{the}|*,*)n(1|\text{the})t(\text{la}|\text{the})d(1|1) \times$ (185)

$$l(\text{girl}|*,\text{the})2 \left( \sum_{i=2}^{25} n(i|\text{girl}) \right) t(\text{fille}|\text{girl})d(3|2).$$

Consider now an extension to the partial hypothesis in FIG. 25. If a partial hypothesis that is to be extended contains an open morpheme, then, in a preferred embodiment, that hypothesis can only be extended by aligning another morpheme from the source structure with that open morpheme. When such an extension is made, there are two possibilities: 1) the open morpheme is kept open in the extended partial hypothesis, indicating that more source morphemes are to be aligned with that open target morpheme, or 2) the open morpheme is closed indicating that no more source morphemes are to be aligned with that target morpheme. These two cases are illustrated in FIGS. 26 and 27.

Figure 26:
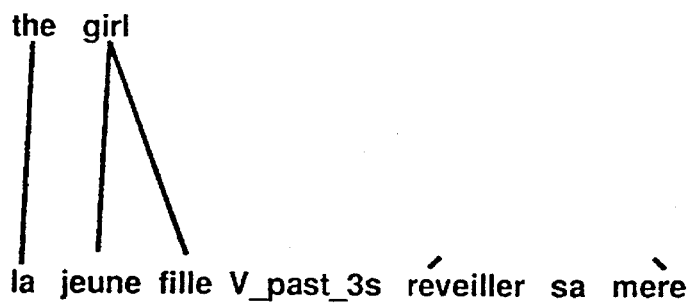
FIG. 26 is an example of a partial hypothesis which results from an extension in which an open morpheme is closed.

In FIG. 26, an extension is made of the partial alignment in FIG. 25 by aligning the additional French morpheme jeune with the English morpheme girl. In this example the English morpheme girl is then closed in the resultant partial hypothesis. The extension score for this example is $$\left( \frac{n(2|\text{girl})}{(\sum_{i=2}^{25} n(i|\text{girl}))} \right) t(\text{jeune}|\text{girl})d(2|2).$$ (186)

Here, the first quotient adjusts the fertility score for the partial hypothesis by dividing out the estimate of the probability that girl is aligned with at least two French morphemes and by multiplying in an estimate of the probability that girl is aligned with exactly two French morphemes. As in the other examples, the second and third factors are estimates of the lexical and distortion probabilities associated with this extension.

Figure 27:
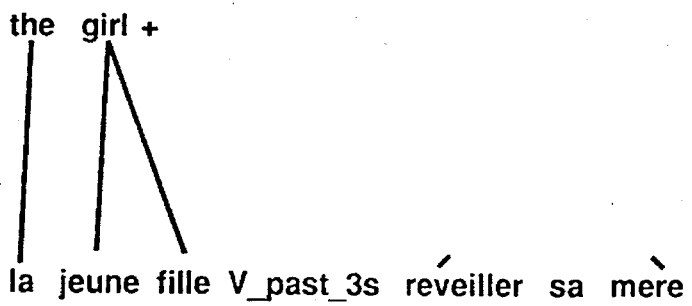
FIG. 27 is an example of a partial hypothesis which results from an extension in which an open morpheme is kept open.

In FIG. 27, the same extension is made as in FIG. 26, except here the English morpheme girl is kept open after the extension, hence the + sign. The extension score for this example is $$3 \left( \frac{(\sum_{i=3}^{25} n(i|\text{girl}))}{(\sum_{i=2}^{25} n(i|\text{girl}))} \right) t(\text{jeune}|\text{girl})d(2|2).$$ (187)

Here, the factor of 3 is the adjustment to the combinatorial factor for the partial hypothesis. Since the score for the partial hypothesis in FIG. 26 already has a combinatorial factor of 2, the score for the resultant partial hypothesis in FIG. 27, will have a combinatorial factor of 2×3=3 !. The quotient adjusts the fertility score for the partial hypothesis to reflect the fact that in further extensions of this hypothesis girl will be aligned with at least three French morphemes.

Another type of extension performed in the hypothesis search is one in which two additional target morphemes are appended to the partial target structure of the partial hypothesis being extended. In this type of extension, the first of these two morphemes is assigned a fertility of zero and the second is aligned with a single morpheme from the source structure. This second target morpheme may be either open or closed.

Figure 28:
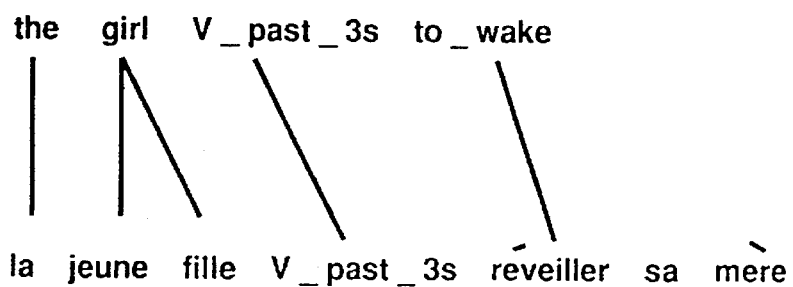
FIG. 28 is an example of a partial hypothesis which results from an extension by the target morpheme to_wake.
Figure 29:
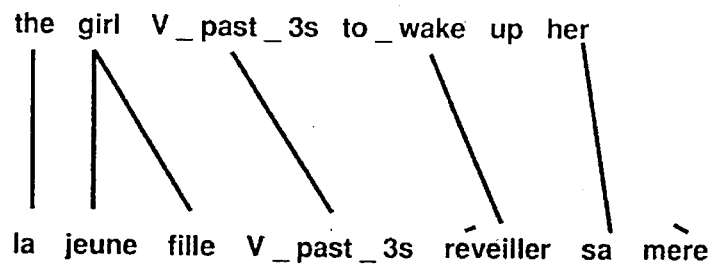
FIG. 29 is an example of a partial hypothesis which results from an extension by the pair of target morphemes up and to_wake.

FIG. 29 shows an extension of the partial hypothesis in FIG. 28 by the two target morphemes up her, in which her is aligned with the source morpheme sa. The score for this extension is $$l(up|girl,to_{13}wake)l(her|to\_wake,up)n(0|up)n(1|her)t(sa|her)d(6|6). \quad (188)$$

Here, the first two factors are the trigram language model estimates of the probabilities with which up follows girl to_wake, and with which her follows to_wake up, respectively. The third factor is the fertility parameter that serves as an estimate of the probability that up is aligned with no source morphemes. The fourth, fifth, and sixth factors are the appropriate fertility, lexical, and distortion parameters associated with the target morpheme her in this partial alignment.

Figure 30:
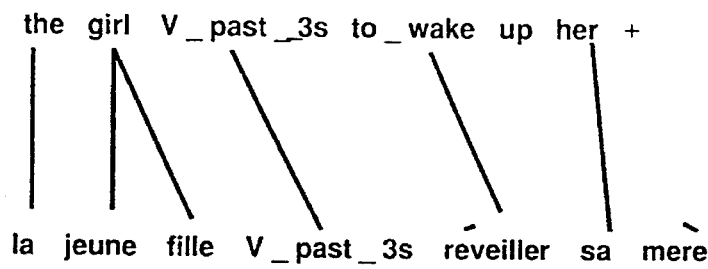
FIG. 30 is an example of a partial hypothesis which results from an extension by the pair of target morphemes up and to_wake in which to_wake is open.

FIG. 30 shows a similar extension by up her. The difference with the extension in FIG. 29 is that in FIG. 30, the source morpheme her is open. The score for this extension is $$l(up| girl,to_{w}ake)l(her|to\_wake,up)n(0|up) \times \quad (189)$$

$$2\left(\sum_{i=2}^{25} n(i|her)\right) t(sa|her)d(6|6).$$

The score for this extension differs from the score in Equation 188 in that the fertility parameter n(1|her) is replaced by the combinatorial factor 2 and the sum of fertility parameters which provides an estimate of the probability that her will be aligned with at least two source morphemes.

A remaining type of extension is where a partial hypothesis is extended by an additional connection which aligns a source morpheme with the null target morpheme. The score for this type of extension is similar to those described above. No language model score is factored in, and scores from the translation model are factored in, in accordance with the probabilities associated with the null word as described in the section entitled Translation Models and Parameter Estimation.

Selection of Hypotheses to Extend 5402 (Brown et al. Section 14.3)

Throughout the hypothesis search process, partial hypotheses are maintained in a set of priority queues. In theory, there is a single priority queue for each subset of positions in the source structure. So, for example, for the source structure oui , oui, three positions: oui is in position 1; a comma is in position 2; and oui is in position 3, and there are therefore $2^3$ subsets of positions { }, {1}, {2}, {3}, {1,2}, {1,3}, {2,3}, and {1,2,3}. In practice, these priority queues are initialized only on demand, and many less than the full number of queues possible are used in the hypothesis search. In a preferred embodiment, each partial hypothesis is comprised of a sequence of target morphemes, and these morphemes are aligned with a subset of source morphemes. Corresponding to that subset of source morphemes is a priority queue in which the partial hypothesis is stored. The partial hypotheses within a queue are prioritized according to the scores associated with those hypotheses. In certain preferred embodiments the priority queues are limited in size and only the 1000 hypothesis with the best scores are maintained.

Figure 31:
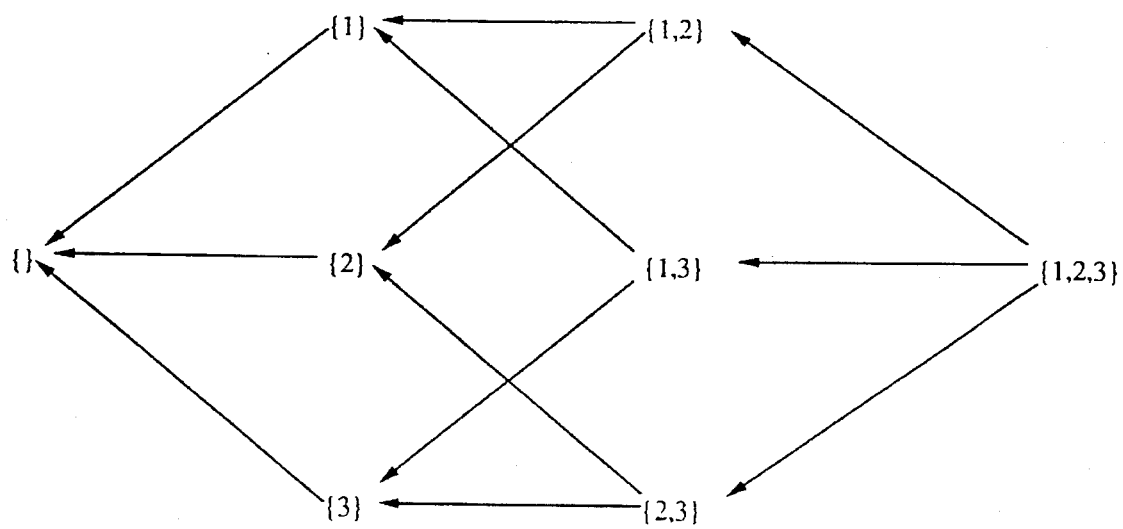
FIG. 31 is an example of a subset lattice.

The set of all subsets of a set of source structure positions can be arranged in a subset lattice. For example, the subset lattice for the set of all sets of the set {1,2,3} is shown in FIG. 31. In a subset lattice, a parent of a set S is any which contains one less element than S, and which is also a subset of S. In FIG. 31 arrows have been drawn from each set in the subset lattice to each of its parents. For example, the set {2} is a parent of the set {1,2}.

A subset lattice defines a natural partial ordering on a set of sets. Since the priority queues used in hypothesis search are associated with subsets, a subset lattice also defines a natural partial ordering on the set of priority queues. Thus in FIG. 31, there are two parents of the priority queue associated with the subset of source structure positions {1,3}. These two parents are the priority queues associated with the set {1} and {3}. A priority queue $Q_1$ is said to be an ancestor of another priority $Q_2$ if 1) $Q_1$ is not equal to $Q_2$, and 2) $Q_1$ is a subset of $Q_2$. If $Q_1$ is an ancestor of $Q_2$, then $Q_2$ is said to be to be a descendant of $Q_1$.

Figure 32:
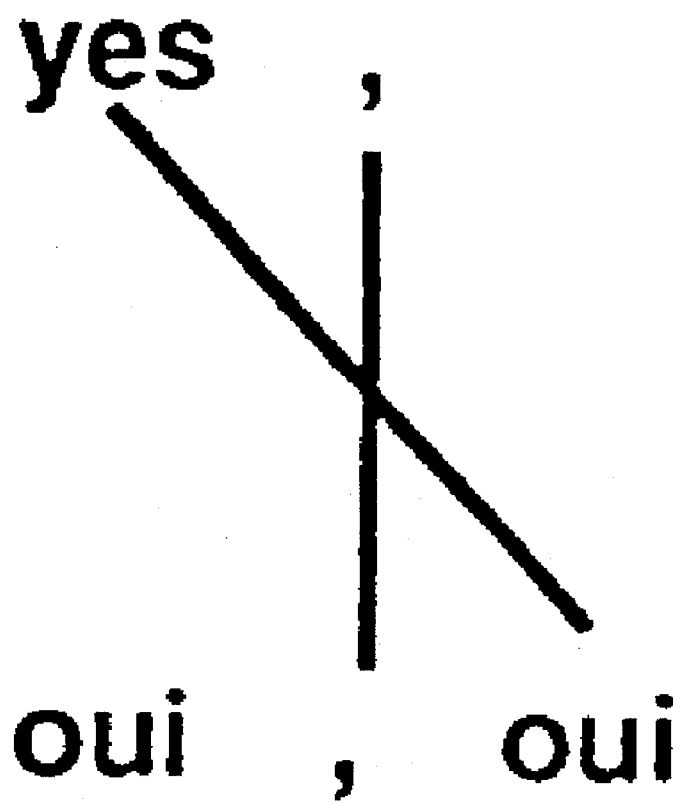
FIG. 32 is an example of a partial hypothesis that is stored in the priority queue {2,3}.

Considering now the process by which a set of partial hypotheses are selected in step 5402 to be extended in step 5404, when step 5402 is invoked, it is invoked with a list of partial hypotheses that were either 1) created by the initialization step 5401, or 2) created as the results of extensions in step 5404 on a previous pass through the loop comprised of steps 5402, 5403, and 5404. These partial hypotheses are stored in priority queues according to the sets of source morphemes they account for. For example, the partial hypothesis in FIG. 32 would be stored in the priority queue associated with the set {2,3}, since it accounts for the source morphemes in positions 2 and 3.

A priority queue is said to be active if there are partial hypotheses stored in it. An active priority queue is said to be on the frontier if it has no active descendent. The cardinality of a priority queue is equal to the number of elements in the subset with which it is associated. So, for example, the cardinality of the priority queue which is associated with the set {2,3} is 2.

Figure 33:
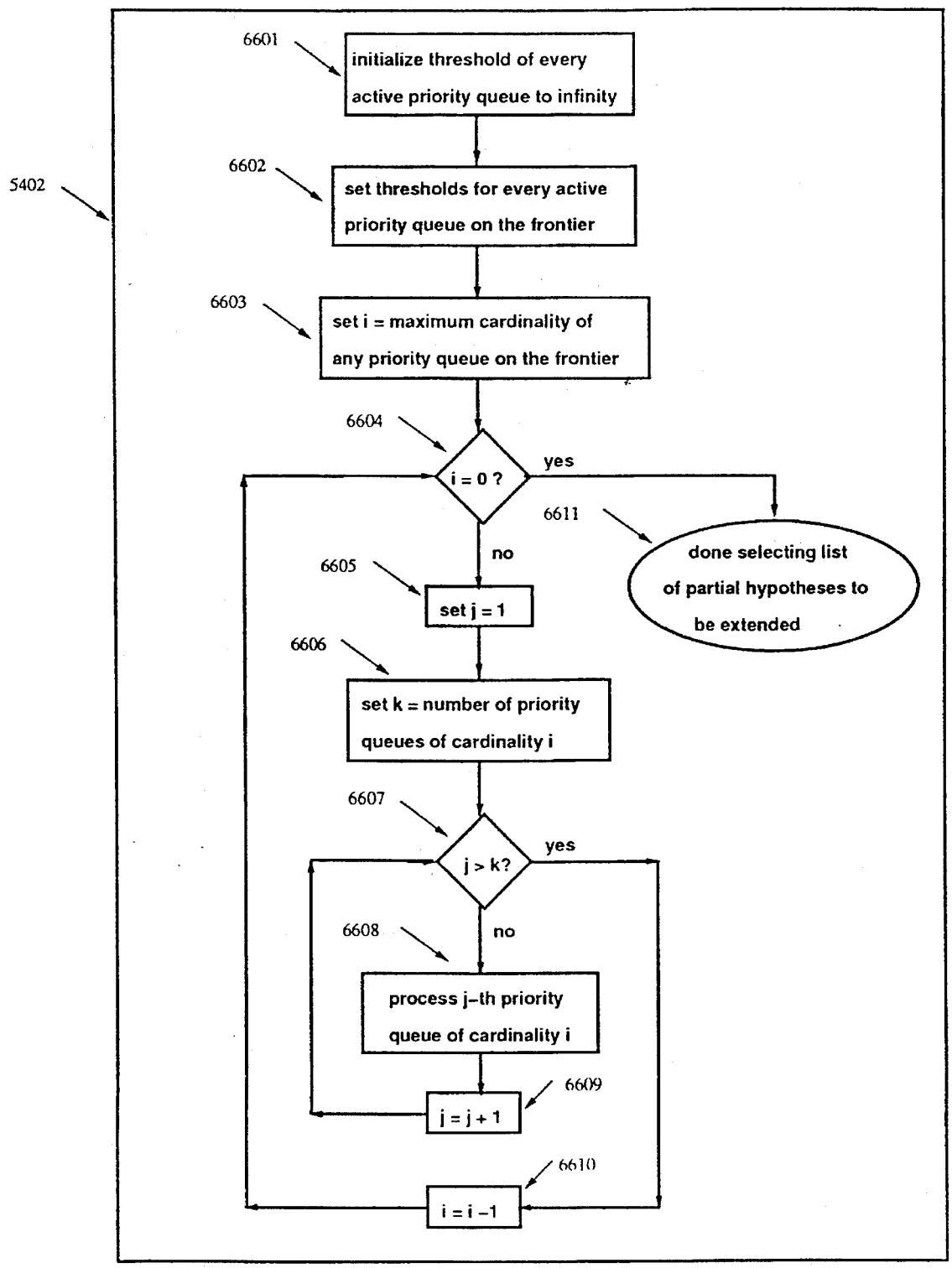
FIG. 33 is a schematic flow diagram of the process by which partial hypothesis are selected for extension.

The process in step 5402 functions by assigning a threshold to every active priority queue and then places on the list of partial hypotheses to be extended every partial hypothesis on an active priority queue that has an a score that is greater than the threshold for that priority queue. This is depicted in FIG. 33. First, in step 6601 the threshold for every active priority queue is initialized to infinity, in practice, some very large number. Second, in step 6602, thresholds are determined for every priority queue on the frontier.

The method by which these thresholds are computed is best described by first describing what the normalizer of a priority queue is. Each priority queue on the frontier corresponds to a set of positions of source morphemes. At each position of these positions is a particular source morpheme. Associated with each morpheme is a number, which in a preferred embodiment is the unigram probability of that source morpheme. These unigram probabilities are estimated by transducing a large body of source text and simply counting the frequency with which the different source morphemes occur. The normalizer for a priority queue is defined to be the product of all the unigram probabilities for the morphemes at the positions in the associated set of source structure positions. For example, the normalizer for the priority queue associated with the set {2,3} for the source structure la jeune fille V_past_3s réveiller sa mère is:

$$\text{normalizer}(\{2,3\}) = Pr(\text{jeune})Pr(\text{fille}). \quad (190)$$

For each priority queue Q on the frontier define the normed score of Q to be equal to the score of the partial hypothesis with the greatest score in Q divided by the normalizer for Q. Let Z be equal to the maximum of all normed scores for all priority queues on the frontier. The threshold assigned to a priority queue Q on the frontier is then equal to Z times the normalizer for that priority queue divided by a constant which in a preferred embodiment is 45.

After step 6602, thresholds have been assigned to the priority queues on the frontier, a loop is performed in steps 6604 through 6610. The loop counter i is equal to a different cardinality on each iteration of the loop. The counter i is initialized in step 6604 to the largest cardinality of any active priority queue, in other words, i is initialized to the maximum cardinality of any priority queue on the frontier. On each iteration of the loop the value of i is decreased by 1 until i is equal to 0, at which point the test 6604 is satisfied and the process of selecting partial hypotheses to be extended is terminated.

Inside the loop through cardinalities is another loop in steps 6606 through 6609. This is a loop through all active priority queues of a given cardinality. In this loop each priority queue of cardinality i is processed in step 6608.

Figure 34:
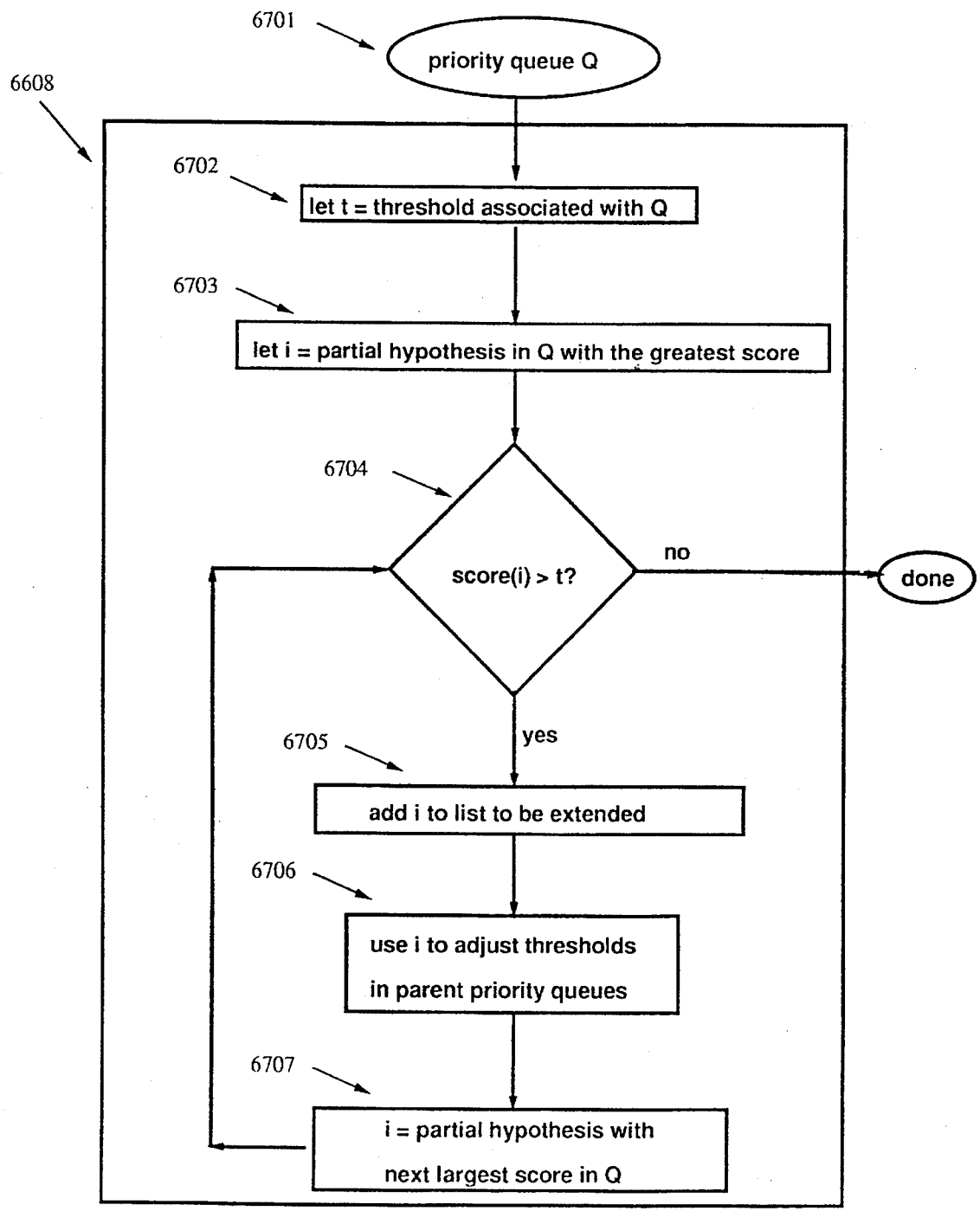
FIG. 34 is a schematic flow diagram of the method by which the partial hypotheses on a priority queue are processed in the selection for extension step.

A schematic flow diagram for this processing step 6608 is shown in FIG. 34. The priority queue Q to be processed enters this step at 6701. Steps 6704 through 6707 perform a loop through all partial hypotheses i in the priority queue Q which are greater than the threshold associated with Q. At step 6705 the partial hypothesis i is added to the list of partial hypotheses to be extended. At step 6706 i is used to adjust the thresholds of all active priority queues which are parents of Q. These thresholds are then used when priority queues of lower priority are processed in the loop beginning at step 6604 in FIG. 33.

Each priority queue which is a parent of partial hypothesis i at step 6706 contains partial hypotheses which account for one less source morpheme than the partial hypothesis i does.

For example, consider the partial hypothesis depicted in FIG. 26. Suppose this is the partial hypothesis i. The two target morphemes the and girl are aligned with the three source morphemes la, jeune, and fille which are in source structure positions 1, 2, and 3 respectively. This hypothesis i is therefore in the priority queue corresponding to the set {1,2,3}. The priority queues that are parents of this hypothesis correspond to the sets {1,2}, {1,3}, and {2,3}. We can use partial hypothesis i to adjust the threshold in each of these priority queues, assuming they are all active, by computing a parent score, $\text{score}_p$ from the score $\text{score}_i$ associated with the partial hypothesis i. A potentially different parent score is computed for each active parent priority queue. That parent score is then divided by a constant, which in a preferred embodiment is equal to 45. The new threshold for that queue is then set to the minimum of the previous threshold and that parent score.

These parent scores are computed by removing from score, the contributions for each of the source morphemes la, jeune, and fille. For example, to adjust the threshold for the priority queue {2,3}, it is necessary to remove the contribution to the score, associated with the source morpheme in position 1, which is la. This morpheme is the only morpheme aligned with the, so the language model contribution for the must be removed, as well as the translation model contributions associated with la. Therefore, $$\text{score}_p = \frac{\text{score}_i}{l(the|*,boundary)t(la|the)n(1|the)d(1,1)}. \quad (191)$$

As another example, to adjust the threshold for the priority queue {1,3}, it is necessary to remove the contribution to the score, associated with the source morpheme in position 2, which is jeune. This morpheme is one of two aligned with the target morpheme girl. If the connection between girl and jeune is removed from the partial alignment in FIG. 26, there is still a connection between girl and fille. In other words, girl is still needed in the partial hypothesis to account for fille. Therefore, no language model component is removed. The parent score in this case is:

$$\text{score}_p = \text{score}_i \frac{\sum_{j=2}^{25} n(j|girl)}{n(2|girl)} \frac{1}{t(jeune|girl)} \frac{1}{d(2|2)}. \quad (192)$$

Here, the first quotient adjust the fertility score, the second adjusts the lexical score and the third adjusts the distortion score.

With some thought, it will be clear to one skilled in the art how to generalize from these examples to other situations. In general, a parent score is computed by removing a connection from the partial alignment associated with the partial hypothesis i. Such a connection connects a target morpheme t in the partial target structure associated with the partial hypothesis i and a source morpheme s in a source structure. If this connection is the only connection to the target morpheme t, then the language model score for t is divided out, otherwise it is left in. The lexical and distortion scores associated with the source morpheme s are always divided out, as is the fertility score associated with the target morpheme t. If n connections remain to the target morpheme t, since n+1 source morphemes are aligned with t in the partial hypothesis i, then the open fertility score serving as an estimate of the probability that at least n+1 source morphemes will be aligned with t is multiplied in.

When the list of hypotheses to be extended that is created in step 5402 is empty the search terminates.

Refer now to step 5404 in FIG. 21. This step extends a list of partial hypotheses. An embodiment of the method by which this extension takes place is documented in the pseudo code in FIG. 35.

The procedure extend_partial_hypotheses_on_list takes as input a list of hypotheses to be extended. Lines 1 through 8 contain a loop through all the partial hypotheses on the list which are extended in turn. In line 3 the variable h is set to the partial hypothesis being extended on iteration of the loop. For each hypothesis, h, that is extended, it can be extended by aligning an additional source morpheme with a morpheme in an hypothesized target structure. In lines 4 through 7 a loop is made through every position p in the source structure. In certain embodiments, a loop may be made only through the first n source positions that are not already aligned in the partial hypothesis h. In a preferred embodiment n is set to 4. At line 5 a test is made to see if the source morpheme at position p is already aligned by the partial hypothesis with an hypothesized target morpheme. If it is not, then at line 6 a call is made to the procedure extend_h_by_accounting_for_source_morpheme _in_ position_p, which creates those extensions of partial hypothesis h which align the source morpheme at position p with an hypothesized target morpheme.

Pseudo code for the procedure extend_h_by_accounting_for_source_morpheme _in_position_p is contained in lines 10 through 31 of figure. At line 11 a check is made to determine if the partial hypothesis h is open, in other words, if it contains an open target morpheme. If it is open then extensions are made in lines 12 through 14. On line 12, the variable q is set to the position in the hypothesized partial target structure of the open morpheme. Each of these extensions made in lines 12 through 14 are made by adding a connection to the partial alignment of h. Each such connection is a connection from the morpheme at position p in the source structure to the open morpheme at position q in the target structure. On line 13, an extension is created in which a connection from p to q is added to the partial alignment of h and in which the morpheme at position t is kept open. On line 14, an extension is created in which a connection from p to q is added to the partial alignment of h and in which the morpheme at position t is closed.

Extensions of partial hypotheses h which are closed are made in lines 17 through 29. First, in line 17 the variable s is set to the identity of the source morpheme at position p in the source structure. This morpheme will have a number of possible target translations. In terms of the translation model, this means that there will be a number of target morphemes t for which the lexical parameter t(t|s) is greater than a certain threshold, which in an embodiment is set equal to 0.001. The list of such target morphemes for a given source morpheme s can be precomputed. In lines 18 through 29 a loop is made through a list of the target morphemes for the source morpheme s. The variable t is set to the target morpheme being processed in the loop. On line 20, an extension is made in which the target morpheme t is appended to the right end of the partial target structure associated with h and then aligned with the source morpheme at position p, and in which the target morpheme t is open in the resultant partial hypothesis. On line 21, an extension is made in which the target morpheme t is appended to the right end of the partial target structure associated with h and then aligned with the source morpheme at position p, and in which the target morpheme t is closed in the resultant partial hypothesis. On line 22, an extension is made in which the target morpheme t is appended to the null target morpheme in the partial target structure associated with hypothesis h. It is assumed throughout this description of hypothesis search that every partial hypothesis comprises a single null target morpheme.

The remaining types of extensions to be performed are those in which the target structure is extended by two morphemes. In such extensions, the source morpheme at position p is aligned with the second of these two target morphemes. On line 23, a procedure is called which creates a list of target morphemes that can be inserted between the last morpheme on the right of the hypothesis h and the hypothesized target morpheme, t. The lists of target morphemes created by this procedure can be precomputed from language model parameters. In particular, suppose $t_r$ is the last morpheme on the right of the partial target structure comprised by the partial hypothesis h. For any target morpheme $t_1$ the language model provides a score for the three-word sequence $t_r, t_1, t$. In one preferred embodiment this score is equal to an estimate of 1-gram probability for the morpheme $t_r$, multiplied by an estimate of the probability with 2-gram conditional probability with which $t_1$ follows $t_r$, multiplied by an estimate of the 3-gram conditional probability with which t follows the pair $t_r, t_1$. By computing such a score for each target morpheme $t_1$, the target morphemes can be ordered according to these scores. The list returned by the procedure called on line 23 is comprised of the m best $t_1$'s which have scores greater than a threshold z. In one embodiment, z is equal to 0.001 and m is equal to 100.

The loop on lines 24 through 28 makes extensions for each $t_1$ on the list created on line 23. On lines 26 and 27, extensions are made in which the pair of target morphemes $t_1, t$ is appended to the end of the partial target structure comprised by the partial hypothesis h, and in which the source morpheme at position p is aligned with t. The hypotheses which result from extensions made on line 23 are open and the hypotheses which result from extensions made on line 23 are closed.

Table 2 shows a hypothetical example of target hypotheses $E_1$, $E_2$, and $E_3$. In this example, the target words are English language words.

TABLE 2

| | Target Hypotheses $E_h$ | | | | | |
|---|---|---|---|---|---|---|
| $E_h$ | $e_{h,1}$ | $e_{h,2}$ | $e_{h,3}$ | $e_{h,4}$ | $e_{h,5}$ | $e_{h,6}$ |
| $E_1$ | The | key | is | in | the | door |
| $E_2$ | The | key | is | in | the | gate |
| $E_3$ | The | wrench | is | in | the | door |

Preferably, each target hypothesis comprises a series of target words selected from a vocabulary comprising words in the second language, and a null word representing the absence of a word. In Table 2, all of the target hypotheses $E_h$ will be considered to include the "null" word.

Returning to FIG. 1, the translation apparatus comprises a language model match score generator 16 for generating, for each target hypothesis, a language model match score comprising an estimate of the probability of occurrence of the series of words in the target hypothesis. Sections 6 and 7 of Brown et al, cited above, describe an example of a language model match score generator, and are incorporated herein by reference and set forth in full below. While any known language model may be used to estimate the probability of occurrence of the series of words in the target hypothesis, Brown et al describe an n-gram language model comprising a 1-gram model, a 2-gram model, and a 3-gram model combined by parameters whose values are obtained by interpolated estimation.

The translation apparatus further comprises an alignment identifier 18 for identifying at least one alignment between the input series of source words and each target hypothesis. The alignment connects each source word with at least one target word in the target hypothesis.

The example of a language model match score generator (described in sections 6 and 7 of Brown et al) is now recited herein in full.

TARGET LANGUAGE MODEL (Brown et al. Section 6)

Figure 36:
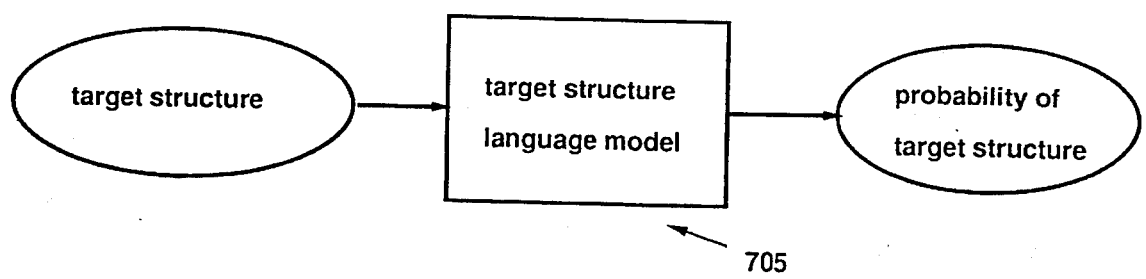
FIG. 36 is a schematic block diagram of a target structure language model.

The inventions described in this specification employ probabilistic models of the target language in a number of places. These include the target structure language model 705, and the class language model used by the decoder 404. As depicted in FIG. 36, the role of a language model is to compute an a priori probability or score of a target structure.

Language models are well known in the speech recognition art. They are described in the article "Self-Organized Language Modeling for Speech Recognition", by F. Jelinek, appearing in the book Readings in Speech Recognition edited by A. Waibel and K. F. Lee and published by Morgan Kaufmann Publishers, Inc., San Matco, Calif., in 1990. They are also described in the article "A Tree-Based Statistical Model for Natural Language Speech Recognition", by L. Bahl et al., appearing in the July 1989 Volume 37 of the IEEE Transactions on Acoustics, Speech and Signal Processing. These articles are included by reference herein. They are further described in the paper "Trainable Grammars for Speech Recognition", by J. Baker, appearing in the 1979 Proceedings of the Spring Conference of the Acoustical Society of America.

In some embodiments of the present inventions, the target structure consists of a sequence of morphs. In these embodiments, n-gram language models, as described in the aforementioned article by F. Jelinek, can be used. In other embodiments, the target structure comprises parse trees of the target language. In these embodiments, language models based on stochastic context-free grammars, as described in the aforementioned articles by F. Jelinek and the aforementioned paper by J. Baker, can be used.

In addition, decision tree language models, as described in the aforementioned paper by L. Bahl, et al. can be adapted by one skilled in the art to model a wide variety of target structures.

Perplexity (Brown et al. Section 6.1)

The performance of a language model in a complete system depends on a delicate interplay between the language model and other components of the system. One language model may surpass another as part of a speech recognition system but perform less well in a translation system.

Since it is expensive to evaluate a language model in the context of a complete system, it is useful to have an intrinsic measure of the quality of a language model. One such measure is the probability that the model assigns to the large sample of target structures. One judges as better the language model which yields the greater probability. When the target structure is a sequence of words or morphs, this measure can be adjusted so that its takes account of the length of the structures. This leads to the notion of the perplexity of a language model with respect to a sample of text S:

$$perplexity \equiv Pr(S)^{-\frac{1}{|S|}} \qquad (203)$$

where |S| is the number of morphs of S. Roughly speaking, the perplexity is the average number of morphs which the model cannot distinguish between, in predicting a morph of S. The language model with the smaller perplexity will be the one which assigns the larger probability to S.

Because perplexity depends not only on the language model but also on the sample of text, it is important that the text be representative of that for which the language model is intended. Because perplexity is subject to sampling error, making fine distinctions between language models may require that the perplexity be measured with respect to a large sample.

n-Gram Language Models (Brown et al. Section 6.2)

n-Gram language models will now be described. For these models, the target structure consists of a sequence of morphs.

Suppose $m_1 m_2 m_3 \ldots m_k$ be a sequence of k morphs $m_i$. For $1 \leq i \leq j \leq k$, let $m_i^j$ denote the subsequence $m_i^j = m_i m_{i+1} \ldots m_j$. For any sequence, the probability of a $m_1^k$ is equal to the product of the conditional probabilities of each morph $m_i$ given the previous morphs $m_1^{i-1}$:

$$Pr(m_1^k) = Pr(m_1)Pr(m_2|m_1)Pr(m_3|m_1 m_2) \ldots Pr(m_i|m_1^{i-1}) \ldots Pr(m_k|m_1^{k-1}). \qquad (204)$$

The sequence $m_1^{i-1}$ is called the history of the morph $m_i$ in the sequence.

For an n-gram model, the conditional probability of a morph in a sequence is assumed to depend on its history only through the previous n−1 morphs:

$$Pr(m_i|m_1^{i-1}) \approx Pr(m_i|m_{i-n+1}^{i-1}) \qquad (205)$$

For a vocabulary of size V, a 1-gram model is determined by V−1 independent numbers, one probability Pr(m) for each morph m in the vocabulary, minus one for the constraint that all of the probabilities add up to 1. A 2-gram model is determined by $V^2-1$ independent numbers, V(V−1) conditional probabilities of the form $Pr(m_2|m_1)$ and V−1 of the form Pr(m). In general, an n-gram model is determined by $V^n-1$ independent numbers, $V^{n-1}(V-1)$ conditional probabilities of the form $Pr(m_n|m_1^{n-1})$, called the order-n conditional probabilities, plus $V^{n-1}-1$ numbers which determine an (n−1)-gram model.

The order-n conditional probabilities of an n-gram model form the transition matrix of an associated Markov model. The states of this Markov model are sequences of n−1 morphs, and the probability of a transition from the state $m_1 m_2 \ldots m_{n-1}$ to the state $m_2 m_3 \ldots m_n$ is $Pr(m_n|m_1 m_2 \ldots m_{n-1})$. An n-gram language model is called consistent if, for each string $m_1^{n-1}$, the probability that the model assigns to $m_1^{n-1}$ is the steady state probability for the state $m_1^{n-1}$ of the associated Markov model.

Simple n-Gram Models (Brown et al. Section 6.3)

The simplest form of an n-gram model is obtained by assuming that all the independent conditional probabilities are independent parameters. For such a model, values for the parameters can be determined from a large sample of training text by sequential maximum likelihood training. The order n-probabilities are given by $$Pr(m_n|m_1^{n-1}) = \frac{f(m_1^{n-1} m_n)}{\Sigma_m f(m_1^{n-1} m)} \qquad (206)$$

where $f(m_1^i)$ is the number of times the string of morphs $m_1^i$ appears in the training text. The remaining parameters are determined inductively by an analogous formula applied to the corresponding n−1-gram model. Sequential maximum likelihood training does not produce a consistent model, although for a large amount of training text, it produces a model that is very nearly consistent.

Unfortunately, many of the parameters of a simple n-gram model will not be reliably estimated by this method. The problem is illustrated in Table 16, which shows the number of 1-, 2-, and 3-grams appearing with various frequencies in a sample of 365,893,263 words of English text from a variety of sources. The vocabulary consists of the 260,740 different words plus a special unknown word into which all other words are mapped. Of the $6.799 \times 10^{10}$ 2-grams that might have occurred in the data, only 14,494,217 actually did occur and of these, 8,045,024 occurred only once each.

Similarly, of the $1.773 \times 10^{16}$ 3-grams that might have occurred, only 75,349,888 actually did occur and of these, 53,737,350 occurred only once each. These data and Turing's formula imply that 14.7 percent of the 3-grams and for 2.2 percent of the 2-grams in a new sample of English text will not appear in the original sample. Thus, although any 3-gram that does not appear in the original sample is rare, there are so many of them that their aggregate probability is substantial.

TABLE 16

Number of n-grams with various frequencies in 365,893,263 words of running text.

| Count | 1-grams | 2-grams | 3-grams |
|-------|---------|---------|---------|
| 1 | 36,789 | 8,045,024 | 53,737,350 |
| 2 | 20,269 | 2,065,469 | 9,229,958 |
| 3 | 13,123 | 970,434 | 3,653,791 |
| >3 | 135,335 | 3,413,290 | 8,728,789 |
| >0 | 205,516 | 14,494,217 | 75,349,888 |
| ≧0 | 260,741 | $6.799 \times 10^{10}$ | $1.773 \times 10^{16}$ |

Thus, as n increases, the accuracy of a simple n-gram model increases, but the reliability of the estimates for its parameters decreases.

Smoothing (Brown et al. Section 6.4)

A solution to this difficulty is provided by interpolated estimation, which is described in detail in the paper "Interpolated estimation of Markov source parameters from sparse data", by F. Jelinek and R. Mercer and appearing in Proceeding of the Workshop on Pattern Recognition in Practice, published by North-Holland, Amsterdam, The Netherlands, in May 1980. Interpolated estimation combines several models into a smoothed model which uses the probabilities of the more accurate models where they are reliable and, where they are unreliable, falls back on the more reliable probabilities of less accurate models. If $Pr^{(j)}(m_i | m_1^{i-1})$ is the jth language model, the smoothed model, $\hat{Pr}(m_i|m_1^{i-1})$, is given by $$\hat{Pr}(m_i|m_1^{i-1}) = \sum_j \lambda_j(m_1^{i-1}) Pr^{(j)}(m_i|m_1^{i-1}). \tag{207}$$

The values of the $\lambda_j(m_1^{i-1})$ are determined using the EM method, so as to maximize the probability of some additional sample of training text called held-out data. When interpolated estimation is used to combine simple 1-, 2-, and 3-gram models, the $\lambda$'s can be chosen to depend on $m_1^{i-1}$ only through the count of $m_{i-2} m_{i-1}$. Where this count is high, the simple 3-gram model will be reliable, and, where this count is low, the simple 3-gram model will be unreliable.

The inventors constructed an interpolated 3-gram model in which the $\lambda$'s were divided into 1782 different sets according to the 2-gram counts, and determined from a held-out sample of 4,630,934 million words. The power of the model was tested using the 1,014,312 word Brown corpus. This well known corpus, which contains a wide variety of English text, is described in the book Computational Analysis of Present-Day American English, by H. Kucera and W. Francis, published by Brown University Press, Providence, R.I., 1967. The Brown corpus was not included in either the training or held-out data used to construct the model. The perplexity of the interpolated model with respect to the Brown corpus was 244.

n-Gram Class Models (Brown et al. Section 6.5)

Clearly, some words are similar to other words in their meaning and syntactic function. For example, the probability distribution of words in the vicinity of Thursday is very much like that for words in the vicinity of Friday. Of course, they will not be identical: people rarely say Thank God it's Thursday! or worry about Thursday the $13^{th}$.

In class language models, morphs are grouped into classes, and morphs in the same class are viewed as similar. Suppose that $\hat{c}$ is a map that partitions the vocabulary of V morphs into C classes by assigning each morph m to a class $\hat{c}(m)$. An n-gram class model based on $\hat{c}$ is an n-gram language model for which $$Pr(m_k|m_1^{k-1}) = Pr(m_k|c_k) Pr(c_k|c_1^{k-1}) \tag{208}$$

where $c_i = \hat{c}(m_i)$. An n-gram class model is determined by $C^n - 1 + V - C$ independent numbers, $V - C$ of the form $Pr(m_i|c_i)$, plus $C^n - 1$ independent numbers which determine an n-gram language model for a vocabulary of size C. If C is much smaller than V, these are many fewer numbers than are required to specify a general n-gram language model.

In a simple n-gram class model, the $C^n - 1 + V - C$ independent probabilities are treated as independent parameters. For such a model, values for the parameters can be determined by sequential maximum likelihood training. The order n probabilities are given by $$Pr(c_n|c_1^{n-1}) = \frac{f(c_1^{n-1} c_n)}{\Sigma_c f(c_1^{n-1} c)} \tag{209}$$

where $f(c_1^i)$ is the number of times that the sequence of classes $c_1^i$ appears in the training text. (More precisely, $f(e_1^i)$ is the number of distinct occurrences in the training text of a consecutive sequence of morphs $m_1^i$ for which $c_k = \hat{c}(m_k)$ for $1 \leq k \leq i$.)

Classes (Brown et al. Section 7)

The invention described in this specification employ classes of morphs or words in a number of places. These include the class language model used by the decoder 702 and described in Section 14, and some embodiments of the target structure language model 705.

The inventors have devised a number of methods for automatically partitioning a vocabulary into classes based upon frequency or cooccurrence statistics or other information extracted from textual corpora or other sources. In this section, some of these methods will be explained. An application to construction of syntactic classes of words will be described. A person skilled in the art can easily adapt the methods to other situations. For example, the methods can be used to construct classes of morphs instead of classes of words. Similarly, they can be used to construct classes based upon cooccurrence statistics or statistics of word alignments in bilingual corpora.

Maximum Mutual Information Clustering (Brown et al. Section 7.1)

Figure 37:
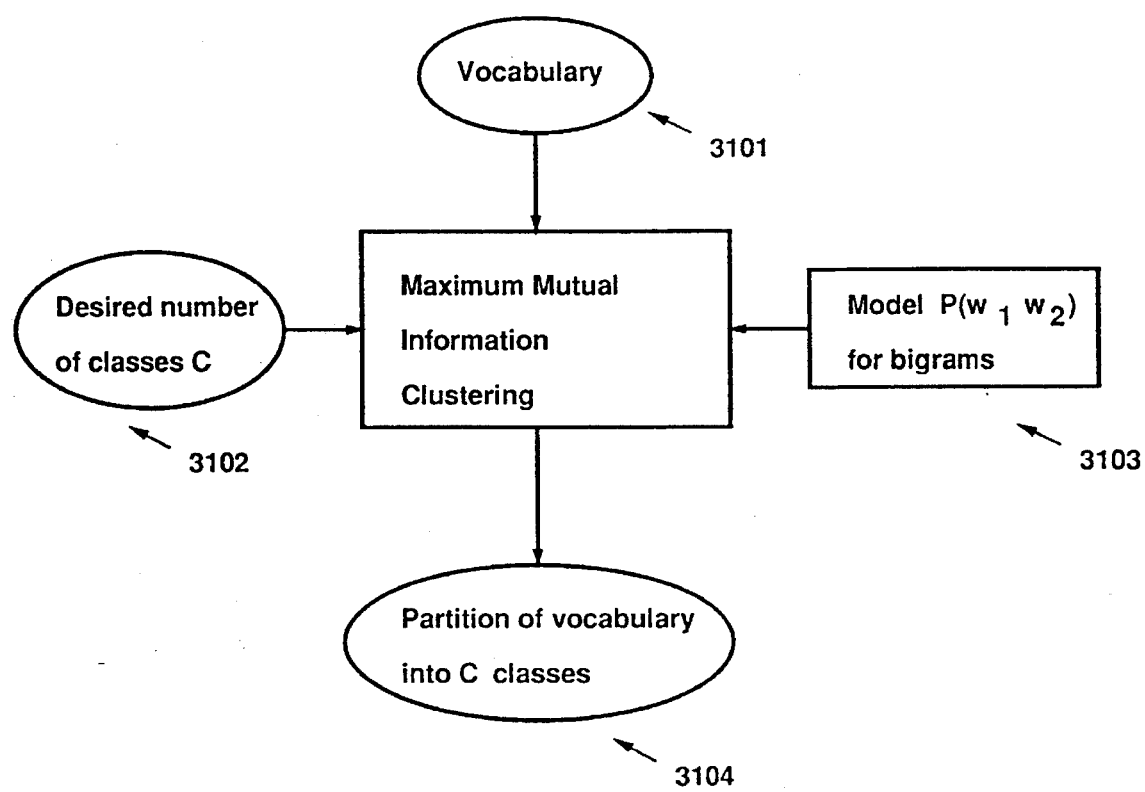
FIG. 37 is a schematic block digram of a method for partitioning a vocabulary into classes.

A general scheme for clustering a vocabulary into classes is depicted schematically in FIG. 37. It takes as input a desired number of classes C 3101, a vocabulary 3102 of size V, and a model 3103 for a probability distribution $P(w_1, w_2)$ over bigrams from the vocabulary. It produces as output a partition 3104 of the vocabulary into C classes. In one application, the model 3103 can be a 2-gram language model as described in Section 6, in which case $P(w_1, w_2)$ would be proportional to the number of times that the bigram $w_1 w_2$ appears in a large corpus of training text.

Let the score $\psi(\hat{C})$ of a partition $\hat{C}$ be the average mutual information between the classes of $\hat{C}$ with respect to the probability distribution $P(w_1,w_2)$:

$$\psi(\hat{C}) \equiv \sum_{c_1,c_2} P(c_1,c_2) \log \frac{P(c_1,c_2)}{P(c_1)P(c_2)} \qquad (210)$$

In this sum, $c_1$ and $c_2$ each run over the classes of the partition $\hat{C}$, and $$P(c_1,c_2) = \sum_{w_1 \in c_1, w_2 \in c_2} P(w_1,w_2) \qquad (211)$$

$$P(c_1) = \sum_{c_2} P(c_1,c_2) \qquad (212)$$

$$P(c_2) = \sum_{c_1} P(c_1,c_2) \qquad (213)$$

The scheme of FIG. 37 chooses a partition $\hat{C}$ for which the score average mutual information $\psi(\hat{C})$ is large.

A Clustering Method (Brown et al. Section 7.2)

Figure 38:
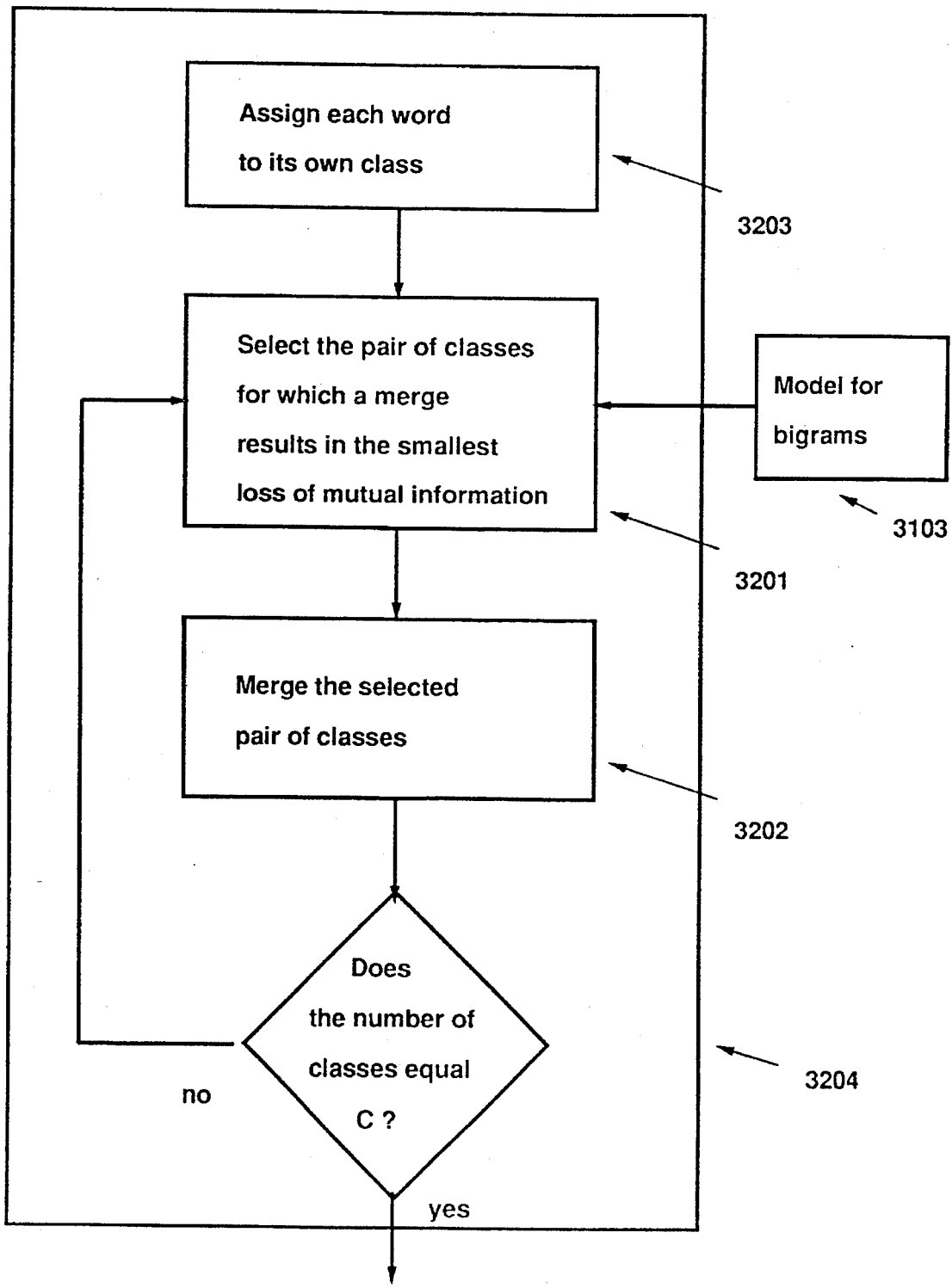
FIG. 38 is a schematic flow diagram of a method for partitioning a vocabulary into classes.

One method 3204 for carrying out this scheme is depicted in FIG. 38. The method proceeds iteratively. It begins (step 3203) with a partition of size V in which each word is assigned to a distinct class. At each stage of the iteration (Steps 3201 and 3202), the current partition is replaced by a new partition which is obtained by merging a pair of classes into a single class. The pair of classes to be merged is chosen so that the score of the new partition is as large as possible. The method terminates after V–C iterations, at which point the current partition contains C classes.

In order that it be practical, the method 3204 must be implemented carefully. At the $i^{th}$ iteration, a pair of classes to be merged must be selected from amongst approximately $(V-i)^2/2$ pairs. The score of the partition obtained by merging any particular pair is the sum of $(V-i)^2$ terms, each of which involves a logarithm. Since altogether there are V–C merges, this straight-forward approach to the computation is of order $V^5$. This is infeasible, except for very small values of V. A more frugal organization of the computation must take advantage of the redundancy in this straight-forward calculation.

An implementation will now be described in which the method 3204 executes in time of order $V^3$. In this implementation, the change in score due to a merge is computed in constant time, independent of V.

Let $\hat{C}_k$ denote the partition after V–k merges. Let $\hat{C}_k(1)$, $\hat{C}_k(2), \ldots, \hat{C}_k(k)$ denote the k classes of $\hat{C}_k$. Let $p_k(l,m) = P(\hat{C}_k(l), \hat{C}_k(m))$ and let $$pl_k(l) = \sum_m p_k(l,m) \qquad (214)$$

$$pr_k(m) = \sum_l p_k(l,m) \qquad (215)$$

$$q_k(l,m) = p_k(l,m) \log \frac{p_k(l,m)}{pl_k(l)pr_k(m)} \qquad (216)$$

Let $I_k = \psi(\hat{C}_k)$ be the score of $\hat{C}_k$, so that $$I_k = \sum_{l,m} q_k(l,m) \qquad (217)$$

Let $I_k(i,j)$ be the score of the partition obtained from $\hat{C}_k$ by merging classes $\hat{C}_k(i)$ and $\hat{C}_k(j)$, and let $L_k(i,j) = I_k - I_k(i,j)$ be the change in score as a result of this merge. Then $$L_k(i,j) = s_k(i) + s_k(j) - q_k(i,j) - q_k(j,i) - q_k(i \cup j, i \cup j) - \qquad (218)$$
$$\sum_{l \neq i,j} q_k(l, i \cup j) - \sum_{m \neq i,j} q_k(i \cup j, m),$$

where $$s_k(i) = \sum_l q_k(l,i) + \sum_m q_k(i,m) - q_k(i,i). \qquad (219)$$

In these and subsequent formulae, $i \cup j$ denotes the result of the merge, so that, for example $$p_k(i \cup j, m) = p_k(i,m) + p_k(j,m) \qquad (220)$$

$$q_k(i \cup j, m) = p_k(i \cup j, m) \log \frac{p_k(i \cup j, m)}{pl_k(i \cup j)pr_k(m)} \qquad (221)$$

The key to the implementation is to store and inductively update the quantities $$p_k(l,m) \quad pl_k(l) \quad pr_k(m) \quad q_k(l,m) \qquad (222)$$
$$I_k \quad s_k(i) \quad L_k(i,j)$$

Note that if $I_k$, $s_k(i)$, and $s_k(j)$, are known, then the majority of the time involved in computing $I_k(i,j)$ is devoted to computing the sums on the second line of equation 18. Each of these sums has approximately V–k terms and so this reduces the problem of evaluating $I_k(i,j)$ from one of order $V^2$ to one of order V.

Suppose that the quantities shown in Equation 222 are known at the beginning of an iteration. Then the new partition $\hat{C}_{k-1}$ is obtained by merging the pair of classes $\hat{C}_k(i)$ and $\hat{C}_k(j)$, i<j, for which $L_k(i,j)$ is smallest. The k–1 classes of the new partition are $\hat{C}_{k-1}(1), \hat{C}_{k-1}(2), \ldots, \hat{C}_{k-1}(k-1)$ with $\hat{C}_{k-1}(l) = \hat{C}_k(l)$ if $l \neq i,j$ $\hat{C}_{k-1}(i) = \hat{C}_k(i) \cup \hat{C}_k(j)$ $\hat{C}_{k-1}(j) = \hat{C}_k(k)$ if j<k Obviously, $I_{k-1} = I_k(i,j)$. The values of $p_{k-1}$, $pl_{k-1}$, $pr_{k-1}$, and $q_{k-1}$ can be obtained easily from $p_k$, $pl_k$, $pr_k$, and $q_k$. If l and m denote indices neither of which is equal to either i or j, then $s_{k-1}(l) = s_k(l) - q_k(l,i) - q_k(i,l) - q_k(l,j) - q_k(j,l) + q_{k-1}(l,i) + q_{k-1}(i,l)$ $s_{k-1}(j) = s_k(k) - q_k(k,i) - q_k(i,k) - q_k(k,j) - q_k(j,k) + q_{k-1}(j,i) + q_{k-1}(i,j)$ $L_{k-1}(l,m) = L_k(l,m) - q_k(\cup m,i) - q_k(i, l \cup m) - q_k(l \cup m, j) - q_k(j, l \cup m) + q_{k-1}(l \cup m, i) + q_{k-1}(i, l \cup m)$ $L_{k-1}(l,j) = L_k(l,k) - q_k(\cup k, i) - q_k(i, l \cup k) - q_k(l \cup k, j) - q_k(j, l \cup k) + q_{k-1}(l \cup j, i) + q_{k-1}(i, l \cup j)$ $$L_{k-1}(j,l) = L_{k-1}(l,j) \qquad (223)$$

Finally, $s_{k-1}(i)$ and $L_{k-1}(l,i)$ are determined from equations 218 and 219.

This update process requires order $V^2$ computations. Thus, by this implementation, each iteration of the method requires order $V^2$ time, and the complete method requires order $V^3$ time.

The implementation can improved further by keeping track of those pairs l,m for which $p_k(l,m)$ is different from zero. For example, suppose that P is given by a simple bigram model trained on the data described in Table 16 of Section 6. In this case, of the $6.799 \times 10^{10}$ possible word 2-grams $w_1,w_2$, only 14,494,217 have non-zero probability. Thus, in this case, the sums required in equation 218 have, on average, only about 56 non-zero terms instead of 260,741 as might be expected from the size of the vocabulary.

An Alternate Clustering Method (Brown et al. Section 7.3)

For very large vocabularies, the method 3204 may be too computationally costly. The following alternate method can be used. First, the the words of the vocabulary are arranged in order of frequency with the most frequent words first. Each of the first C words is assigned to its own distinct class. The method then proceeds iteratively through V–C steps. At the $k^{th}$ step the $(C+k)^{st}$ most probable word is assigned to a new class. Then, two of the resulting C+1 classes are merged into a single class. The pair of classes that is merged is the one for which the loss in average mutual information is least. After V–C steps, each of the words in the vocabulary will have been assigned to one of C classes.

Improving Classes (Brown et al. Section 7.4)

The classes constructed by the clustering method 3204 or the alternate clustering method described above can often be improved. One method of doing this is to repeatedly cycle through the vocabulary, moving each word to the class for which the resulting partition has the highest average mutual information score. Eventually, no word will move and the method finishes. It may be possible to further improve the classes by simultaneously moving two or more words, but for large vocabularies, such a search is too costly to be feasible.

Examples (Brown et al. Section 7.5)

The methods described above were used divide the 260, 741-word vocabulary of Table 16, Section 6, into 1000 classes. Table 17 shows some of the classes that are particularly interesting, and Table 18 shows classes that were selected at random. Each of the lines in the tables contains members of a different class. The average class has 260 words. The table shows only those words that occur at least ten times, and only the ten most frequency words of any class. (The other two months would appear with the class of months if this limit had been extended to twelve). The degree to which the classes capture both syntactic and semantic aspects of English is quite surprising given that they were constructed from nothing more than counts of bigrams. The class {that tha theat} is interesting because although tha and theat are English words, the method has discovered that in the training data each of them is most often a mistyped that.

A Method for Constructing Similarity Trees (Brown et al. Section 7.6)

The clustering method 3204 can also be used to construct a similarity tree over the vocabulary. Suppose the merging steps 3201 and 3202 of method 3204 are iterated V–1 times, resulting in a single class consisting of the entire vocabulary. The order in which the classes are merged determines a binary tree, the root of which corresponds to this single class and the leaves of which correspond to the words in the vocabulary. Intermediate nodes of the tree correspond to groupings of words intermediate between single words and the entire vocabulary. Words that are statistically similar with respect to the model $P(w_1, w_2)$ will be close together in the tree.

Figure 39:
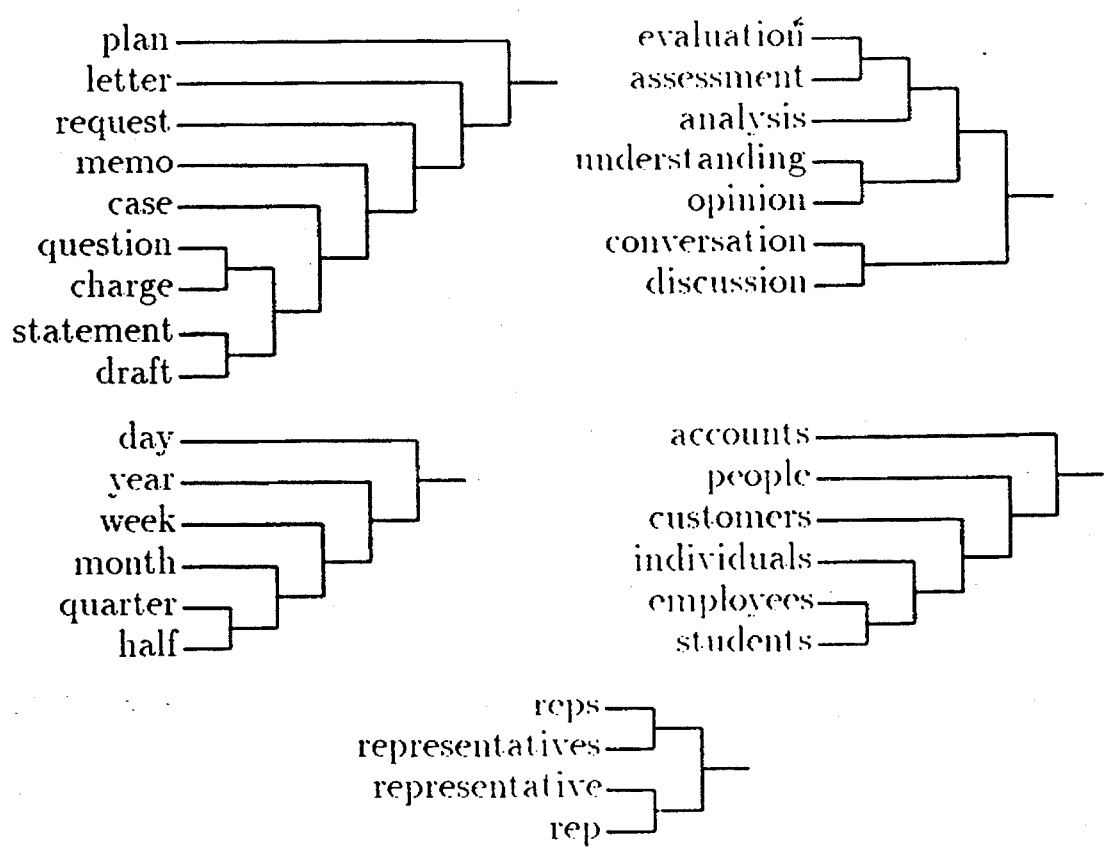
FIG. 39 shows some sample subtrees from a tree constructed using a clustering method.

FIG. 39 shows some of the substructures in a tree constructed in this manner using a simple 2-gram model for the 1000 most frequent words in a collection of office correspondence.

TABLE 17

Classes from a 260,741-word vocabulary

Friday Monday Thursday Wednesday Tuesday Saturday Sunday weekends Sundays Saturdays
June March July April January December October November September August
people guys folks fellows CEOs chaps doubters commies unfortunates blokes
down backwards ashore sideways southward northward overboard aloft downwards adrift
water gas coal liquid acid sand carbon steam shale iron
great big vast sudden mere sheer gigantic lifelong scant colossal
man woman boy girl lawyer doctor guy farmer teacher citizen
American Indian European Japanese German African Catholic Israeli Italian Arab
pressure temperature permeability density porosity stress velocity viscosity gravity tension
mother wife father son husband brother daughter sister boss uncle
machine device controller processor CPU printer spindle subsystem compiler plotter
John George James Bob Robert Paul William Jim David Mike
anyone someone anybody somebody
feet miles pounds degrees inches barrels tons acres meters bytes
director chief professor commissioner commander treasurer founder superintendent dean custodian
liberal conservative parliamentary royal progressive Tory provisional separatist federalist PQ
had hadn't hath would've could've should've must've might've
asking telling wondering instructing informing kidding reminding bothering thanking deposing
that tha theat
head body hands eyes voice arm seat eye hair mouth

TABLE 18

Randomly selected word classes little prima moment's trifle tad Litle minute's tinker's hornet's teammate's
ask remind instruct urge interrupt invite congratulate commend warn applaud
object apologize apologise avow whish
cost expense risk profitability deferral earmarks capstone cardinality mintage reseller
B dept. AA Whitey CL pi Namerow PA Mgr. LaRose
Rel rel. #S Shree
S Gens nai Matsuzawa ow Kageyama Nishida Sumit Zollner Mallik
research training education science advertising arts medicine machinery Art AIDS
rise focus depend rely concentrate dwell capitalize embark intrude typewriting
Minister mover Sydneys Minster Miniter
running moving playing setting holding carrying passing cutting driving fighting
court judge jury slam Edelstein magistrate marshal Abella Scalia larceny
annual regular monthly daily weekly quarterly periodic Good yearly convertible
aware unaware unsure cognizant apprised mindful partakers
force ethic stoppage force's conditioner stoppages conditioners waybill forwarder Atonabee
systems magnetics loggers products' coupler Econ databanks Centre inscriber correctors
industry producers makers fishery Arabia growers addiction medalist inhalation addict
brought moved opened picked caught tied gathered cleared hung lifted FIGS. 2, 3, and 4 schematically show examples of possible alignments between the hypothetical input series of source words in Table 1 and the hypothetical input series of target words in target hypothesis $E_1$ in Table 2. In each alignment, each source word in the input series of source words F is connected with at least one target word in the target hypothesis $E_1$ by solid line. In the alignment of FIG. 4, the second occurrence of the source word "La" has no solid line therefrom, and is therefore considered to be connected to the "null" word.

Tables 3, 4, and 5 provide alternate descriptions of the alignments of FIGS. 2, 3, and 4, respectively.

TABLE 3

Alignment $A_{h,1}$ For Hypothesis $E_h$
(h = 1) and Source Words F

| j | $f_j$ | $a_j$ | $e_{a_j}$ |
|---|---|---|---|
| 1 | La | 1 | The |
| 2 | clef | 2 | key |

TABLE 3-continued

Alignment $A_{h,1}$ For Hypothesis $E_h$
(h = 1) and Source Words F

| j | $f_j$ | $a_j$ | $e_{a_j}$ |
|---|---|---|---|
| 3 | est | 3 | is |
| 4 | dans | 4 | in |
| 5 | la | 5 | the |
| 6 | porte | 6 | door |

TABLE 4

Alignment $A_{h,2}$ For Hypothesis $E_h$
(h = 1) and Source Words F

| j | $f_j$ | $a_j$ | $e_{a_j}$ |
|---|---|---|---|
| 1 | La | 5 | the |
| 2 | clef | 2 | key |
| 3 | est | 3 | is |
| 4 | dans | 4 | in |
| 5 | la | 1 | The |

TABLE 4-continued

Alignment $A_{h,2}$ For Hypothesis $E_h$
(h = 1) and Source Words F

| j | $f_j$ | $a_j$ | $e_{aj}$ |
|---|---|---|---|
| 6 | porte | 6 | door |

TABLE 5

Alignment $A_{h,2}$ For Hypothesis $E_h$
(h = 1) and Source Words F

| j | $f_j$ | $a_j$ | $e_{aj}$ |
|---|---|---|---|
| 1 | La | 1 | The |
| 2 | clef | 2 | key |
| 3 | est | 3 | is |
| 4 | dans | 4 | in |
| 5 | la | 0 | <null> |
| 6 | porte | 6 | door | alignment connects each transformed source word with at least one target word in the target hypothesis.

Returning to FIG. 1, the translation apparatus further comprises a word match score generator 20. The word match score generator 20 generates, for each source word and each target hypothesis, a word match score comprising an estimate of the conditional probability P(f|e,X) of occurrence of the source word f, given the target word e in the target hypothesis which is connected to the source word f and given the context X of the target word e in the target hypothesis which is connected to the source word f.

Table 6 illustrates a hypothetical example of the context X of each target word $e_{a_j}$ in the target hypothesis $E_1$ of Table 2 for the alignment $A_{1,1}$ of Table 3 with the input series of source words F of Table 1.

TABLE 6

Context X of Target Word $e_{aj}$ For Alignment $A_{1,1}$ $X = \{e_{(aj-3)}, e_{(aj-2)}, e_{(aj-1)}, e_{(aj+1)}, e_{(aj+2)}, e_{(aj+3)}\}$

| j | $f_j$ | $e_{aj}$ | $x_1$ | $x_2$ | $x_3$ | $x_4$ | $x_5$ | $x_6$ |
|---|---|---|---|---|---|---|---|---|
| 1 | La | The | <null> | <null> | <null> | key | is | in |
| 2 | clef | key | <null> | <null> | The | is | in | the |
| 3 | est | is | <null> | The | key | in | the | door |
| 4 | dans | in | The | key | is | the | door | . |
| 5 | la | the | key | is | in | door | . | <null> |
| 6 | porte | door | is | in | the | . | <null> | <null> |

In each Table, for each parameter j ranging from 1 to m (where m is the number of words in the input series of source words), there is another parameter $a_j$ having a single value in the range from 0 to l (wherein l is the number of words in the target hypothesis).

For a given alignment, each word $f_j$ in the input series of source words is connected to the word $e_{a_j}$ in the target hypothesis.

In general, there are $2^{lm}$ possible alignments between a series of m source words and a series of l non-null target words, where each source word may be connected to either the null source word or one or more non-null target words. If each source word is constrained to be connected to only one null or non-null target word, then there are $m^{(l+1)}$ possible alignments.

Preferably, only one alignment between the input series of source words and each target hypothesis is identified for obtaining a word match score, described below, for each source word. The one identified alignment for the series of source words and each target hypothesis is preferably that which is produced by the target hypothesis generator, as described in Section 14 of Brown et al, cited above, which is incorporated herein by reference set forth in full above.

If the source text input device 10 comprises means for transforming the input series of source words into a series of transformed source words, then the alignment identifier 18 identifies at least one alignment between the series of transformed source words and each target hypothesis. The As shown in Table 6, in this hypothetical example the context X of a selected target word consists of the three target words preceding the selected target word and the three target words following the selected target word in the target hypothesis. The context also includes punctuation and absence of words.

In general, the context of the target word $e_{a_j}$ in the target hypothesis E which is connected to a source word $f_j$ may be contained in at least one of two or more context classes. The estimated conditional probability of occurrence of a source word, given the target word in the target hypothesis which is connected to the source word and given the context of the target word connected to the source word, may comprise at least one function having a value dependent on the class containing the context of the target word which is connected to the source word.

Alternatively, the context may comprise at least one word having a part of speech in the target hypothesis. The estimated conditional probability of occurrence of a source word, given the target word in the target hypothesis which is connected to the source word and given the context of the target word which is connected to the source word, may comprise at least one function having a value dependent on the part of speech in the target hypothesis of at least one word in the context of the target word which is connected to the source word.

In another example, the context of the target word in the target hypothesis which is connected to a source word comprises at least one word having an identity. The estimated conditional probability of occurrence of the source word, given the target word in the target hypothesis which is connected to the source word and given the context of the target word which is connected to the source word, comprises at least one function having a value dependent on the identity of at least one word in the context of the target word which is connected to the source word.

Equations 3, 4, 5, and 6 are hypothetical examples of functions having values dependent on the context of the target word which is connected to a source word.

$g_1(f, e = \text{key}, X)$ = 1, if $f$ = "clef", and the word (3)

$x_3$ in $X$ immediately preceding "key" is "the";

= 0, otherwise.

$g_2(f, e = \text{key}, X)$ = 1, if $f$ = "clef", and the word (4)

$x_3$ in $X$ immediately preceding "key" is "car";

= 0, otherwise.

$g_3(f, e = \text{key}, X)$ = 1, if $f$ = "ton", and the word (5)

$x_3$ in $X$ immediately preceding "key" is "the";

= 0, otherwise.

$g_4(f, e = \text{key}, X)$ = 1, if $f$ = "ton", and the word (6)

$x_4$ in $X$ immediately following "key", or the word $x_5$ in $X$ next following "key" is an element of the set $\{A, B, C, D, E, F, G\}$;

= 0, otherwise.

In Equation 3, the function $g_1$ has a value of 1, if the source word f is "clef", if the target word e is "key", and if the word in the context X immediately preceding "key" is "the". If these conditions are not met, the context function $g_1$ has a value of 0.

The hypothetical context function $g_2$ of Equation 4 has a value of 1, if the source word f is "clef", if the target word e is "key", and if the word in the context X immediately preceding "key" is "car". If these conditions are not met, the function $g_2$ has a value of 0.

In Equation 5, the context function $g_3$ has a value of 1 if the source word f is "ton", if the target word e is "key", and if the word in the context X immediately preceding "key" is "the". If these conditions are not met, the context function $g_3$ has a value of 0.

Finally, the hypothetical context function $g_4$ in Equation 6 has a value of 1 if the source word f is "ton", the target word e is "key", and if the word in the context X immediately following "key", or the word in the context X next following "key" is an element of the set $\{A, B, C, D, E, F, G\}$. If these conditions are not met, the context function $g_4$ has a value of 0.

Table 7 illustrates the evaluation of context functions g(f,e,X) for the source word f="clef", for the target word e="key", and for the context X of the target word "key" in the target hypothesis $E_1$ of Table 2.

TABLE 7

| | | | Context Functions g(f,e,X) | | | | | | | | |
|---|---|---|---|---|---|---|---|---|---|---|---|
| | | | $X = \{e_{(aj-3)}, e_{(aj-2)}, e_{(aj-1)},$ $e_{(aj+1)}, e_{(aj+2)}, e_{(aj+3)}\}$ | | | | | | $g(f_j, e_{aj}, X)$ | | |
| j | $f_j$ | $e_{aj}$ | $x_1$ | $x_2$ | $x_3$ | $x_4$ | $x_5$ | $x_6$ | $g_1$ | $g_2$ | $g_3$ | $g_4$ |
| 2 | clef | key | <null> | <null> | The | is | in | the | 1 | 0 | 0 | 0 |

As shown in Table 7, the context function $g_1$ has a value of 1, and the context functions $g_2$, $g_3$ and $g_4$ have values of 0.

As discussed above, the word match score for each source word and each target hypothesis comprises an estimate of the conditional probability P(f|e,X) of occurrence of the source word f given the target word e in the target hypothesis which is connected to the source word f and given the context X of the target word e in the target hypothesis which is connected to the source word f. The word match score may be obtained, for example, using a model defined by Equation 7 as follows.

$$P(f|e,X) = \frac{1}{N(e,X)} e^{\sum_i \lambda_{(e,i)} g_i(f,e,X)} \quad (7)$$

In Equation 7, the functions $g_i(f,e,X)$ are functions having values dependent on the context X of the target word e which is connected to the source word f in an alignment between an input series of source words and a target hypothesis. The parameters $\lambda_{(e,i)}$ are parameters representing the relative strength of each context function $g_i$ in predicting the source word f from the target word e in the context X. The quantity N(e,X) is a normalization factor which depends on the target word e and the context X of the target word e, as shown in Equation 8.

$$N(e,X) = \sum_f e^{\sum_i \lambda_{(e,i)} g_i(f,e,X)} \quad (8)$$

For the target word e="key" and for the hypothetical context functions $g_1$ through $g_4$ of Equations 3–6, above, Equation 9 is a hypothetical model for generating word match scores for source words f.

$$P(f|e = \text{key}, X) = \frac{1}{N(e,X)} \times e^{[\lambda_{(e=\text{key},1)} g_1(f,e=\text{key},X) + \lambda_{(e=\text{key},2)} g_2(f,e=\text{key},X)]} \\ \times e^{[\lambda_{(e=\text{key},3)} g_3(f,e=\text{key},X) + \lambda_{(e=\text{key},4)} g_4(f,e=\text{key},X)]} \quad (9)$$

For the purpose of Equation 9, the normalization N(e,X) is given by Equation 10.

$$N(e = \text{key}, X) = \sum_f e^{\sum_i \lambda_{(e=\text{key},i)} g_i(f,e=\text{key},X)} \quad (10)$$

To illustrate the use of this model, hypothetical values for the model parameters are $\lambda_{(e=\text{key},1)}$=0.12, $\lambda_{(e=\text{key},2)}$=0.34, $\lambda_{(e=\text{key},3)}$=0.09, and $\lambda_{e=\text{key},4}$=0.40.

Table 8 illustrates the computation of the word match score from Equations 7 and 9 for the source word "clef", the target word "key", and the context X of "key" in the target hypothesis $E_1$ of Table 2.

TABLE 8

Computation of Word Match Score P("clef"|"key", X)

| $f_j$ | $e_{a_j}$ | $x_1$ | $x_2$ | $x_3$ | $x_4$ | $x_5$ | $x_6$ | $g_1$ | $g_2$ | $g_3$ | $g_4$ |
|---|---|---|---|---|---|---|---|---|---|---|---|
| | | \<null\> | \<null\> | | | | | | | | |
| clef | key | \<null\> | \<null\> | The | is | in | the | 1 | 0 | 0 | 0 |
| ton | key | \<null\> | \<null\> | The | is | in | the | 0 | 0 | 1 | 0 |

$\lambda_{(e=key,1)} = .12$ $\lambda_{(e=key,2)} = .34$ $\lambda_{(e=key,3)} = .09$ $\lambda_{(e=key,4)} = .40$ $e^{\sum_i \lambda_{(e,i)} g_i(clef, key, X)} = 1.127$ $e^{\sum_i \lambda_{(e,i)} g_i(ton, key, X)} = 1.094$ $N(e = key, X) = e^{\sum_i \lambda_{(e,i)} g_i(clef, key, X)} + e^{\sum_i \lambda_{(e,i)} g_i(ton, key, X)} = 2.221$ $P("clef"|"key", X) = 0.507$ In this hypothetical example, the conditional probability P("clef"|"key", X) of occurrence of the source word "clef" given the target word "key" in the target hypothesis which is connected to the source word "clef" and given the context X of the target word "key" in the target hypothesis which is connected to the source word "clef" is equal to 0.507 (from Equations 9 and 10).

If the alignment identifier 18 identifies two or more alignments between the input series of source words and each target hypothesis, the word match score generator generates a word match score for each source word and each alignment and each target hypothesis. Each word match score may be estimated using the model of Equation 7.

If the source text input device 10 comprises means for transforming the input series of source words into a series of transformed source words, then the word match score generator generates a word match score for each transformed source word and each target hypothesis. The word match score comprises an estimate of conditional probability of occurrence of the transformed source word, given the target word in the target hypothesis which is connected to the transformed source word and given the context of the target word in the target hypothesis which is connected to the transformed source word. The word match score for a transformed word may also be estimated using the model of Equation 7.

The translation apparatus according to the invention further comprises a translation match score generator 22. The translation match score generator 22 generates, for each target hypothesis, a translation match score comprising a combination of the word match scores for the target hypothesis and the source words in the input series of source words. The translation match score for a target hypothesis may, for example, comprise the product of the word match scores for the target hypothesis and the source words in the input series of source words.

Table 9 illustrates the computation of a translation match score for the input series of source words $f_j$ of Table 1, and for the target words $e_{a_j}$ in the target hypothesis $E_1$ of Table 2.

TABLE 9

Translation Match Score: Alignment = $A_{1,1}$

| j | $f_j$ | $a_j$ | $e_{a_j}$ | $P(f_j|e_{a_j}, X)$ |
|---|---|---|---|---|
| 1 | La | 1 | The | 0.91 |
| 2 | clef | 2 | key | 0.507 |
| 3 | est | 3 | is | 0.87 |
| 4 | dans | 4 | in | 0.63 |
| 5 | la | 5 | the | 0.91 |
| 6 | porte | 6 | door | 0.79 |

Translation Match Score = $\prod_{j=1}^{6} P(f_j|e_{a_j}, X) = 0.182$ (to illustrate the invention, this example assumes the fertility and distortion scores, and the combinatorial factor are all equal to 1)

Each word match score $P(f_j|e_{a_j}, X)$ is obtained from Equation 7. The numbers in Table 9 are hypothetical numbers. For the purpose of illustrating the present invention, the fertility and distortion scores of Brown et al, described above, are assumed equal to one.

Returning to FIG. 1, the translation apparatus comprises a hypothesis match score generator 24 for generating a target hypothesis match score for each target hypothesis. Each target hypothesis match score comprises a combination (for example, the product) of the language model match score for the target hypothesis and the translation match score for the target hypothesis. As discussed above, the language model match score may be obtained from known language models such as the n-gram language models described by Brown et al.

If the alignment identifier 18 identifies two or more alignments between the input series of source words and each target hypothesis, the translation match score for each target hypothesis comprises a combination of the word match scores for the target hypothesis and the alignments and the source words in the input series of source words.

If the source text input device 10 comprises means for transforming the input series of source words into a series of transformed source words, the translation match score comprises a combination of the word match scores for the target hypothesis and the transformed source words.

The translation apparatus according to the invention further comprises an output 26. The output 26 outputs the target hypothesis having the best target hypothesis match score.

The output 26 may comprise, for example, a display or a printer.

If the source text input device 10 comprises means for transforming the input series of source words into a series of transformed source words, then the output 26 comprises means for synthesizing a series of output words from the target hypothesis having the best target hypothesis match score. The means for synthesizing output words from the target hypothesis may comprise target transducers such as those described at Section 5 of Brown et al (cited above) which is incorporated herein by reference. For example, the target word "be" with a tag representing the tense of the original input source word, may be transformed to one of the synthesized output words {be, was, were, been, am, are, is, being} which are forms of the verb infinitive "be".

As described above, Equation 7 is an example of a model which may be used to obtain word match scores according to the present invention. The context functions $g_i(f,e,X)$ of the word match score model, and the parameters $\lambda_{(e,i)}$, of the word match score model may be obtained as follows.

Candidate context functions $g_i(f,e,X)$ may be obtained, for example, by limiting the context X of the target word in the target hypothesis to three words to the left of the target word e and three words to the right of the target word e, as shown in the example of Table 6, above.

Next, a training text of source language sentences and target language sentences which are translations of each other is obtained. Corresponding source language sentences and target language sentences which are translations of each other may be identified, for example, by a skilled translator. Preferably, corresponding source language sentences and target language sentences which are translations of each other may be identified automatically, for example, by the method described in Sections 12 and 13 of Brown et al (cited above), which are incorporated herein by reference, and set forth in its entirety herein at this time.

ALIGNING SENTENCES (Brown et al. Section 12)

In this section, a method is described for aligning sentences in parallel corpora, and extracting from parallel corpora pairs of sentences which are translations of one another. These tasks are not trivial because at times a single sentence in one corpora is translated as two or more sentences in the other corpora. At other times a sentence, or even a whole passage, may be missing from one or the other of the corpora.

A number of researchers have developed methods that align sentences according to the words that they contain. (See for example, Deriving translation data from bilingual text by R. Catizone, G. Russel, and S. Warwick, appearing in Proceedings of the First International Acquisition Workshop, Detroit, Mich., 1989; and "Making Connections", by M. Kay, appearing in ACH/ALLC '91, Tempe, Ariz, 1991.) Unfortunately, these methods are necessarily slow and, despite the potential for high accuracy, may be unsuitable for very large collections of text.

In contrast, the method described here makes no use of lexical details of the corpora. Rather, the only information that it uses, besides optional information concerning anchor points, is the lengths of the sentences of the corpora. As a result, the method is very fast and therefore practical for application to very large collections of text.

The method was used to align several million sentences from parallel French and English corpora derived from the proceedings of the Canadian Parliament. The accuracy of these alignments was in excess of 99% for a randomly selected set of 1000 alignments that were checked by hand. The correlation between the lengths of aligned sentences indicates that the method would achieve an accuracy of between 96% and 97% even without the benefit of anchor points. This suggests that the method is applicable to a very wide variety of parallel corpora for which anchor points are not available.

Overview (Brown et al. Section 12.1)

Figure 40:
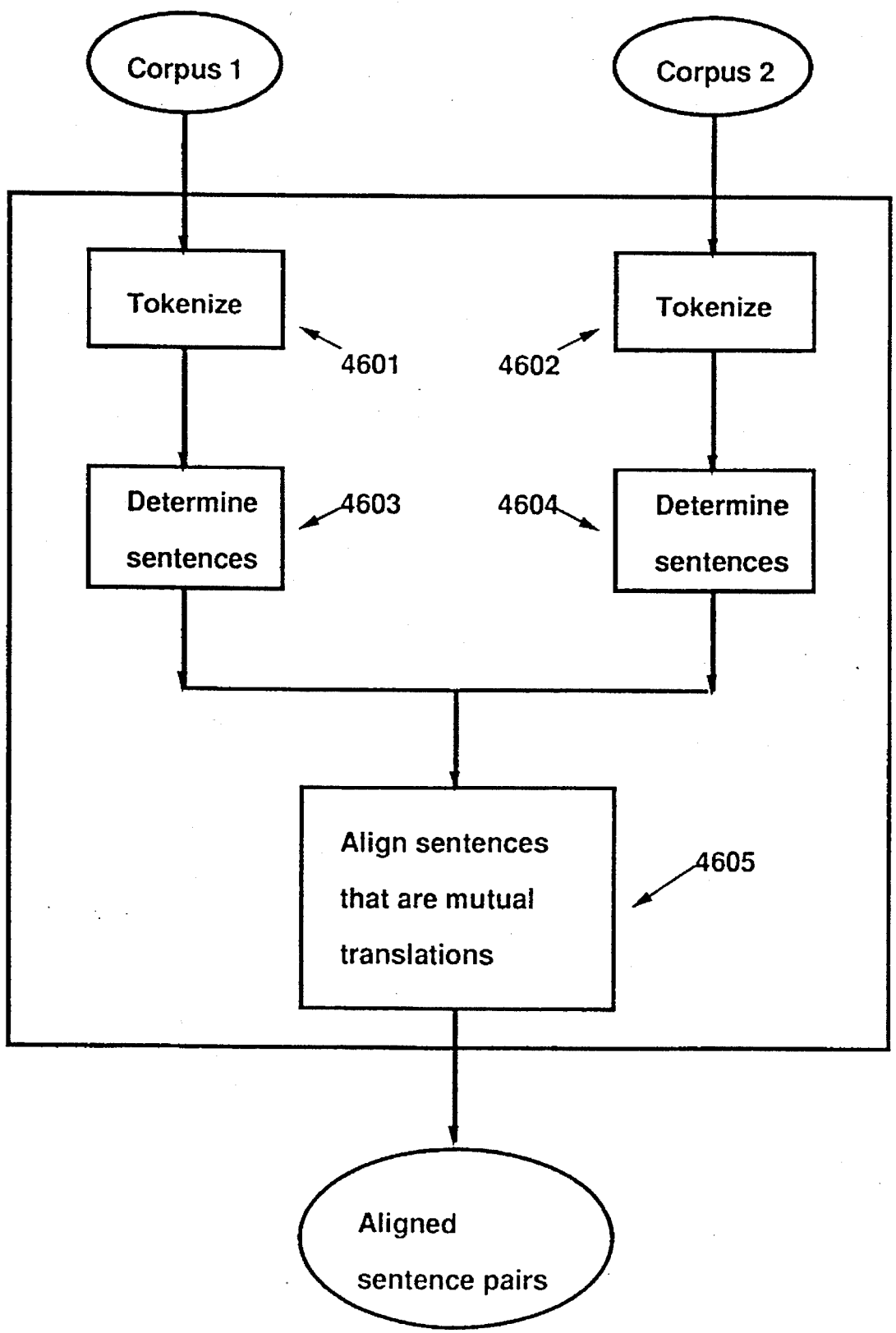
FIG. 40 is a schematic flow diagram of a method for aligning sentences in parallel corpora.

One embodiment of the method is illustrated schematically in FIG. 40. It comprises the steps of:

4601 and 4602. Tokenizing the text of each corpus.

4603 and 4604. Determining sentence boundaries in each corpus.

4605. Determing alignments between the sentences of the two corpora.

Figure 41:
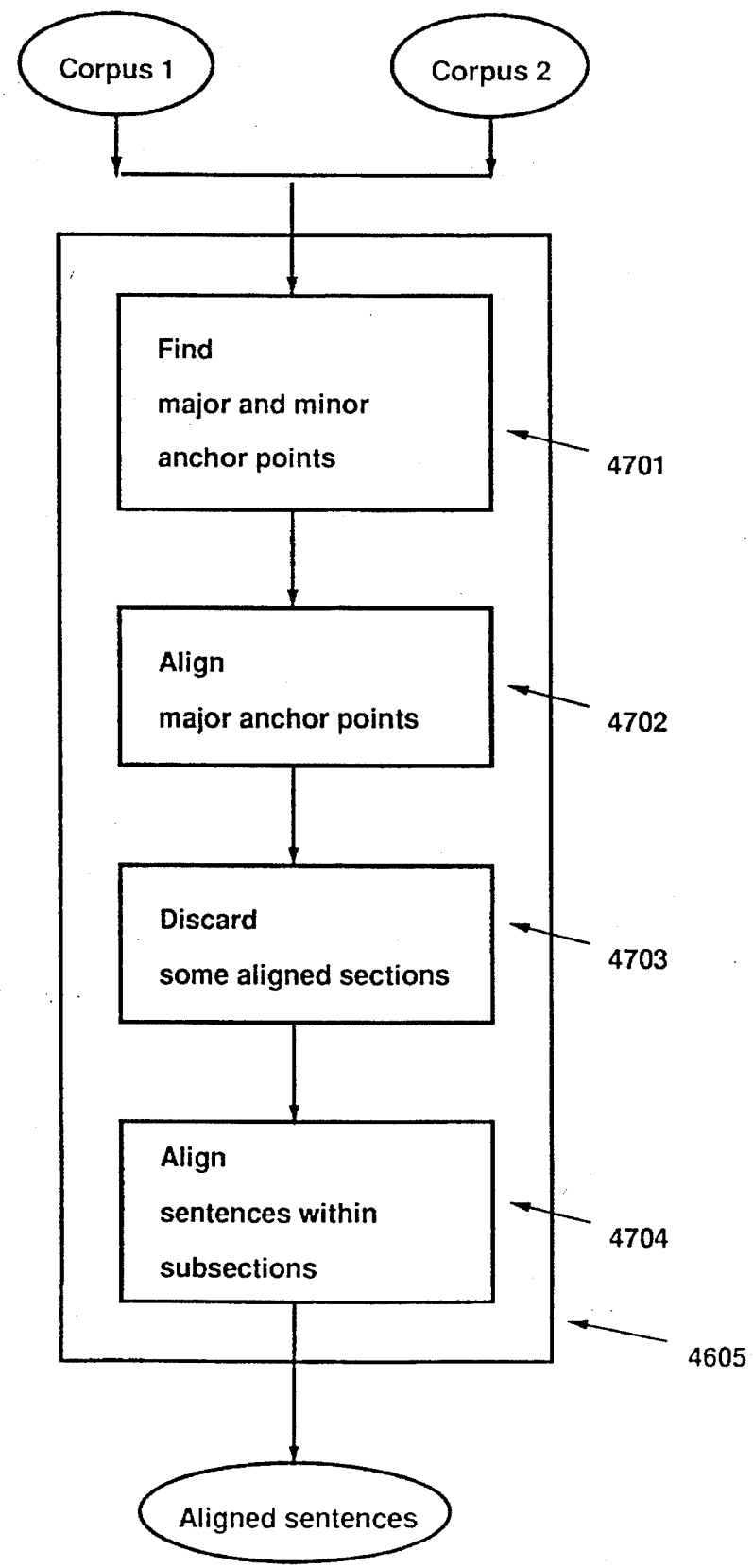
FIG. 41 is a schematic flow diagram of the basic step of a method for aligning sentences.

The basic step 4605 of determining sentence alignments is elaborated further in FIG. 41. It comprises the steps of:

4701. Finding major and minor anchor points in each corpus. This divides each corpus into sections between major anchor points, and subsections between minor anchor points.

4702. Determining alignments between major anchor points.

4703. Retaining only those aligned sections for which the the number of subsections is the same in both corpora.

4704. Determining alignments between sentences within each of the remaining aligned subsections.

One embodiment of the method will now be explained. The various steps will be illustrated using as an example the aforementioned parallel French and English corpora derived from the Canadian Parliamentary proceedings. These proceedings, called Hansards, are transcribed in both English and French. The corpora of the example consists of the English and French Hansard transcripts for the years 1973 through 1986.

It is understood that the method and techniques illustrated in this embodiment and the Hansard example can easily be extended and adapted to other corpora and other languages.

Tokenization and Sentence Detection (Brown et al. Section 12.2)

First, the corpora are tokenized (steps 4601 and 4602) using a finite-state tokenizer of the sort described in Subsection 3.2.1. Next, (steps 4602 and 4603), the corpora are partitioned into sentences using a finite state sentence boundary detector. Such a sentence detector can easily be constructed by one skilled in the art. Generally, the sentences produced by such a sentence detector conform to the grade-school notion of sentence: they begin with a capital letter, contain a verb, and end with some type of sentence-final punctuation. Occasionally, they fall short of this ideal and consist merely of fragments and other groupings of words.

In the Hansard example, the English corpus contains 85,061,286 tokens in 3,510,744 sentences, and the French corpus contains 97,857,452 tokens in 3,690,425 sentences. The average English sentence has 24.2 tokens, while the average French sentence is about 9.5% longer with 26.5 tokens. The left-hand side of FIG. 42 shows the raw data for a portion of the English corpus, and the right-hand side shows the same portion after it was cleaned, tokenized, and divided into sentences. The sentence numbers do not advance regularly because the sample has been edited in order to display a variety of phenomena.

Selecting Anchor Points (Brown et al. Section 12.3)

The selection of suitable anchor points (Step 4701) is a corpus-specific task. Some corpora may not contain any reasonable anchors.

In the Hansard example, suitable anchors are supplied by various reference markers that appear in the transcripts. These include session numbers, names of speakers, time stamps, question numbers, and indications of the original language in which each speech was delivered. This auxiliary information is retained in the tokenized corpus in the form of comments sprinkled throughout the text. Each comment has the form \SCM{} . . . \ECM {} as shown on the right-hand side of FIG. 42.

To supplement the comments which appear explicitly in the transcripts, a number of additional comments were added. Paragraph comments were inserted as suggested by the space command of the original markup language. An example of this command appears in the eighth line on the left-hand side of FIG. 42. The beginning of a parliamentary session was marked by a Document comment, as illustrated in Sentence 1 on the right-hand side of FIG. 42. Usually, when a member addresses the parliament, his name is recorded. This was encoded as an Author comment, an example of which appears in Sentence 4. If the president speaks, he is referred to in the English corpus as Mr. Speaker and in the French corpus as M. le Président. If several members speak at once, a shockingly regular occurrence, they are referred to as Some Hon. Members in the English and as Des Voix in the French. Times are recorded either as exact times on a 24-hour basis as in Sentence 81, or as inexact times of which there are two forms: Time=Later and Time=Recess. These were encoded in the French as Time= Plus Tard and Time=Recess. Other types of comments are shown in Table 13.

TABLE 13

Examples of comments

| English | French |
| --- | --- |
| Source = English | Source = Traduction |
| Source = Translation | Source = Francais |
| Source = Text | Source = Texte |
| Source = List Item | Source = List Item |
| Source = Question | Source = Question |
| Source = Answer | Source = Reponse |

The resulting comments laced throughout the text are used as anchor points for the alignment process. The comments Author=Mr. Speaker, Author=M. le Preésident, Author=Some Hon. Members, and Author=Des Voix are deemed minor anchors. All other comments are deemed major anchors with the exception of the Paragraph comment which was not treated as an anchor at all. The minor anchors are much more common than any particular major anchor, making an alignment based on minor anchors much less robust against deletions than one based on the major anchors.

Aligning Major Anchors (Brown et al. Section 12.4)

Major anchors, if they are to be useful, will usually appear in parallel in the two corpora. Sometimes, however, through inattention on the part of translators or other misadventure, an anchor in one corpus may be garbled or omitted in another. In the Hansard example, for instance, this is problem is not uncommon for anchors based upon names of speakers.

The major anchors of two corpora are aligned (Step 4702) by the following method. First, each connection of an alignment is assigned a numerical cost that favors exact matches and penalizes omissions or garbled matches. In the Hansard example, these costs were chosen to be integers between 0 and 10. Connections between corresponding pairs such as Time= Later and Time=Plus Tard, were assigned a cost of 0, while connections between different pairs such as Time=Later and Author=Mr. Bateman were assigned a cost of 10. A deletion is assigned a cost of 5. A connection between two names was assigned a cost proportional to the minimal number of insertions, deletions, and substitutions necessary to transform one name, letter by letter, into the other.

Given these costs, the standard technique of dynamic programming is used to find the alignment between the major anchors with the least total cost. Dynamic programming is described by R. Bellman in the book titled Dynamic Programming, published by Princeton University Press, Princeton, N.J. in 1957. In theory, the time and space required to find this alignment grow as the product of the lengths of the two sequences to be aligned. In practice, however, by using thresholds and the partial traceback technique described by Brown, Spohrer, Hochschild, and Baker in their paper, Partial Traceback and Dynamic Programming, published in the Proceedings of the IEEE International Conference on Acoustics, Speech and Signal Processing, in Paris, France in 1982, the time required can be made linear in the length of the sequences, and the space can be made constant. Even so, the computational demand is severe. In the Hansard example, the two corpora were out of alignment in places by as many as 90,000 sentences owing to mislabelled or missing files.

Discarding Sections (Brown et al. Section 12.5)

The alignment of major anchors partitions the corpora into a sequence of aligned sections. Next, (Step 4703), each section is accepted or rejected according to the population of minor anchors that it contains. Specifically, a section is accepted provided that, within the section, both corpora contain the same number of minor anchors in the same order. Otherwise, the section is rejected. Altogether, using this criteria, about 10% of each corpus was rejected. The minor anchors serve to divide the remaining sections into subsections that range in size from one sentence to several thousand sentences and average about ten sentences.

Aligning Sentences (Brown et al. Section 12.6)

The sentences within a subsection are aligned (Step 4704) using a simple statistical model for sentence lengths and paragraph markers. Each corpus is viewed as a sequence of sentence lengths punctuated by occasional paragraph markers, as illustrated in FIG. 43. In this figure, the circles around groups of sentence lengths indicate an alignment between the corresponding sentences. Each grouping is called a bead. The example consists of an ef-bead followed by an eff-bead followed by an e-bead followed by a $\P_e\P_f$-bead. From this perspective, an alignment is simply a sequence of beads that accounts for the observed sequences of sentence lengths and paragraph markers. The model assumes that the lengths of sentences have been generated by a pair of random processes, the first producing a sequence of beads and the second choosing the lengths of the sentences in each bead.

The length of a sentence can be expressed in terms of the number of tokens in the sentence, the number of characters in the sentence, or any other reasonable measure. In the Hansard example, lengths were measured as numbers of tokens.

The generation of beads is modelled by the two-state Markov model shown in FIG. 44. The allowed beads are shown in FIG. 45. A single sentence in one corpus is assumed to line up with zero, one, or two sentences in the other corpus. The probabilities of the different cases are assumed to satisfy Pr(e)=Pr(f), Pr(eff)=Pr(eef), and Pr($\P_e$)= Pr($\P_f$).

The generation of sentence lengths given beads is modeled as follows. The probability of an English sentence of length $l_e$ given an e-bead is assumed to be the same as the probability of an English sentence of length $l_e$ in the text as a whole. This probability is denoted by Pr($l_e$). Similarly, the probability of a French sentence of length $l_f$ given as f-bead is assumed to equal Pr($l_f$). For an ef-bead, the probability of an English sentence of length $l_e$ is assumed to equal Pr($l_e$) and the log of the ratio of length of the French sentence to the length of the English sentence is assumed to be normally distributed with mean $\mu$ and variance $\sigma^2$. Thus, if $r=\log(l_f/l_e)$, then $$Pr(l_f/l_e)=\alpha\exp[-(r-\mu)^2/(2\sigma^2)], \qquad (181)$$

with $\alpha$ chosen so that the sum of Pr($l_f$|$l_e$) over positive values of $l_f$ is equal to unity. For an eef-bead, the English sentence lengths are assumed to be independent with equal marginals Pr($l_e$), and the log of the ratio of the length of the French sentence to the sum of the lengths of the English sentences is assumed to be normally distributed with the same mean and variance as for an ef-bead. Finally, for an eff-bead, the probability of an English length $l_e$ is assumed to equal Pr($l_e$) and the log of the ratio of the sum of the lengths of the French sentences to the length of the English sentence is assumed to be normally distributed as before. Then, given the sum of the lengths of the French sentences, the probability of a particular pair of lengths, $l_{f_1}$ and $l_{f_2}$, is assumed to be proportional to Pr($l_{f_1}$)Pr($l_{f_2}$).

Together, the model for sequences of beads and the model for sentence lengths given beads define a hidden Markov model for the generation of aligned pairs of sentence lengths. Markov Models are described by L. Baum in the article "An Inequality and associated maximization technique in statistical estimation of probabilistic functions of a Markov process", appearing in Inequalities in 1972.

The distribution Pr($l_e$) and Pr($l_f$) are determined from the relative frequencies of various sentence lengths in the data. For reasonably small lengths, the relative frequency is a reliable estimate of the corresponding probability. For longer lengths, probabilities are determined by fitting the observed frequencies of longer sentences to the tail of a Poisson distribution. The values of the other parameters of the Markov model can be determined by from a large sample of text using EM method. This method is described in the above referenced article by E. Baum.

TABLE 14

| Parameter estimates | |
| --- | --- |
| Parameter | Estimate |
| Pr (e), Pr (f) | .007 |
| Pr (ef) | .690 |
| Pr (eef), Pr (eff) | .020 |
| Pr ($\P_e$), Pr ($\P_f$) | .005 |
| Pr ($\P_e\P_f$) | .245 |
| $\mu$ | .072 |
| $\sigma^2$ | .043 |

Figure 46:
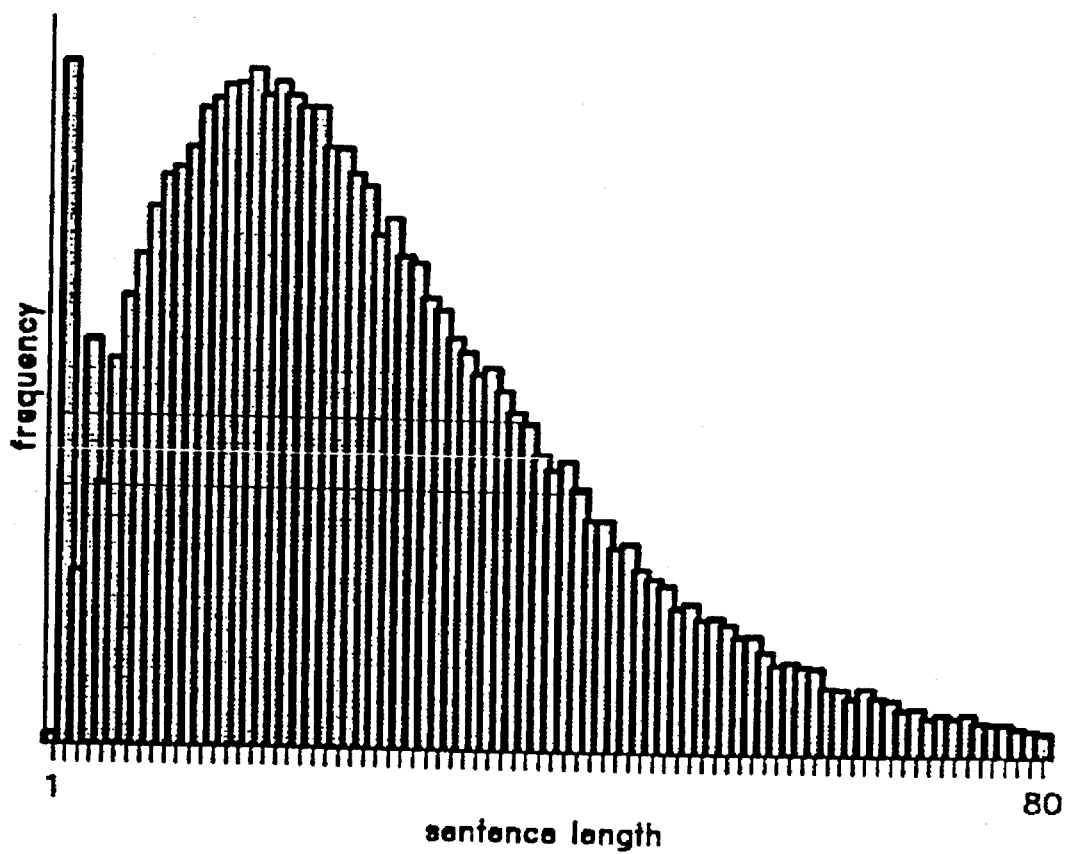
FIG. 46 is a histogram of French sentence lengths.
Figure 47:
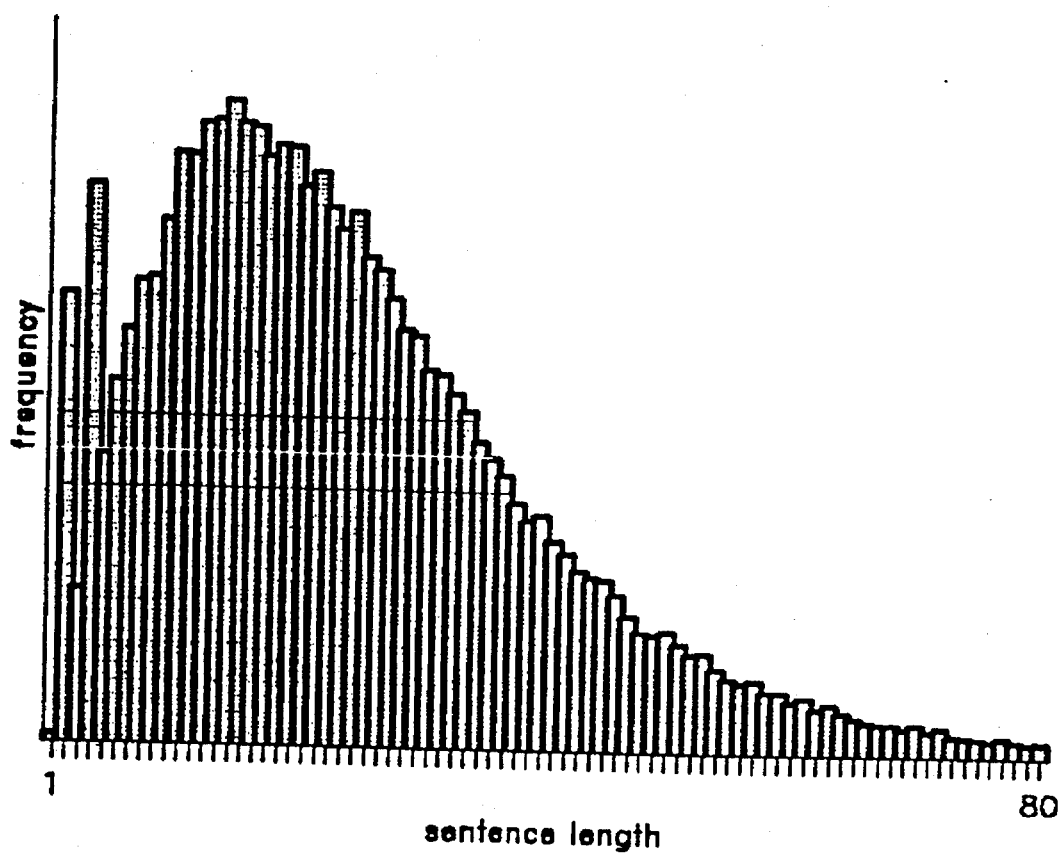
FIG. 47 is a histogram of English sentence lengths.

For the Hansard example, histograms of the sentence length distribution Pr($l_e$) and Pr(flen) for lengths up to 81 are shown in FIGS. 46 and 47 respectively. Except for lengths 2 and 4, which include a large number of formulaic sentences in both the French and the English, the distributions are very smooth.

The parameter values for the Hansard example are shown in Table 14. From these values it follows that 91% of the English sentences and 98% of the English paragraph markers line up one-to-one with their French counterparts. If X is a random variable whose log is normally distributed with mean $\mu$ and variance $\sigma^2$, then the mean X is exp $(\mu+\sigma^2/2)$. Thus from the values in the table, it also follows that the total length of the French text in an ef-, eef-, or eff-bead is about 9.8% greater on average then the total length of the corresponding English text. Since most sentences belong to ef-beads, this is close to the value of 9.5% given above for the amount by which the length of the average French sentences exceeds that of the average English sentence.

Ignoring Anchors (Brown et al. Section 12.7)

For the Hansard example, the distribution of English sentence lengths shown in FIG. 46 can be combined with the conditional distribution of French sentence lengths given English sentence lengths from Equation (181) to obtain the joint distribution of French and English sentences lengths in ef-, eef-, and eff-beads. For this joint distribution, the mutual information between French and English sentence lengths is 1.85 bits per sentence. It follows that even in the absence of anchor points, the correlation in sentence lengths is strong enough to allow alignment with an error rate that is asymptotically less than 100%.

Numerical estimates for the error rate as a function of the frequency of anchor points can be obtained by Monte Carlo simulation. The empirical distributions Pr($l_e$) and Pr($l_f$) shown in FIGS. 46 and 47, and the parameter values from Table 14 can be used to generated an artificial pair of aligned corpora, and then, the most probable alignment for these corpora can be found. The error rate can be estimated as the fraction of ef-beads in the most probable alignment that did not correspond to ef-beads in the true alignment.

By repeating this process many thousands of times, an expected error rate of about 0.9% was estimated for the actual frequency of anchor points in the Hansard data. By varying the parameters of the hidden Markov model, the effect of anchor points and paragraph markers on error rate can be explored. With paragraph markers but no anchor points, the expected error rate is 2.0%, with anchor points but no paragraph markers, the expected error rate is 2.3%, and with neither anchor points nor paragraph markers, the expected error rate is 3.2%. Thus, while anchor points and paragraph markers are important, alignment is still feasible without them. This is promising since it suggests that the

TABLE 15

Unusual but correct alignments

| | |
|---|---|
| And love and kisses to you, too. | Pareillement. |
| ... mugwumps who sit on the fence with their mugs on one side and their wumps on the other side and do not know which side to come down on. | ... en voulant ménagerlachévreetlechoux ils n'arrivent pas á prendre parti. |
| At first reading, she may have. | Elle semble en effet avoir un grief tout a fait valable, du moins au premier abord. |

Results for the Hansard Example (Brown et al. Section 12.8)

For the Hansard example, the alignment method described above ran for 10 days on an IBM Model 3090 mainframe under an operating system that permitted access to 16 megabytes of virtual memory. The most probable alignment contained 2,869,041 ef-beads. In a random sample 1000 the aligned sentence pairs, 6 errors were found. This is consistent with the expected error rate of 0.9% mentioned above. In some cases, the method correctly aligned sentences with very different lengths. Examples are shown in Table 15.

ALIGNING BILINGUAL CORPORA (Brown et al. Section 13)

With the growing availability of machine-readable bilingual texts has come a burgeoning interest in methods for extracting linguistically valuable information from such texts. One way of obtaining such information is to construct sentence and word correspondences between the texts in the two languages of such corpora.

Figure 48:
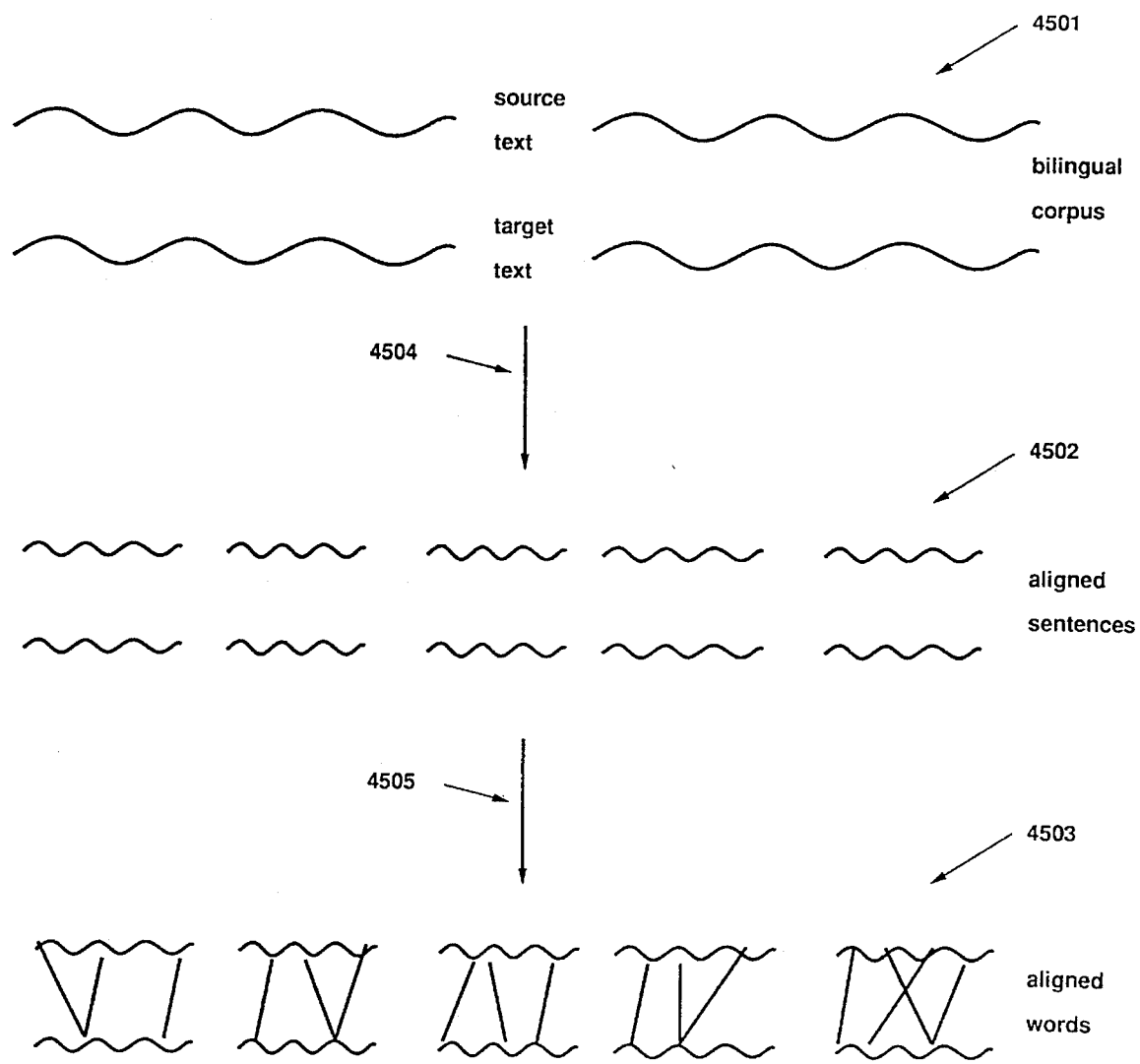
FIG. 48 is a schematic diagram of a process by which word-by-word correspondences are extracted from a bilingual corpus.

A method for doing this is depicted schematically in FIG. 48. This method comprises the steps of 4501. Beginning with a large bilingual corpus;

4504. Extracting pairs of sentences 4502 from this corpus such that each pair consists of a source and target sentence which are translations of each other;

4505. Within each sentence pair, aligning the words of the target sentence with the words in a source sentence, to obtain a bilingual corpus labelled with word-by-word correspondences 4503.

In one embodiment of Step 4504, pairs of aligned sentences are extracted using the method explained in detain in Section 12. The method proceeds without inspecting the identities of the words within sentences, but rather uses only the number of words or number of characters that each sentence contains.

In one embodiment of Step 4505, word-by-word correspondence within a sentence pair are determined by finding the Viterbi alignment or approximate Viterbi alignment for the pair of sentences using a translation model of the sort discussed in Sections 8–10 above. These models constitute a mathematical embodiment of the powerfully compelling intuitive feeling that a word in one language can be translated into a word or phrase in another language.

Word-by-word alignments obtained in this way offer a valuable resource for work in bilingual lexicography and machine translation. For example, a method of cross-lingual sense labeling, described in Section 11, and also in the aforementioned paper, "Word Sense Disambiguation using Statistical Methods", uses alignments obtained in this way as data for construction of a statistical sense-labelling module.

For each pair of corresponding source and target sentences in the training text, the estimated most probable alignment between the source words and the target words is found using the method described above used by the alignment identifier 18. Each occurrence of a target word $e_{a_j}$ in the training text is then identified and tagged with the source word $f_j$ connected to the target word $e_{a_j}$ in each alignment. The target word $e_{a_j}$ is also tagged with its context X in each target sentence.

Table 10 illustrates a hypothetical example of training events for a target word $e_{a_j}$="key" in a training text of aligned source language sentences and target language sentences.

TABLE 10

TRAINING EVENTS

Occurrences of $e_{aj}$ = "key" in a training text of aligned source and target sentences, the source word $f_j$ connected to "key" in each alignment, and the context X of "key" in each target sentence.

| | | $X = \{e_{(aj-3)}, e_{(aj-2)}, e_{(aj-1)}, e_{(aj+1)}, e_{(aj+2)}, e_{(aj+3)}\}$ | | | | | |
|---|---|---|---|---|---|---|---|
| $f_j$ | $e_{aj}$ | $x_1$ | $x_2$ | $x_3$ | $x_4$ | $x_5$ | $x_6$ |
| clef | key | <null> | My | car | is | on | the |
| clef | key | make | me | a | for | my | door |
| ton | key | she | sings | in | <null> | <null> | <null> |
| clef | key | <null> | <null> | The | unlocks | the | safe |
| ton | key | play | in | the | of | B | flat |
| ton | key | finger | on | the | of | middle | C |
| . | . | . | . | . | . | . | . |

TABLE 10-continued

TRAINING EVENTS
Occurrences of $e_{aj}$ = "key" in a training
text of aligned source and target sentences, the source
word $f_j$ connected to "key" in each alignment,
and the context X of "key" in each target sentence.

$X = \{e_{(aj-3)}, e_{(aj-2)}, e_{(aj-1)}, e_{(aj+1)}, e_{(aj+2)}, e_{(aj+3)}\}$

| $f_j$ | $e_{aj}$ | $x_1$ | $x_2$ | $x_3$ | $x_4$ | $x_5$ | $x_6$ |
|---|---|---|---|---|---|---|---|
| . | . | . | . | . | . | . | . |
| . | . | . | . | . | . | . | . |
| . | . | . | . | . | . | . | . |

Using the training events for a target word $e_a$ from the training text, candidate context functions $g_i(f,e,X)$ may be obtained by first identifying types of context functions. For example, one type of context function tests for the presence of a particular word in one or more positions in the context. Another type of context function tests for the presence of a particular word class (for example, part of speech) in one or more positions in the context. The particular words or word classes to be tested for in a context function for a target word e can be obtained from the words and classes in the context of the target word e in the training text.

Alternatively, candidate context functions $g_i(f,e,X)$ may be obtained by clustering the training events according to their context X using the method described in Section 7 of Brown et al (cited above), which is incorporated herein by reference.

Initially, all of the parameters $\lambda_{(e,i)}$ of the word match score model of Equation 7 are set equal to zero.

For each candidate context function $g_i(f,e,X)$, a "measure of merit" G(i) is calculated to according to Equation 11.

$$G(i) = \frac{(Eg_i(f,e,X) - \tilde{E}g_i(f,e,X))^2}{E(g_i(f,e,X) - E(g_i(f,e,X)|X))^2} \quad (11)$$

where $$Eg_i(f,e,X) = \sum_{f,X} P(f|X)\tilde{P}(X)g_i(f,X) \quad (12)$$

$$\tilde{E}g_i(f,e,X) = \sum_{f,X} \tilde{P}(f,X)g_i(f,X) \quad (13)$$

$$E(g_i(f,e,X)|X) = \sum_{f,X} P(f|X)\tilde{P}(X)\left(\sum_f P(f|X)g_i(f,X)\right) \quad (14)$$

In Equations 11 through 14, the conditional probability P(f|X) of a source word f given the context X of the connected target word e is obtained from Equation 7 using the most recent values of the model parameters. The probability $\tilde{P}(X)$ of a context X is obtained by counting occurrences of the target word e and the context X in the training text events of the type shown in Table 10, and dividing the count by the total number of events in the training text in which the target word is e. The probability $\tilde{P}(f,X)$ of a source word f and a context X are obtained by counting occurrences of the target word e, the context X, and the source word f in the training text events of the type shown in Table 10, and dividing each count by the total number of events in the training text in which the target word is e.

The context function $g_i(f,e,X)$ having the highest "measure of merit" G(i) from Equation 11 is selected as a context function to be used in Equation 7. The parameter $\lambda_{(e,i)}$ is obtained by initially setting $\lambda_{(e,i)}=0$, and then solving the following Equation 15 for the quantity $\Delta\lambda_{(e,i)}$.

$$\sum_{f,X} \tilde{P}(X)P(f|X)g_i(f,e,X)e^{[\Delta\lambda_{(e,i)}\Sigma g_i(f,e,X)]} = \sum_{f,X} \tilde{P}(f,X)g_i(f,e,X) \quad (15)$$

A new value of $\lambda_{(e,i)}$ is obtained by adding the value of $\Delta\lambda_{(e,i)}$ to the previous value of $\lambda_{(e,i)}$. Using the new value of $\lambda_{(e,i)}$, Equation 15 is then again solved for a new value of $\Delta\lambda_{(e,i)}$. The process is repeated, each time updating the value of $\lambda_{(e,i)}$, until the value of $\Delta\lambda_{(e,i)}$ falls below a selected threshold. This method is known as iterative scaling.

Using the new model for the word match score (Equation 7), the "measures of merit" G(i) of Equation 11 are recomputed for the remaining candidate context functions $g_i(f,e,X)$ to identify the remaining context function having the highest "measure of merit". The best remaining context function is added to the word match score model of Equation 7 and new values of all of the parameters $\lambda_{(e,i)}$ are calculated using the iterative scaling method and Equation 15. When the word match score model of Equation 7 contains two or more parameters $\lambda_{(e,i)}$, every parameters $\lambda_{(e,i)}$ is updated exactly once per iteration, so all parameters $\lambda_{(e,i)}$ converge in the same iteration. The process is repeated on the remaining candidate context functions $g_i(f,e,X)$ until the "measure of merit" of the best context function falls below a selected threshold.

In the translation apparatus according to the present invention, the target hypothesis generator 12, the language model match score generator 16, the alignment identifier 18, the word match score generator 20, the translation match score generator 22, and the hypothesis match score generator 24 may be suitably programmed general purpose or special purpose digital signal processors. The target language vocabulary store 14 may be computer storage, such as random access memory. The means for transforming the input series of source words into a series of transformed source words in the source text input device 10, and the means for synthesizing a series of output words from the target hypothesis having the best target hypothesis match score of the output 26 may also be suitably programmed general purpose or special purpose digital signal processors.

We claim:

1. An apparatus for translating a series of source words in a first language to a series of target words in a second language different from the first language, said apparatus comprising:

means for inputting said series of source words;

means for generating at least two target hypotheses, each target hypothesis comprising said series of target words selected from a vocabulary of words in the second language, each target word having a context comprising at least one other word in the target hypothesis;

means for generating, for each target hypothesis, a language model match score comprising an estimate of the probability of occurrence of the series of words in the target hypothesis;

means for identifying at least one alignment between the input series of source words and each target hypothesis, the alignment connecting each source word with at least one target word in the target hypothesis;

means for generating, for each source word and each target hypothesis, a word match score comprising an estimate of the conditional probability of occurrence of the source word, given the target word in the target hypothesis which is connected to the source word and given the context of the target word in the target hypothesis which is connected to the source word;

means for generating, for each target hypothesis, a translation match score comprising a combination of the word match scores for the target hypothesis and the source words in the input series of source words;

means for generating a target hypothesis match score for each target hypothesis, each target hypothesis match score comprising a combination of the language model match score for the target hypothesis and the translation match score for the target hypothesis; and means for outputting the target hypothesis having the best target hypothesis match score.

2. An apparatus as claimed in claim 1, characterized in that each target hypothesis comprises a series of target words selected from a vocabulary comprising words in the second language and a null word representing the absence of a word.

3. An apparatus as claimed in claim 2, characterized in that:

the means for identifying at least one alignment comprises means for identifying two or more alignments between the input series of source words and each target hypothesis, each alignment connecting each source word with at least one target word in the target hypothesis;

the word match score generator comprises means for generating, for each source word and each alignment and each target hypothesis, a word match score comprising an estimate of the conditional probability of occurrence of the source word, given the target word in the target hypothesis which is connected to the source word and given the context of the target word in the target hypothesis which is connected to the source word;

the translation match score generator comprises means for generating, for each target hypothesis, a translation match score comprising a combination of the word match scores for the target hypothesis and the alignments and the source words in the input series of source words.

4. An apparatus as claimed in claim 2, characterized in that:

the input means comprises means for transforming the input series of source words into a series of transformed source words;

the alignment means comprises means for identifying at least one alignment between the series of transformed source words and each target hypothesis, the alignment connecting each transformed source word with at least one target word in the target hypothesis;

the word match score generator comprises means for generating, for each transformed source word and each target hypothesis, a word match score comprising an estimate of the conditional probability of occurrence of the transformed source word, given the target word in the target hypothesis which is connected to the transformed source word and given the context of the target word in the target hypothesis which is connected to the transformed source word;

the translation match score generator comprises means for generating for each target hypothesis, a translation match score comprising a combination of the word match scores for the target hypothesis and the transformed source words; and the output means comprises means for synthesizing a series of output words from the target hypothesis having the best target hypothesis match score, and means for outputting the synthesized output words.

5. An apparatus as claimed in claim 2, characterized in that:

the translation match score for a target hypothesis comprises the product of the word match scores for the target hypothesis and the source words in the input series of source words; and the target hypothesis match score for a target hypothesis comprises the product of the language model match score for the target hypothesis multiplied by the translation match score for the target hypothesis.

6. An apparatus as claimed in claim 2, characterized in that:

the context of the target word in the target hypothesis which is connected to a source word is contained in at least one of two or more context classes; and the estimated conditional probability of occurrence of the source word, given the target word in the target hypothesis which is connected to the source word and given the context of the target word which is connected to the source word, comprises at least one function having a value dependent on the class containing the context of the target word which is connected to the source word.

7. An apparatus as claimed in claim 2, characterized in that:

the context of the target word in the target hypothesis which is connected to a source word comprises at least one word having a part of speech in the target hypothesis; and the estimated conditional probability of occurrence of the source word, given the target word in the target hypothesis which is connected to the source word and given the context of the target word which is connected to the source word, comprises at least one function having a value dependent on the part of speech in the target hypothesis of at least one word in the context of the target word which is connected to the source word.

8. An apparatus as claimed in claim 2, characterized in that:

the context of the target word in the target hypothesis which is connected to a source word comprises at least one word having an identity; and the estimated conditional probability of occurrence of the source word, given the target word in the target hypothesis which is connected to the source word and given the context of the target word which is connected to the source word, comprises at least one function having a value dependent on the identity of at least one word in the context of the target word which is connected to the source word.

9. An apparatus as claimed in claim 2, characterized in that the means for outputting the target hypothesis having the best match score comprises a display.

10. An apparatus as claimed in claim 2, characterized in that the input means comprises a keyboard.

11. An apparatus as claimed in claim 2, characterized in that the input means comprises a computer disk drive.

12. An apparatus as claimed in claim 2, characterized in that the input means comprises a computer tape drive.

13. A computer-implemented method of translating a series of source words in a first language to a series of target words in a second language different from the first language, said method comprising:

inputting a series of source words;

generating at least two target hypotheses, each target hypothesis comprising said series of target words selected from a vocabulary of words in the second language, each target word having a context comprising at least one other word in the target hypothesis;

generating, for each target hypothesis, a language model match score comprising an estimate of the probability of occurrence of the series of words in the target hypothesis;

identifying at least one alignment between the input series of source words and each target hypothesis, the alignment connecting each source word with at least one target word in the target hypothesis;

generating, for each source word and each target hypothesis, a word match score comprising an estimate of the conditional probability of occurrence of the source word, given the target word in the target hypothesis which is connected to the source word and given the context of the target word in the target hypothesis which is connected to the source word;

generating, for each target hypothesis, a translation match score comprising a combination of the word match scores for the target hypothesis and the source words in the input series of source words;

generating a target hypothesis match score for each target hypothesis, each target hypothesis match score comprising a combination of the language model match score for the target hypothesis and the translation match score for the target hypothesis; and outputting the target hypothesis having the best target hypothesis match score.

14. A method as claimed in claim 13, characterized in that each target hypothesis comprises a series of target words selected from a vocabulary comprising words in the second language and a null word representing the absence of a word.

15. A method as claimed in claim 14, characterized in that:

the step of identifying at least one alignment comprises identifying two or more alignments between the input series of source words and each target hypothesis, each alignment connecting each source word with at least one target word in the target hypothesis;

the step of generating a word match score comprises generating, for each source word and each alignment and each target hypothesis, a word match score comprising an estimate of the conditional probability of occurrence of the source word, given the target word in the target hypothesis which is connected to the source word and given the context of the target word in the target hypothesis which is connected to the source word;

the step of generating a translation match score comprises generating, for each target hypothesis, a translation match score comprising a combination of the word match scores for the target hypothesis and the alignments and the source words in the input series of source words.

16. A method as claimed in claim 14, characterized in that:

the step of inputting comprises the step of transforming the input series of source words into a series of transformed source words;

the step of aligning comprises identifying at least one alignment between the series of transformed source words and each target hypothesis, the alignment connecting each transformed source word with at least one target word in the target hypothesis;

the step of generating a word match score comprises generating, for each transformed source word and each target hypothesis, a word match score comprising an estimate of the conditional probability of occurrence of the transformed source word, given the target word in the target hypothesis which is connected to the transformed source word and given the context of the target word in the target hypothesis which is connected to the transformed source word;

the step of generating a translation match score comprises generating, for each target hypothesis, a translation match score comprising a combination of the word match scores for the target hypothesis and the transformed source words; and the step of outputting comprises the step of synthesizing a series of output words from the target hypothesis having the best target hypothesis match score.

17. A method as claimed in claim 14, characterized in that:

the translation match score for a target hypothesis comprises the product of the word match scores for the target hypothesis and the source words in the input series of source words; and the target hypothesis match score for a target hypothesis comprises the product of the language model match score for the target hypothesis multiplied by the translation match score for the target hypothesis.

18. A method as claimed in claim 14, characterized in that:

the context of the target word in the target hypothesis which is connected to a source word is contained in at least one of two or more context classes; and the estimated conditional probability of occurrence of the source word, given the target word in the target hypothesis which is connected to the source word and given the context of the target word which is connected to the source word, comprises at least one function having a value dependent on the class containing the context of the target word which is connected to the source word.

19. A method as claimed in claim 14, characterized in that:

the context of the target word in the target hypothesis which is connected to a source word comprises at least one word having a part of speech in the target hypothesis; and the estimated conditional probability of occurrence of the source word, given the target word in the target hypothesis which is connected to the source word and given the context of the target word which is connected to the source word, comprises at least one function having a value dependent on the part of speech in the target hypothesis of at least one word in the context of the target word which is connected to the source word.

20. A method as claimed in claim 14, characterized in that:

the context of the target word in the target hypothesis which is connected to a source word comprises at least one word having an identity; and the estimated conditional probability of occurrence of the source word, given the target word in the target hypothesis which is connected to the source word and given the context of the target word which is connected to the source word, comprises at least one function having a value dependent on the identity of at least one word in the context of the target word which is connected to the source word.

21. A method as claimed in claim 14, characterized in that the step of outputting the target hypothesis having the best match score comprises displaying the target hypothesis having the best match score.

* * * * *